(12) United States Patent
Cullen, III et al.

(10) Patent No.: US 8,364,557 B2
(45) Date of Patent: *Jan. 29, 2013

(54) METHOD OF AND SYSTEM FOR ENABLING AND MANAGING SUB-CONTRACTING ENTITIES

(75) Inventors: Andrew A. Cullen, III, Succasunna, NJ (US); Steven A. Shaw, New York, NY (US)

(73) Assignee: Volt Information Sciences Inc., Orange, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 12/492,438

(22) Filed: Jun. 26, 2009

(65) Prior Publication Data

US 2009/0281955 A1 Nov. 12, 2009

Related U.S. Application Data

(63) Continuation of application No. 10/797,556, filed on Mar. 10, 2004, now Pat. No. 7,558,745, which is a continuation-in-part of application No. 10/412,096, filed on Apr. 10, 2003, now Pat. No. 7,925,568, which is a continuation-in-part of application No. 10/262,487, filed on Sep. 30, 2002.

(60) Provisional application No. 60/371,488, filed on Apr. 10, 2002.

(51) Int. Cl.
*G06Q 30/00* (2012.01)

(52) U.S. Cl. .................... 705/26.4; 705/26.1; 705/26.41

(58) Field of Classification Search ................ 705/7.13, 705/26.1, 26.3, 26.4, 26.41
See application file for complete search history.

(56) References Cited

U.S. PATENT DOCUMENTS

| | | | |
|---|---|---|---|
| 4,799,156 A | 1/1989 | Shavit et al. |
| 4,937,743 A | 6/1990 | Rassman et al. |
| 4,992,940 A | 2/1991 | Dworkin |
| 5,117,353 A | 5/1992 | Stipanovich et al. |
| 5,164,897 A | 11/1992 | Clark et al. |
| 5,291,397 A | 3/1994 | Powell |
| 5,381,332 A | 1/1995 | Wood |
| 5,416,694 A | 5/1995 | Parrish et al. |
| 5,493,490 A | 2/1996 | Johnson |
| 5,592,375 A | 1/1997 | Salmon et al. |
| 5,600,554 A | 2/1997 | Williams |
| 5,664,115 A | 9/1997 | Fraser |
| 5,715,402 A | 2/1998 | Popolo |
| 5,740,421 A | 4/1998 | Palmon |
| 5,758,328 A | 5/1998 | Giovannoli |

(Continued)

FOREIGN PATENT DOCUMENTS

| EP | 1195676 A2 | 4/2002 |
|---|---|---|
| JP | 09223008 A | 8/1997 |

(Continued)

OTHER PUBLICATIONS

Cullen et al., U.S. Appl. No. 11/351,835, filed Feb. 10, 2006.*

(Continued)

*Primary Examiner* — Nicholas D Rosen
(74) *Attorney, Agent, or Firm* — Winstead PC

(57) ABSTRACT

A method of facilitating a project bid process includes generating a buyer-associated bid request utilizing at least a portion of bid item selections of a stored bid item list, transmitting the buyer-associated bid request to at least one supplier for solicitation of a supplier bid response to be generated with the bid item selections utilized in the buyer-associated bid request, generating a supplier-associated bid request utilizing at least a portion of the bid item selections utilized in the buyer-associated bid request, and transmitting the supplier-associated bid request to at least one subcontracting entity for solicitation of a subcontracting-entity bid response to be generated with the bid item selections utilized in the supplier-associated bid request.

39 Claims, 26 Drawing Sheets

U.S. PATENT DOCUMENTS

| | | | |
|---|---|---|---|
| 5,794,212 A | 8/1998 | Mistr, Jr. | |
| 5,802,493 A | 9/1998 | Sheflott et al. | |
| 5,842,178 A | 11/1998 | Giovannoli | |
| 5,862,223 A | 1/1999 | Walker et al. | |
| 5,907,490 A | 5/1999 | Oliver | |
| 5,913,202 A | 6/1999 | Motoyama | |
| 5,915,086 A | 6/1999 | Buzsaki et al. | |
| 5,960,407 A | 9/1999 | Vivona | |
| 5,970,475 A | 10/1999 | Barnes et al. | |
| 5,978,768 A | 11/1999 | McGovern et al. | |
| 5,987,464 A | 11/1999 | Schneider | |
| 5,991,735 A | 11/1999 | Gerace | |
| 5,995,951 A | 11/1999 | Ferguson | |
| 6,014,644 A | 1/2000 | Erickson | |
| 6,038,547 A | 3/2000 | Casto | |
| 6,041,303 A | 3/2000 | Mathews | |
| 6,049,776 A | 4/2000 | Donnelly et al. | |
| 6,058,373 A | 5/2000 | Blinn et al. | |
| 6,058,379 A | 5/2000 | Odom et al. | |
| 6,070,143 A | 5/2000 | Barney et al. | |
| 6,088,678 A | 7/2000 | Shannon | |
| 6,092,050 A | 7/2000 | Lungren et al. | |
| 6,092,060 A * | 7/2000 | Guinta et al. | 706/47 |
| 6,092,197 A | 7/2000 | Coueignoux | |
| 6,112,189 A | 8/2000 | Rickard et al. | |
| 6,115,642 A | 9/2000 | Brown et al. | |
| 6,131,087 A | 10/2000 | Luke et al. | |
| 6,141,653 A | 10/2000 | Conklin et al. | |
| 6,157,808 A | 12/2000 | Hollingsworth | |
| 6,158,044 A | 12/2000 | Tibbetts | |
| 6,161,099 A | 12/2000 | Harrington et al. | |
| 6,167,385 A | 12/2000 | Hartley-Urquhart | |
| 6,189,003 B1 | 2/2001 | Leal | |
| 6,199,050 B1 | 3/2001 | Alaia et al. | |
| 6,213,780 B1 | 4/2001 | Ho et al. | |
| 6,266,659 B1 | 7/2001 | Nadkarni | |
| 6,272,467 B1 | 8/2001 | Durand et al. | |
| 6,275,812 B1 | 8/2001 | Haq et al. | |
| 6,289,340 B1 | 9/2001 | Puram et al. | |
| 6,302,695 B1 | 10/2001 | Rtischev et al. | |
| 6,324,522 B2 | 11/2001 | Peterson et al. | |
| 6,349,238 B1 | 2/2002 | Gabbita et al. | |
| 6,356,909 B1 | 3/2002 | Spencer | |
| 6,370,510 B1 | 4/2002 | McGovern et al. | |
| 6,385,620 B1 | 5/2002 | Kurzius et al. | |
| 6,408,337 B1 | 6/2002 | Dietz et al. | |
| 6,442,528 B1 | 8/2002 | Notani et al. | |
| 6,480,857 B1 | 11/2002 | Chandler | |
| 6,529,909 B1 | 3/2003 | Bowman-Amuah | |
| 6,556,976 B1 | 4/2003 | Callen | |
| 6,647,300 B1 | 11/2003 | Balasubramanian et al. | |
| 6,658,400 B2 | 12/2003 | Perell et al. | |
| 6,662,194 B1 | 12/2003 | Joao | |
| 7,054,821 B1 | 5/2006 | Rosenthal et al. | |
| 7,089,203 B1 | 8/2006 | Crookshanks | |
| 7,103,567 B2 | 9/2006 | Smukowski | |
| 7,107,268 B1 | 9/2006 | Zawadzki et al. | |
| 7,275,039 B2 | 9/2007 | Setteducati | |
| 7,302,431 B1 | 11/2007 | Apollonsky et al. | |
| 7,305,392 B1 | 12/2007 | Abrams et al. | |
| 7,349,868 B2 | 3/2008 | Tenorio | |
| 7,386,475 B2 | 6/2008 | Parasnis et al. | |
| 7,430,523 B1 | 9/2008 | Khalidi | |
| 7,437,304 B2 | 10/2008 | Barnard et al. | |
| 7,451,106 B1 | 11/2008 | Gindlesperger | |
| 7,457,764 B1 | 11/2008 | Bullock et al. | |
| 7,523,045 B1 | 4/2009 | Walker et al. | |
| 7,533,033 B1 | 5/2009 | Unite et al. | |
| 7,558,745 B2 * | 7/2009 | Cullen et al. | 705/26.3 |
| 7,653,583 B1 * | 1/2010 | Leeb et al. | 705/37 |
| 7,698,146 B2 * | 4/2010 | Cullen, III | 705/1.1 |
| 7,805,382 B2 | 9/2010 | Rosen et al. | |
| 2001/0044768 A1 | 11/2001 | Wares | |
| 2001/0047311 A1 * | 11/2001 | Singh | 705/26 |
| 2001/0051913 A1 | 12/2001 | Vashistha et al. | |
| 2002/0002479 A1 | 1/2002 | Almog et al. | |
| 2002/0042752 A1 * | 4/2002 | Chaves | 705/26 |
| 2002/0046147 A1 | 4/2002 | Livesay et al. | |
| 2002/0055870 A1 | 5/2002 | Thomas | |
| 2002/0072946 A1 | 6/2002 | Richardson | |
| 2002/0073082 A1 | 6/2002 | Duvillier et al. | |
| 2002/0087382 A1 | 7/2002 | Tiburcio | |
| 2002/0103687 A1 | 8/2002 | Kipling | |
| 2002/0152133 A1 | 10/2002 | King et al. | |
| 2002/0156668 A1 | 10/2002 | Morrow et al. | |
| 2002/0161619 A1 | 10/2002 | Ham et al. | |
| 2002/0198766 A1 | 12/2002 | Magrino et al. | |
| 2002/0198818 A1 | 12/2002 | Scott et al. | |
| 2003/0004850 A1 | 1/2003 | Li et al. | |
| 2003/0018481 A1 | 1/2003 | Zhou et al. | |
| 2003/0037032 A1 | 2/2003 | Neece et al. | |
| 2003/0055694 A1 | 3/2003 | Menninger | |
| 2003/0055754 A1 | 3/2003 | Sullivan | |
| 2003/0083910 A1 | 5/2003 | Sayal et al. | |
| 2003/0101114 A1 | 5/2003 | Delapass et al. | |
| 2003/0101127 A1 | 5/2003 | Cornelius | |
| 2003/0135401 A1 | 7/2003 | Parr | |
| 2003/0145006 A1 | 7/2003 | Dalfsen et al. | |
| 2003/0177051 A1 | 9/2003 | Driscoll et al. | |
| 2003/0200150 A1 | 10/2003 | Westcott et al. | |
| 2003/0200168 A1 | 10/2003 | Cullen, III et al. | |
| 2003/0204439 A1 | 10/2003 | Cullen, III | |
| 2003/0208434 A1 | 11/2003 | Posner | |
| 2003/0212604 A1 | 11/2003 | Cullen, III | |
| 2003/0216986 A1 | 11/2003 | Hassan | |
| 2004/0030566 A1 | 2/2004 | Brooks Rix | |
| 2004/0030590 A1 | 2/2004 | Swan et al. | |
| 2004/0039681 A1 | 2/2004 | Cullen, III et al. | |
| 2004/0068728 A1 | 4/2004 | Blevins | |
| 2004/0093583 A1 | 5/2004 | McAnaney et al. | |
| 2004/0107125 A1 | 6/2004 | Guheen et al. | |
| 2004/0107405 A1 | 6/2004 | Schein | |
| 2004/0158513 A1 | 8/2004 | Musacchio | |
| 2004/0186852 A1 | 9/2004 | Rosen | |
| 2004/0205519 A1 | 10/2004 | Chapel et al. | |
| 2004/0210490 A1 | 10/2004 | Almstead et al. | |
| 2004/0210510 A1 | 10/2004 | Cullen, III et al. | |
| 2004/0215467 A1 | 10/2004 | Coffman et al. | |
| 2004/0236598 A1 | 11/2004 | Thomsen | |
| 2004/0260601 A1 | 12/2004 | Brief | |
| 2004/0267606 A1 | 12/2004 | Brishke et al. | |
| 2005/0114829 A1 | 5/2005 | Robin | |
| 2005/0120039 A1 | 6/2005 | Amys et al. | |
| 2005/0144129 A1 | 6/2005 | Coolman et al. | |
| 2005/0262008 A1 | 11/2005 | Cullen, III et al. | |
| 2005/0288993 A1 | 12/2005 | Weng et al. | |
| 2006/0173775 A1 | 8/2006 | Cullen et al. | |
| 2006/0259476 A1 | 11/2006 | Kadayam et al. | |
| 2007/0124196 A1 | 5/2007 | Brief et al. | |
| 2007/0198968 A1 | 8/2007 | Shenfield et al. | |
| 2008/0004890 A1 | 1/2008 | Hargroder | |
| 2009/0248482 A1 * | 10/2009 | Knyphausen et al. | 705/9 |
| 2010/0241482 A1 * | 9/2010 | Knyphausen et al. | 705/8 |

FOREIGN PATENT DOCUMENTS

| | | |
|---|---|---|
| JP | 11-345259 A | 12/1999 |
| JP | 2002-041835 A | 2/2002 |
| JP | 2002-149959 A | 5/2002 |
| JP | 2002-531890 A | 9/2002 |
| JP | 2002-366763 A | 12/2002 |
| JP | 2003-067188 A | 3/2003 |
| JP | 2003-532201 A | 10/2003 |
| JP | 2004-086757 A | 3/2004 |
| JP | 2004-252951 A | 9/2004 |
| JP | 2004-264880 A | 9/2004 |
| JP | 2004-527805 A | 9/2004 |
| JP | 2005-018327 A | 1/2005 |
| RU | 2165679 C1 | 4/2001 |
| WO | WO-00/33187 A1 | 6/2000 |
| WO | WO-/00/50970 | 8/2000 |
| WO | WO-0108067 A1 | 2/2001 |
| WO | WO-01/14962 A1 | 3/2001 |
| WO | WO-01/48656 | 7/2001 |
| WO | WO-02/08868 | 1/2002 |
| WO | WO-02/25544 | 3/2002 |
| WO | WO-02/41270 A1 | 5/2002 |

OTHER PUBLICATIONS

Cullen et al., U.S. Appl. No. 11/354,367, filed Feb. 14, 2006.*
Cullen et al., U.S. Appl. No. 11/885,090, filed May 22, 2008.*
Cullen, U.S. Appl. No. 12/342,116, filed Dec. 23, 2008.*
Cullen, U.S. Appl. No. 12/692,937, filed Jan. 25, 2010.*
Cullen et al., U.S. Appl. No. 12/773,830, filed May 4, 2010.*
Wasicek et al., U.S. Appl. No. 12/855,532, filed Aug. 12, 2010.*
Shaw et al., U.S. Appl. No. 12/871,725, filed Aug. 30, 2010.*
Tate, L., "Preparing RFP's, RFQs and Negotiating Contracts Requires Meticulous Attention to Many Details," Communications News, vol. 24, No. 12, p. 46, Dec. 1987.*
Hirning, J., "Standing up to the Standards Strain," Quality, vol. 34, No. 2, p. 96, Feb. 1995.*
Feder, B.J., "True Grit in the Gritty Inner City; Some Dreams Come True, but Company Fights for Life," New York Times, Late Edition—Final Edition, Jul. 10, 1998, p. 1, col. 2.*
Anon., "Cephren Launches MarketNet Bidding Service, Providing the Construction Industry With an Efficient Way to Procure Goods and Services Online," Business Wire, May 30, 2000.*
Cullen, III, et al., U.S. Appl. No. 13/017,760, filed Jan. 31, 2011.
Bajari et al. (Bajari), "Incentives versus transaction cost: a theory of procurement contracts", RAND Journal of Economics, vol. 32, No. 3, Autumn 2001, pp. 387-407.
www.marketing.ebreviate.com; "Overview"; Company Information of eBreviate; Feb. 11, 2002; pp. 1-16.
www.chimes.net; "Chimes Streamlines & Digitizes RFP Administration and Project Management with Launch of Chimes PM"; Press Release from Chimes, Inc.; Feb. 25, 2002; pp. 1-4.
www.chimes.net; "Chimes, Inc. Extends Human Capital Management Solution Beyond Contingent Workforce with Launch of Centralized Applicant Management-CAM-Program"; News Room from Chimes, Inc.; Jun. 28, 2001; pp. 1-2.
www.emptoris.com; "Overview"; Company Overview of Emptoris; Apr. 15, 2002; pp. 1-18.
Screenshots of Volt Information Sciences, www.volt.com, Feb. 21, 1999, pp. 1-24, retrieved from: Google.com and archive.org.
Torres, Giselle; "High-Voltage Staffing Service Arrives in Puerto Rico"; Caribbean Business; Oct. 23, 1997, p. 1 (retrived from: Dialog, file 16).
"Volt Information Sciences-Facilities & Equipment", Annual Report, 1989, p. 1 (retrieved from : Dialog, file 160.
"Volt Information Sciences to Purchase Portions of Two Lucent Technologies Subsidiaries", PR Newswire, Nov. 17, 1999, pp. 1-3, (retrieved from: Dialog, file 16.
marketing.ebreviate.com; "Overview"; Company Information of eBreviate; Feb. 11, 2002; pp. 1-16.
Consol (www, procurestaff.com via http://web.archive.org, copyright 2003) pp. 1-31.
Cullen, Andrew A. III, "Declaration of Andrew A. Cullen III", 41 pages, Jun. 18, 2008.
Leipold et al., "The World Bank e-Procurement for the Selection of Consultants: Challenges and Lessons Learned" Journal of Public Procurement, 2004, vol. 4, Issue 3, pp. 319-339.
Dysart, J., "The Data Exchange, "DG Review, vol. 11, No. 9, p. 37, Mar. 11, 1991.
Anon., "Primavera Systems; Primavera, PurchasePro.Com Create E-Commerce Marketplace for Construction Industry," M2 Presswire, Sep. 22, 1999.
Rawdon, S., "Online Bidding Options May be Web's Best Secret," Business First-Columbus, vol. 18, No. 33, p. B11, Apr. 5, 2002.
"NextSource Announces Launch of its Multiple Listing Staffing Association. "Business Wire, p. 2196, Apr. 16, 2002.
Definition of prose from Dictionary.com, retrieved from [http://dictionary.reference.com/browse/prose] on Aug. 7, 2008.
Herman, Susan J., Hiring Right: A Practical Guide. SAGE. 1994. pp. 23-25.
Cullen, A., Suppliers of Technical Nonpayroll Workers, (2 pages), Dec. 31, 1997.
Cullen, A., Skills Questionnaire, (5 pages), May 21, 1998.
Cullen, A., Skills Environment, (1 page), Jul. 2, 1998.
Cullen, A., Jobs Listing, (31 pages), Feb. 24, 1999.
Brief, V., Overview of Volt's HRP Application, (3 pages), Feb. 1999.
Young, Lee W., "International Search Report" for PCT/US10/47176 as mailed Oct. 14, 2010, 3 pages.
Web Archive of "nextSource" web page, "People Blue Book™, Introducing the nextSource People Blue Book" retrieved from [URL: http://web.archive.org/web/20020206061453/http://nextsource.com/services/people_blue...], archived on Feb. 6, 2002, 1 page.
U.S. Bureau of Labor Statistics, "2000 Standard Occupational Classification (SOC) User Guide", retrieved from [URL: http://data.bls.gov/cgi-bin/print.pl/soc/socguide.htm] on Dec. 27, 2011, 5 pages.
Brief, Victor, U.S. Appl. No. 13/460,979, filed May 1, 2012.
Tate, L., "Preparing RFPs, RFQs and Negotiating Contracts Requires Meticulous Attention to Many Details", Communications News, vol. 24, No. 12, p. 46, Dec. 1987.
Hirning, J., "Standing up to the Standards Strain", Quality, vol. 34, No. 2, p. 96, Feb. 1995.
Feder, B.J., "True Grit in the Gritty Inner City; Some Dreams Come True, but Company Fights for Life", New York Times, Late Edition-Final Edition, Jul. 10, 1998, p. 1, col. 2.
Anon, "Cephren Launches MarketNet Bidding Service, Providing the Construction Industry With an Efficient Way to Procure Goods and Services Online", Business Wire, May 30, 2000, 3 pages.

* cited by examiner

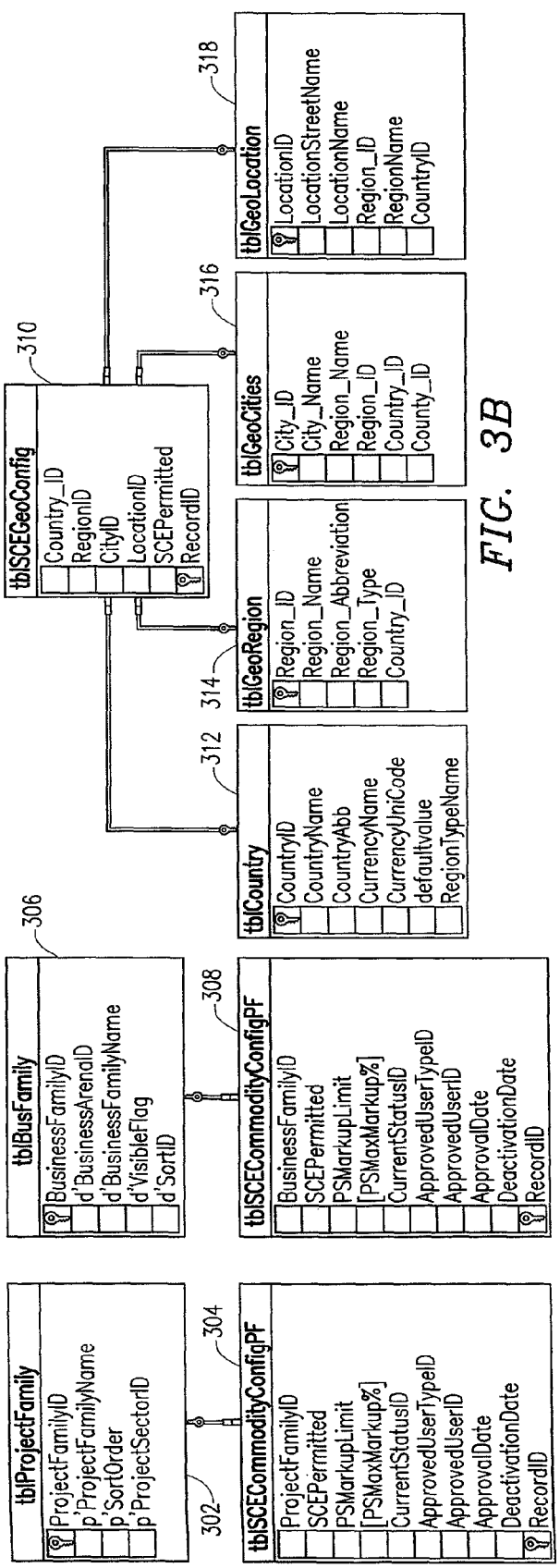
*FIG. 3B*
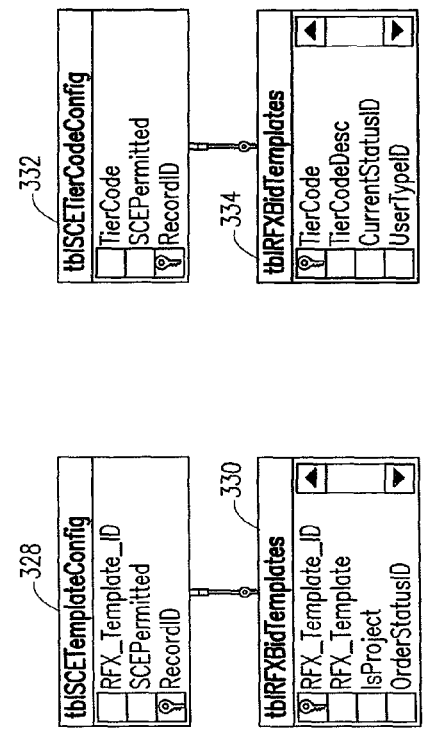
*FIG. 3D*
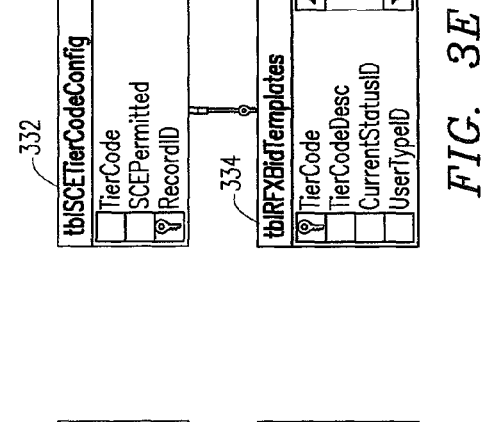
*FIG. 3E*
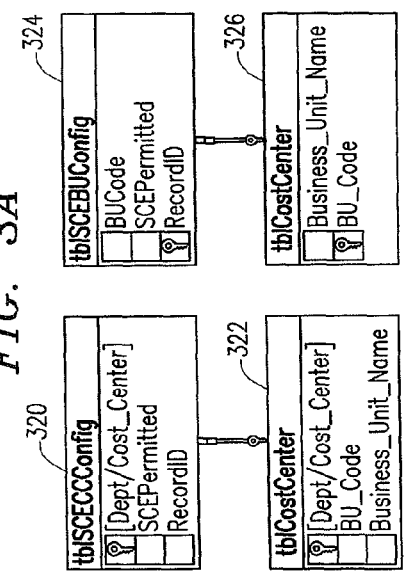
*FIG. 3A*
*FIG. 3C*

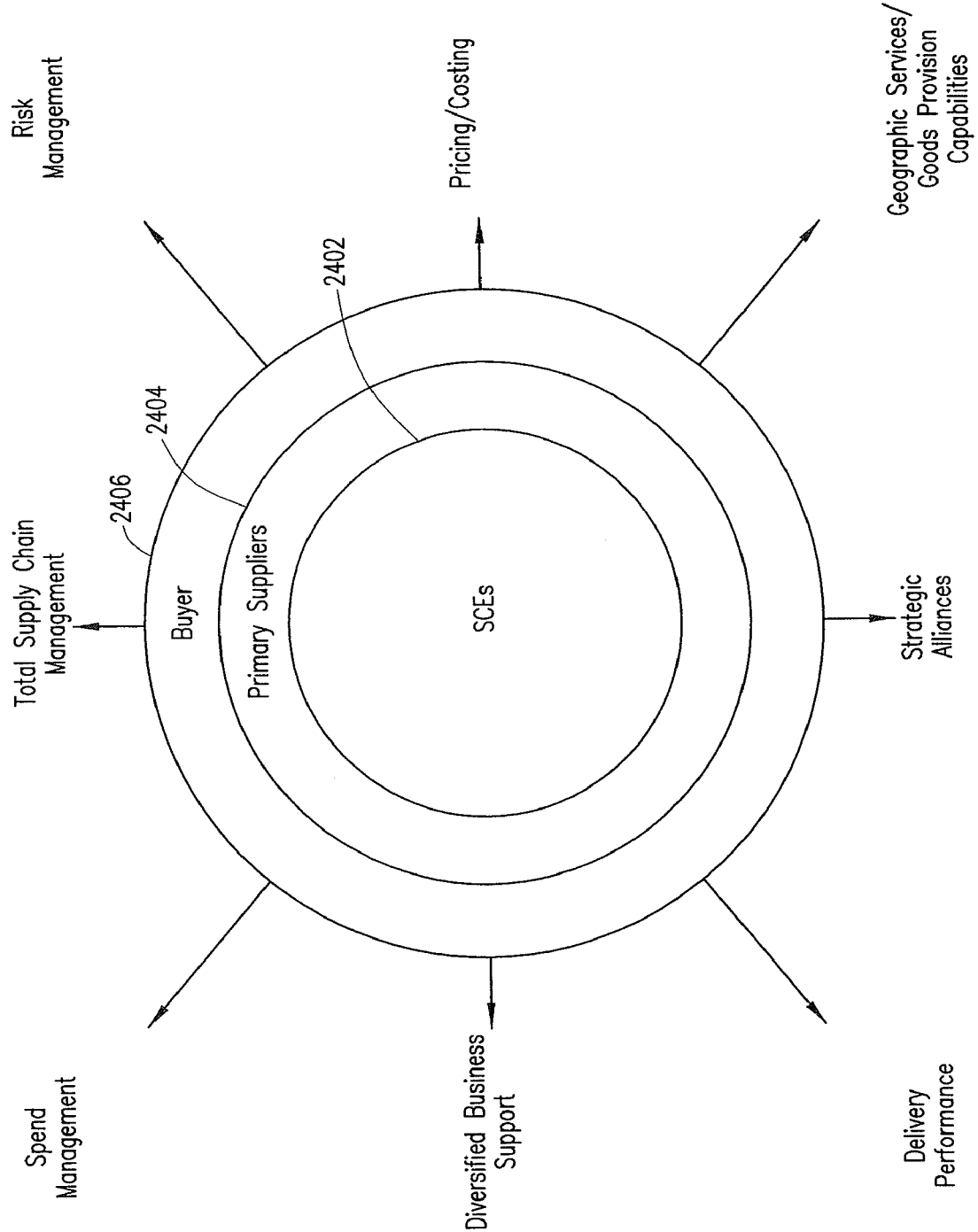

METHOD OF AND SYSTEM FOR ENABLING AND MANAGING SUB-CONTRACTING ENTITIES

CROSS-REFERENCE TO RELATED APPLICATIONS

This patent application is a continuation of and claims priority from U.S. patent application Ser. No. 10/797,556, titled Method of And System for Enabling And Managing Sub-Contracting Entities, filed on Mar. 10, 2004 now U.S. Pat. No. 7,558,745. U.S. patent application Ser. No. 10/797,556 is a continuation-in-part of U.S. patent application Ser. No. 10/412,096 filed on Apr. 10, 2003 now U.S. Pat. No. 7,925,568. U.S. patent application Ser. No. 10/412,096 is a continuation-in-part of U.S. patent application Ser. No. 10/262,487, filed on Sep. 30, 2002. U.S. patent application Ser. No. 10/262,487 claims priority from U.S. Provisional Patent Application No. 60/371,488, filed on Apr. 10, 2002. U.S. patent application Ser. No. 10/412,096 claims priority from U.S. Provisional Patent Application No. 60/371,488. This patent application incorporates by reference the entire disclosures of U.S. Provisional Patent Application No. 60/371,488 and U.S. patent application Ser. Nos. 10/262,487, 10/412,096, and 10/797,556. This patent application also incorporates by reference the entire disclosure of U.S. patent application Ser. No. 10/141,801, filed on May 9, 2002.

BACKGROUND OF THE INVENTION

1. Technical Field

The present invention relates generally to a method of and system for enabling and managing sub-contracting entities. More particularly, and by way of example, the present invention relates to electronically facilitating various aspects of sub-contracting entity (SCE) utilization relative to project work, including, but not limited to, SCE enablement, a project bid process, a requisition process, a spend process, and a performance-management process.

2. History of Related Art

It is a common business practice among services/goods providers, and particularly among primary suppliers of goods or services, within a project-work sector to utilize a second tier, and even subsequent lower-tiers, of supply-chain providers. These second tier and lower-tier providers are referred to as sub-contracting entities (SCEs). An SCE is any provider of goods and/or services that provides the goods and/or services with the consent of, and in conjunction with, a primary supplier of goods and/or services to a buyer. The SCEs are used to deliver, in part or in whole, project-work deliverables requested by end users or buyers. Use of the SCEs as described above may be made by an authorized supplier for various reasons, such as, for example, expansion of services/goods delivery capability, provision of goods/services to buyers when the primary supplier cannot logistically or technologically meet demand requirements, and reduction of primary supplier costs when the goods/services can be provided by an SCE at a more competitive cost.

Regardless of the underlying reasons that the SCEs are used, use of the SCEs is common within the project-work sector. In many instances, suppliers that utilize the SCEs in a sub-contracting activity do so in a manner that makes use by the suppliers of the SCEs virtually invisible to the buyer. Although use of the SCEs tends to provide the buyer with required project-work deliverable/outputs, the relatively-hidden nature of sub-contracting activities tends to cause at least one of the following to occur: 1) increased potential liability risks; 2) removal of control of SCE management from the buyer; 3) hiding of SCE costing/pricing data; 4) hiding of primary-supplier marginal additions to SCE costs/prices; 5) hindering the buyer from measuring SCE performance; 6) hindering the buyer from measuring performance associated with goods/services directly provided by primary suppliers; 7) reducing activity and data-processing auditing capabilities; and 8) hindering the ability of the buyer to efficiently manage the project-work commodity and take advantage of business opportunities that would be presented if the SCE activity were more visible and managed.

SUMMARY OF THE INVENTION

A method of facilitating a project bid process includes generating a buyer-associated bid request utilizing at least a portion of bid item selections of a stored bid item list, transmitting the buyer-associated bid request to at least one supplier for solicitation of a supplier bid response to be generated with the bid item selections utilized in the buyer-associated bid request, generating a supplier-associated bid request utilizing at least a portion of the bid item selections utilized in the buyer-associated bid request, and transmitting the supplier-associated bid request to at least one subcontracting entity for solicitation of a subcontracting-entity bid response to be generated with the bid item selections utilized in the supplier-associated bid request.

A computer system for facilitating a bid process for a project involving a buyer, a supplier, and at least one subcontracting entity includes a database system for maintaining a configurable pre-established bid item list and a bid template for the project and a server connected to the database system and connectable to the buyer, the supplier, and the at least one subcontracting entity. The bid template includes bid item selections selected from the bid item list. The server is operable to generate a buyer-associated bid request utilizing the bid template, transmit the buyer-associated bid request to the supplier, generate a supplier-associated bid request via a parsing of the supplier-associated bid request, transmit the supplier-associated bid request to the at least one subcontracting entity, receive a subcontracting entity bid response to the supplier-associated bid request, and receive a supplier bid response. The supplier bid response incorporates, at least in part, data from the subcontracting entity bid response.

In a computer readable medium having computer-executable instructions stored thereon, the computer-executable instructions include means for generating a buyer-associated bid request utilizing at least a portion of bid item selections of a stored bid item list, means for transmitting the buyer-associated bid request to at least one supplier for solicitation of a supplier bid response to be generated with the bid item selections utilized in the buyer-associated bid request, means for generating a supplier-associated bid request utilizing at least a portion of the bid item selections utilized in the buyer-associated bid request, and means for transmitting the supplier-associated bid request to at least one subcontracting entity for solicitation of a subcontracting-entity bid response to be generated with the bid item selections utilized in the supplier-associated bid request.

A method of managing a project bid process includes receiving an enablement request relative to a subcontracting entity and receiving an affiliation request relative to a primary supplier. The affiliation request requests that the subcontracting entity be affiliated with the primary supplier. The method also includes transmitting a buyer-associated bid request to the supplier, transmitting, to the subcontracting entity, of a daisy chain quotation associated with the buyer-associated bid request, and receiving a completed daisy chain quotation from the subcontracting entity. The completed daisy chain quotation includes completed applicable daisy chain quotation items of the daisy chain quotation transmitted to the subcontracting entity. The method also includes updating a supplier bid response to the buyer-associated bid request using at least some of the completed applicable daisy chain quotation items and transmitting the updated supplier bid response to the buyer.

In a computer readable medium having computer-executable instructions stored thereon, the computer-executable instructions include means for receiving an enablement request relative to a subcontracting entity, means receiving an affiliation request relative to a primary supplier, the affiliation request requesting that the subcontracting entity be affiliated with the primary supplier, means for transmitting a buyer-associated bid request to the supplier, means for transmitting, to the subcontracting entity, of a daisy chain quotation associated with the buyer-associated bid request, and means for receiving a completed daisy chain quotation from the subcontracting entity. The completed daisy chain quotation includes completed applicable daisy chain quotation items of the daisy chain quotation transmitted to the subcontracting entity. The computer-readable instructions also include means for updating a supplier bid response to the buyer-associated bid request using at least some of the completed applicable daisy chain quotation items and means for transmitting the updated supplier bid response to the buyer.

A computer system for managing a project bid process includes a database system and a server connected to the database system. The server is operable to receive an enablement request relative to a subcontracting entity, receive an affiliation request relative to a primary supplier, the affiliation request requesting that the subcontracting entity be affiliated with the primary supplier, transmit a buyer-associated bid request to the supplier, transmit, to the subcontracting entity, of a daisy chain quotation associated with the buyer-associated bid request, and receive a completed daisy chain quotation from the subcontracting entity. The completed daisy chain quotation includes completed applicable daisy chain quotation items of the daisy chain quotation transmitted to the subcontracting entity. The server is also operable to update a supplier bid response to the buyer-associated bid request using at least some of the completed applicable daisy chain quotation items and transmit the updated supplier bid response to the buyer.

BRIEF DESCRIPTION OF THE DRAWINGS

A more complete understanding of the method and system of the present invention may be obtained by reference to the following Detailed Description of Exemplary Embodiments of the Invention, when taken in conjunction with the accompanying Drawings, wherein:

FIGS. 3A-E illustrate a technical database model/schema that may be used in connection with the configuration elements illustrated in FIG. 2A;

FIG. 24 illustrates how various embodiments of the invention may impact the buyer's supply chain.

DETAILED DESCRIPTION OF EXEMPLARY EMBODIMENTS OF THE INVENTION

Figure 1A:
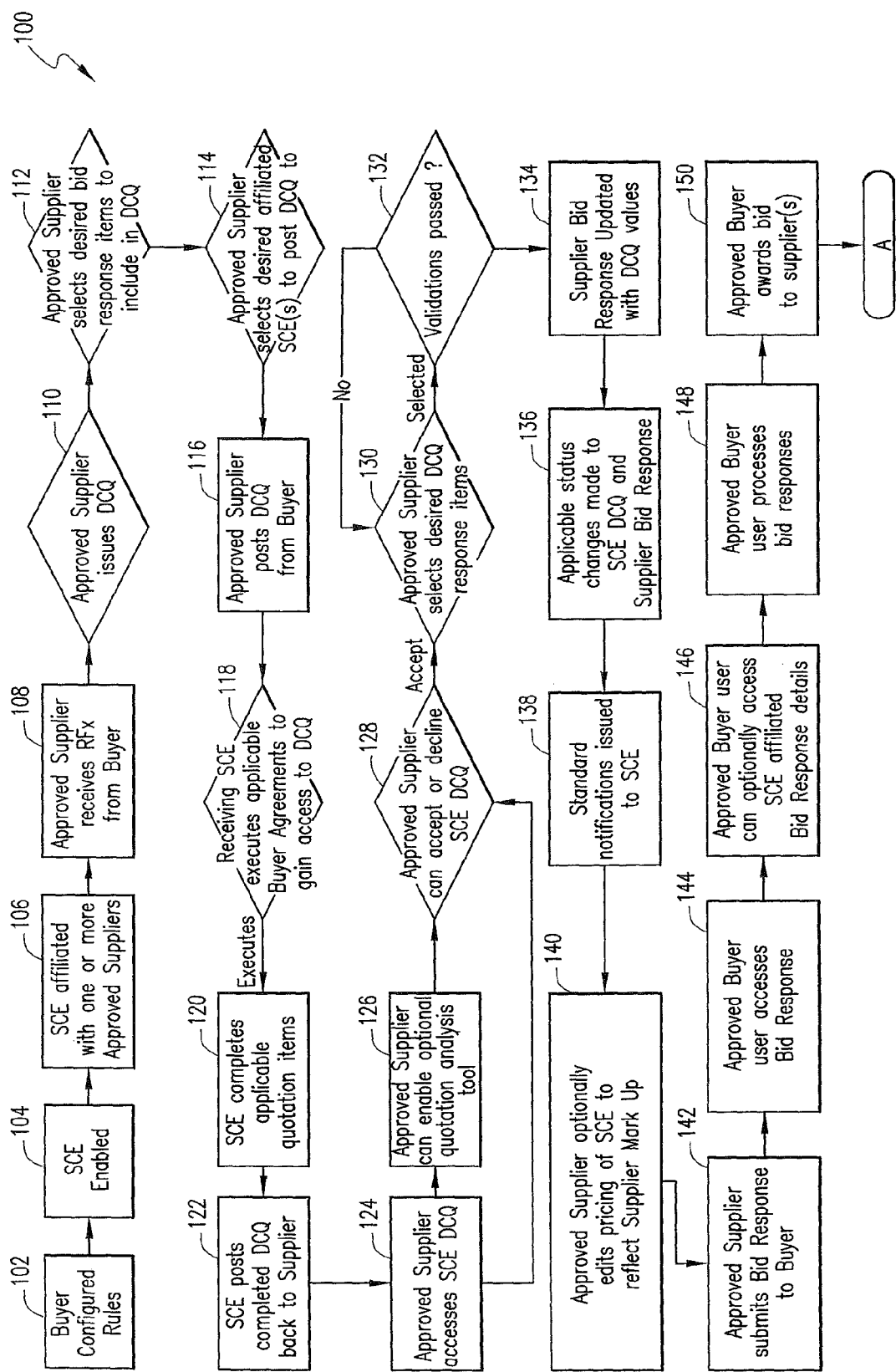
FIGS. 1A-B illustrate an exemplary method for SCE management.

Various embodiments of the invention will now be described more fully with reference to the accompanying drawings. The invention may, however, be embodied in many different forms and should not be construed as limited to the embodiments set forth herein. The invention should only be considered limited by the claims as they now exist and the equivalents thereof.

In this Detailed Description, various entities, such as, for example, a subcontracting entity (SCE), a primary supplier, and a buyer, are described. It will be understood by those having ordinary skill in the art that, when various actions are described as being performed by one of the various entities, the actions may be being performed by an individual user associated with that entity.

Various specialized work flows that may be implemented by the buyer, the primary supplier, or SCE(s) are not discussed in detail in order to avoid obscuring salient aspects of the invention. It will be understood by those having ordinary skill in the art that specialized work flows may be implemented as appropriate without departing from the spirit and scope of the invention.

Various embodiments of the invention provide a comprehensive, web-enabled system and method for facilitating and managing all aspects of SCE utilization relative to project work, including SCE enablement, the project bid process, the requisition process, the spend process, and the performance-management process. In various embodiments of the invention, a buyer entity is enabled to not only gain visibility of SCE utilization by primary suppliers, but also to establish and configure governance rules for the SCE utilization throughout the entire project-work life cycle.

Traditionally-hidden information relative to the SCEs being utilized may be introduced in a structured and configured manner, which allows both visibility and management by the buyer. Once the SCE has been enabled, the SCE can be utilized in a configured and integrated mode by the primary suppliers to augment bid responses back to the buyer so as to provide visibility and association of specific bid response elements, including, for example, costing/pricing data, with the SCE.

SCE bid-response enabling methods utilized in various embodiments of the invention can enable subsequent functionality applicable to purchase requisitions and order processing. SCEs associated with a primary supplier's awarded bid response may be enabled to provide, for example, necessary taxation data and purchase-requisition acceptance in an integrated environment for those purchase-requisition elements applicable to the SCEs.

Various embodiments of the invention also enable a buyer to configure and create a purchase order in such a manner as to account for SCE purchase-order elements and for SCE direct-bill pay-request voucher processing during the course of a project. Embodiments of the invention that enable SCE purchase-order and voucher bill pay request visibility and processing may enable both individual SCE performance assessment, as well as direct and indirect financial-payment processing. By parsing purchase-order elements and applicable bill pay request vouchers into sub-records and/or discrete data processing records unto themselves, core data-processing functionality can be applied to both primary providers and SCE services/goods providers. Various embodiments of the invention provide enhanced visibility and data-processing capabilities to buyers, primary suppliers, and SCEs.

Status as an SCE may be bestowed upon a primary supplier of a buyer; in such a case, a given provider of goods and/or services may function both as a primary supplier and as an SCE to the buyer. The SCEs operate in the context of a life cycle process. The term life cycle process refers to a project work life cycle as described in, for example, FIG. 5A and accompanying text of U.S. patent application Ser. No. 10/262,487, filed on Sep. 30, 2002. The life cycle process includes steps ranging from primary supplier qualification/selection to bill payment and reporting.

Figure 1B:
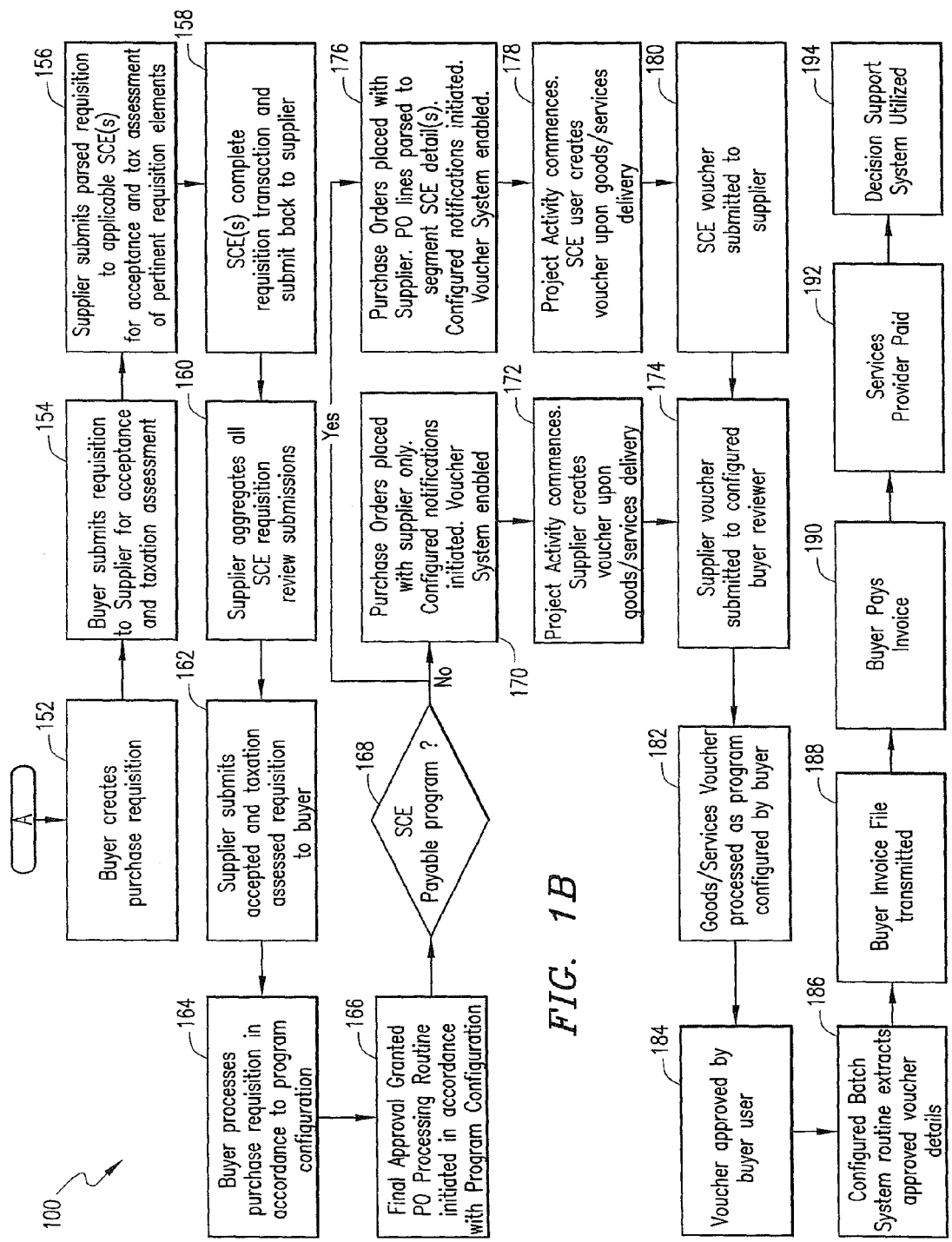

Turning now to the FIGURES, FIGS. 1A-B illustrate exemplary SCE enablement and management. In FIG. 1A, a flow 100 includes steps 102-194. Steps 102-106 relate to SCE enablement. Steps 108-142 relate to daisy-chain bid-response processing. Steps 144-150 relate to buyer bid response processing. In FIG. 1B, steps 152-170 and 176 relate to purchase requisition processing. Steps 172-174 and 178-184 relate to voucher processing. Steps 186-192 relate to payables processing. Step 194 relates to utilization of a decision support system. Those having ordinary skill in the art will note that some of the decision blocks included in the flow 100 have only a single arrow extending therefrom. In such cases, decisions other than the decision indicated by the arrow extending from the decision block are not considered pertinent to the discussion herein and therefore have been omitted in order to not obscure salient principles of the invention.

The flow 100 begins at step 102, at which step rules are configured by the buyer relative to the SCE. At step 104, the SCE is enabled and program-configured supplier-load requirements are set. At step 106, the SCE is affiliated with one or more approved suppliers. At step 108, an approved supplier receives a request for quote/request for proposal/request for bid (RFx) from the buyer. At step 110, the approved supplier decides to issue a daisy-chain quotation. The term daisy chain is used in the context of handling and transmission of work flow elements between entities in which one or more records are parsed from a master record. The parsed records are then transmitted from one entity to another, such that a receiving entity has access to the parsed and transmitted records. Upon further processing, the parsed transmitted records may be reintegrated back into the master record for further handling as part of the work flow. A daisy-chain quotation and a daisy-chain acquisition are examples of how a daisy-chain concept may be used in the context of the work flow process described herein. In response to the decision, at step 110, to issue a daisy-chain quotation, at step 112, the approved supplier selects desired bid response items to include in the daisy-chain quotation. The items included in the daisy-chain quotation must include at least one selection of a billable services/goods item.

From step 112, execution proceeds to step 114. At step 114, the approved supplier selects desired affiliated SCEs to which to post the daisy-chain quotation. At step 116, the approved supplier posts the daisy-chain quotation and standard solution notifications are initiated. Standard solution notifications include, for example, so-called on-line dashboard notifications as well as e-mail notifications. From step 116, execution proceeds to step 118. At step 118, a receiving SCE executes applicable buyer agreements to gain access to the daisy-chain quotation. Upon execution of the applicable buyer agreements at step 118, execution proceeds to step 120. At step 120, the SCE completes applicable quotation items. At step 122, the SCE posts the completed daisy-chain quotation back to the supplier.

At step 124, the approved supplier accesses the SCE daisy-chain quotation. From step 124, execution may proceed to either step 126 or 128. If, as step 124, the approved supplier determines that an optional quotation analysis tool is to be used, execution proceeds to step 126. If, however, the approved supplier does not want to use the quotation analysis tool, execution proceeds to directly to step 128. At step 126, the approved supplier may enable the optional quotation analysis tools. The quotation analysis tools permit daisy-chain quotation grading and scoring to occur. At step 128, the approved supplier may accept or decline the SCE daisy-chain quotation. If the approved supplier accepts the SCE daisy-chain quotation, execution proceeds to step 130.

At step 130, the approved supplier selects daisy-chain quotation response items. For example, the approved supplier may select all or less than all of the daisy-chain quotation response items received from an SCE when certain response items are acceptable to the approved supplier and others are not. The selected response items must include at least one voucherable services/goods item. In response to selection of the desired daisy-chain quotation response items, execution proceeds to step 132. At step 132, a determination is made as to whether all necessary validations have been passed. For example, a validation could fail if the approved supplier were to attempt to select multiple bid response items for the same bid item. If it is not determined that all necessary validations have been passed, execution returns to step 130. If, however, it is determined that all necessary validations have passed, execution proceeds from step 132 to step 134.

At step 134, a supplier bid response is updated with the daisy-chain quotation values validated at step 132. At step 136, applicable status changes to the SCE daisy-chain quotation and supplier bid response are made. For example, once the selected daisy-chain quotation response items have been accepted by the supplier, the status of those items may be changed from pending to accepted. At step 138, standard notifications are issued to the SCE. At step 140, the approved supplier may optionally edit pricing of the SCE to reflect applicable supplier mark-ups. In various embodiments of the invention, the editing of SCE pricing by the approved supplier must not reduce the SCE pricing and must comply with configured allowable mark-up percentages as set by the buyer. From step 140, execution proceeds to step 142. At step 142, the approved supplier submits the bid response to the buyer.

At step 144, the buyer accesses the bid response. At step 146, the approved buyer may optionally access via a user interface all SCE affiliated bid response details. At step 148, the buyer processes the bid responses. At step 150, the buyer awards the bid. From step 150, execution proceeds to step 152. At step 152, the buyer creates a purchase requisition. At step 154, the buyer submits the requisition to the supplier for acceptance and taxation assessment. At step 156, the supplier submits a parsed requisition to the applicable SCE(s) for acceptance and tax assessment of pertinent requisition elements. At step 158, the applicable SCE(s) complete the requisition transaction and submit the completed requisition back to the supplier.

From step 158, execution proceeds to step 160. At step 160, the supplier aggregates all SCE requisition review submissions. At step 162, the supplier submits the accepted and taxation-assessed requisition to the buyer. At step 164, the buyer processes the purchase requisition. Processing by the buyer of the purchase requisition at step 164 occurs in accordance with program configurations, which may vary according to the commodities and/or services subject to the project. At step 166, final approval is granted by the buyer, and a purchase order processing routine is initiated.

From step 166, execution proceeds to step 168. At step 168, a determination is made as to whether the current program is an SCE payable program. An SCE payable program is defined as a program in which the buyer may release funds directly to an SCE. If it is so determined, execution proceeds to step 176. If it is not so determined, execution proceeds to step 170. At step 176, purchase orders are placed with the supplier, purchase order lines are parsed to segment SCE details, configured notifications are initiated, and a voucher system is enabled. From step 176, execution proceeds to step 178. At step 178, project activity commences and the SCE creates a voucher upon goods/services delivery. At step 180, the SCE voucher is submitted to the supplier.

At step 170, a purchase order is placed with only the supplier, configured notifications are initiated, and the voucher system is enabled. From step 170, execution proceeds to step 172. At step 172, project activity commences and the supplier creates a voucher in response to goods/services delivery.

From both of steps 172 and 180, execution proceeds to step 174. At step 174, the supplier voucher is submitted to a configured buyer reviewer. From step 174, execution proceeds to step 182. At step 182, the goods/services voucher submitted at step 174 is processed by the buyer. For example, various processing and approval procedures may be implemented as desired by the buyer. The decision support system may be used, for example, to aggregate various data relative to the project work life cycle in order to evaluate primary suppliers and SCE(s) relative to goods/services provided directly by the primary supplier or SCE(s) relative to goods/services subcontracted by those entities. At step 184, the voucher is approved by the buyer.

From step 184, execution proceeds to step 186. At step 186, a configured batch system routine extracts approved voucher details. At step 188, a buyer invoice file is transmitted. At step 190, the buyer pays the invoice. At step 192, the services provider(s) are paid. At step 194, a decision support system is utilized.

Figure 2A:
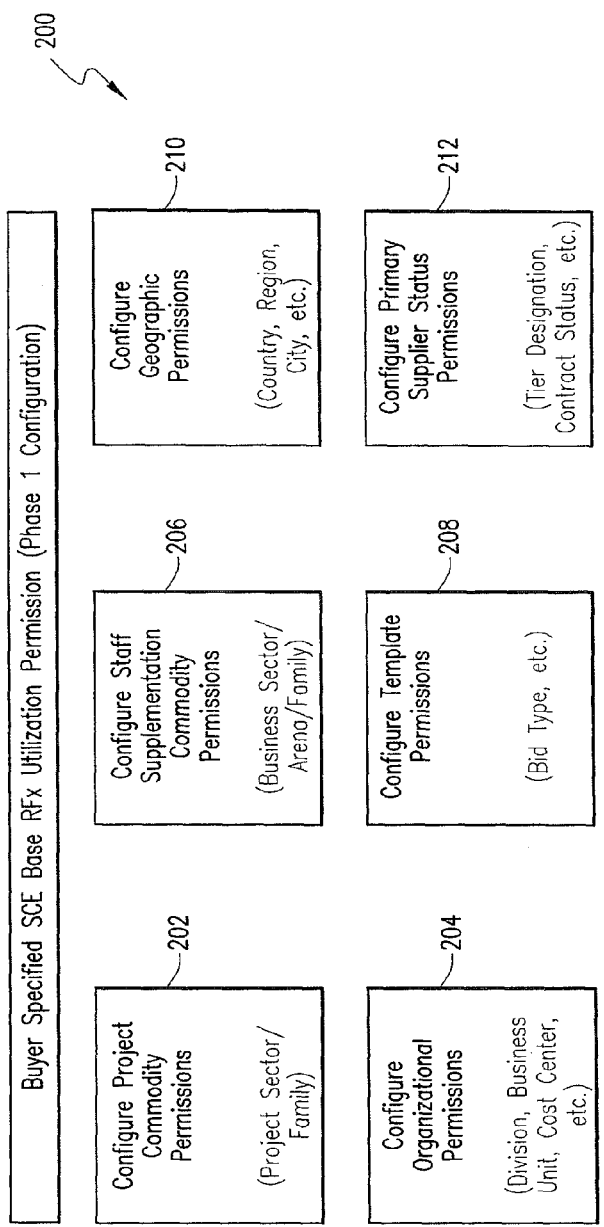
FIGS. 2A-B illustrate exemplary configuration elements governing utilization and qualification of the SCEs.
Figure 2B:
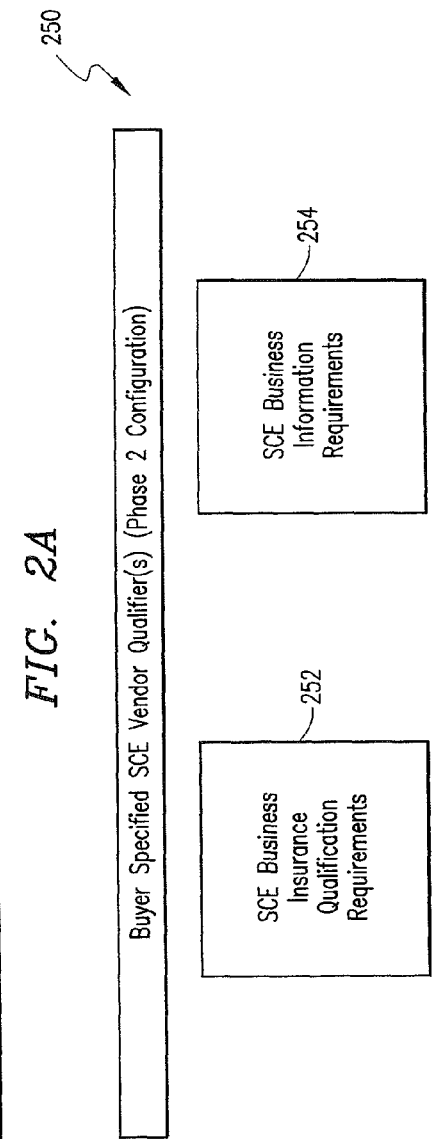

SCE enablement refers to how SCEs gain access to the system and subsequently are utilized by both buyers and primary suppliers. SCE enablement in accordance with various embodiments of the invention permits enhanced buyer utilization control, risk management, business processing visibility/audit capability, and commodity intelligence. In embodiments of the invention, a structured commodity management method relative to SCE utilization can, when enabled, put the buyer, as opposed to the primary supplier control chain, in control of how SCEs are to be used. FIGS. 2A-B illustrate exemplary configuration elements governing utilization and qualification of SCEs.

Configuration elements 200 include project commodity permission configurations 202, organizational permission configurations 204, staff supplementation commodity permission configurations 206, template permission configurations 208, geographic permission configurations 210, and primary supplier status permission configurations 212.

The project commodity permission configurations 202 include, for example, configurations relative to project sector and family and may be established according to the SIC, NAICS, or any other commodities structure desired by the buyer. The organizational permission configurations 204 allow, for example, the buyer to determine whether SCEs may be used by the primary supplier doing business with the buyer in dependence upon the division, business unit, cost center etc. of the buyer with whom the primary supplier is dealing. The staff supplementation commodity permission configuration 206 allow configurations to be set by the buyer according to, for example, the skill set of individuals to be involved in the project, for example, clerical services may be configured by the buyer to the subcontractor services, while engineering services are not. The template permission configurations 208 allow configurations such as those described in relation to other configurations of FIG. 2A to be applied to bid templates and may be, for example, set up according to bid type. The geographic permission configurations 210 allow configurations to be set up according to, for example, country, region, or city. The primary supplier status permission configurations 212 allow the buyer to set up various statuses of primary suppliers and permit or deny bid participation in accordance with those statuses. For example, a buyer could establish that only tier one buyers can use subcontractors when dealing with the buyer or that a primary supplier who may in a noncompliant contract status cannot bid or otherwise participate in the system until the status has been made compliant.

FIG. 2B illustrates exemplary configuration elements governing SCE business requirements. In configuration elements 250, SCE business insurance qualification requirements 252 and SCE business information requirements 254 are shown. The requirements 252 and 254 may be the same as or different from primary supplier requirements set up by the buyer. For example, the requirements 252 and 254 may be either less stringent or more stringent than the primary supplier requirements as desired by the buyer.

FIGS. 3A-E illustrate a technical database model/schema that may be used in connection with the configuration elements illustrated in FIG. 2A. In particular, FIG. 2A and FIGS. 3A-E illustrate exemplary variables that can be configured by the buyer in order to set up a configuration that is most suitable for the buyer's business. The exemplary variables shown in FIGS. 2A and 3A-E reflect a broad mix of variables that touch key configuration elements, such as, for example, geography, buyer organizations, commodity class, bid template type, and primary supplier status. SCE qualifier configuration may be considered analogous to primary supplier configuration as discussed in U.S. patent application Ser. Nos. 10/262,487 and 10/412,096 and may, in effect, represent enablement of similar functionality at a different business layer. FIGS. 3A-E are condensed so as to provide details relative to the SCE.

Examples of data structures for use in SCE configuration are shown in Tables 113-118. The data structures are illustrated for simplicity as being organized in a table format, with each table including all the fields necessary for SCE configuration. The tables are related in a hierarchical and/or relational manner, so that all of the necessary information for SCE configuration can be accurately stored and accessed, as will be described in more detail below in connection with FIGS. 3A-3E. However, it should be understood that other configurations can be included and that the system is not limited to the specific configurations listed in Tables 113-118 or FIGS. 3A-3E.

TABLE 113 tblSCECommodityConfig (db structure view)

| Column Name | Data Type | Length |
|---|---|---|
| ProjectFamilyID | int | 4 |
| SCEPermitted | char | 1 |
| RecordID | int | 4 |

TABLE 114 tblSCEGeoConfig (db structure view)

| Column Name | Data Type | Length |
|---|---|---|
| RegionID | int | 4 |
| CityID | int | 4 |
| LocationID | int | 4 |
| SCEPermitted | char | 1 |
| RecordID | int | 4 |

TABLE 115 tblSCEBUConfig (db structure view)

| Column Name | Data Type | Length |
|---|---|---|
| BUCode | varchar | 50 |
| SCEPermitted | char | 1 |
| RecordID | int | 4 |

TABLE 116 tblSCECCConfig (db structure view)

| Column Name | Data Type | Length |
|---|---|---|
| [Dept/Cost_Center] | varchar | 50 |
| SCEPermitted | char | 1 |
| RecordID | int | 4 |

TABLE 117 tblSCETemplateConfig (db structure view)

| Column Name | Data Type | Length |
|---|---|---|
| RFX_Template_ID | int | 4 |
| SCEPermitted | char | 1 |
| RecordID | int | 4 |

TABLE 118 tblSCETierConfig (db structure view)

| Column Name | Data Type | Length |
|---|---|---|
| TierCode | int | 4 |
| SCEPermitted | char | 1 |
| RecordID | int | 4 |

Tables 113-118 illustrate sample SCE configurations that can be stored in database tables. The SCE commodity configurations shown in Table 113 can be stored in an SCE commodity configurations table 304, the SCE geographic configurations shown in Table 114 stored in an SCE geographic configurations table 310, the SCE business unit configurations shown in Table 115 stored in an SCE business unit configurations table 324, the SCE cost center configurations shown in Table 116 stored in an SCE cost center configurations table 320, the SCE template configurations shown in Table 117 stored in an SCE template configurations table 328, and the SCE tier configurations shown in Table 118 stored in an SCE tier code configurations table 332.

In FIG. 3A, a database schema for managing SCE cost and business family configurations includes a project family table 302, an SCE commodity configurations table 304, a business family table 306, and an SCE commodity configurations table 308. The interrelation between the project family table 302 and the SCE commodity configurations table 304 is shown in FIG. 3A. The table 302 includes columns for a project family identifier (ID), project family name, sort order, and project sector ID for each project family in the project family table 302. The table 304 includes a commodity record ID, a deactivation date, an approval date, an approved user ID, an approved user type ID, a current status ID, a primary supplier maximal markup percentage, a primary supplier markup limit, an SCE permitted field, and the project family ID used in the table 302. Thus, the tables 302 and 304 are interrelated via the project family ID.

The business family table 306 includes a business family ID, a business arena, a business family name, a visible flag, and a sort ID. The SCE commodity configuration table 308 is analogous to the SCE configuration commodity table 304, the tables 306 and 308 being interrelated via the business family ID.

In FIG. 3B, geographic configurations for the SCE are illustrated. The SCE geographic configurations table 310 includes columns for country ID, region ID, city ID, location ID, SCE permitted, and record ID. A country table 312, a geographic region table 314, a geographic cities table 316, and a geographic location table 318 are each interrelated with the SCE geographic configurations table 310 as illustrated in FIG. 3B.

FIG. 3C illustrates SCE cost center and business unit configurations. An SCE cost center configurations table 320 and a business unit configuration table 324 are linked, respectively, to a cost center table 322 and a cost center table 326. FIG. 3D illustrates SCE template configurations. An SCE template configuration table 328 is linked to an RFx bid template table 330. The tables 328 and 330 permit SCE template configurations to be linked to RFx templates as discussed above. FIG. 3E includes an SCE tier code configuration table 332 and an RFx bid template table 334. The tables 332 and 334 permit a tier code assigned to a given SCE to be linked to a particular RFx bid template.

Figure 4:
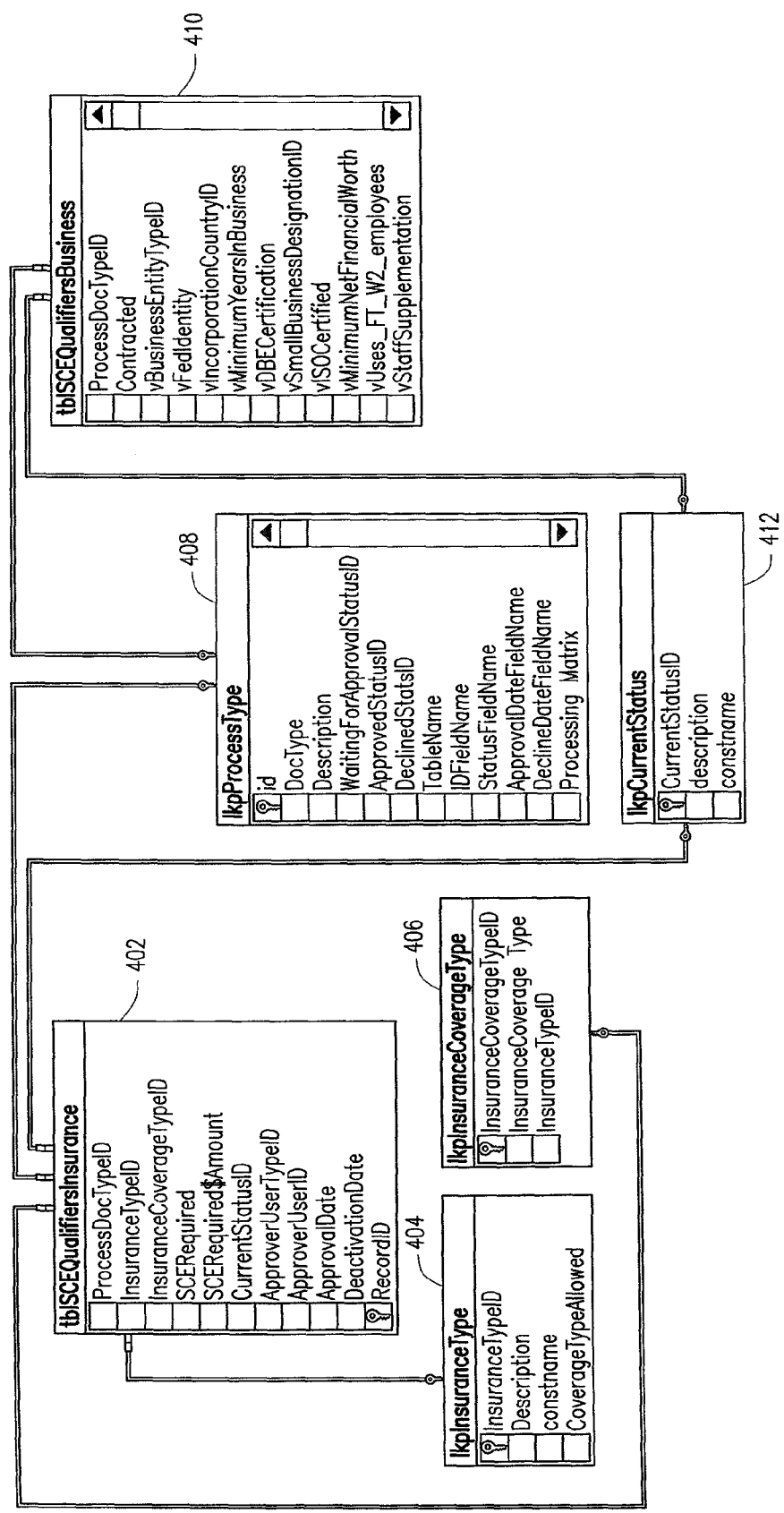
FIG. 4 illustrates a technical database model/schema that may be used in connection with the illustrative configuration elements represented in FIG. 2B.

FIG. 4 illustrates a technical database model/schema that may be used in connection with the illustrative configuration elements represented in FIG. 2B. FIGS. 2B and 4 both illustrate buyer-specified SCE primary supplier qualifiers. The SCE primary supplier qualifiers are the buyer's rules relative to insurance and general business requirements that must be met by an SCE. FIG. 4 is condensed so as to provide details relative to the SCE. Primary supplier qualification is discussed in detail in U.S. patent application Ser. No. 10/412,096. Those having ordinary skill in the art will recognize that an analogous process to that discussed in U.S. patent application Ser. No. 10/412,096 may be applied for business qualification of SCEs and that different requirements can be set for each of primary suppliers and SCEs.

Examples of data structures for primary supplier qualification for an SCE are shown in Tables 120-125. The data structures are illustrated for simplicity as being organized in a table format, with each table including all necessary fields for SCE primary supplier qualification. Tables 120-125 are related in a hierarchical and/relational manner, so that all necessary information can be accurately stored and accessed, as will be described below in connection with FIG. 4. However, it should be understood that other SCE primary supplier qualifier fields can be included and the system is not limited to the fields listed in Tables 120-125 or FIG. 4.

TABLE 120 lkpInsuranceType (db structure view)

| InsuranceTypeID | Description | CoverageTypeAllowed |
|---|---|---|
| 1 | General Liability | 1 |
| 2 | Errors Omissions | 0 |
| 3 | Automobile | 0 |
| 4 | Dishonesty | 0 |
| 5 | Workman Compensations | 0 |
| 6 | Fire | 1 |
| 7 | Theft | 1 |
| 8 | Marine | 1 |

TABLE 121 lkpInsuranceCoverageType (db structure view)

| Column Name | Data Type | Length |
|---|---|---|
| InsuranceCoverageTypeID | int | 4 |
| InsuranceCoverageType | varchar | 50 |
| InsuranceTypeID | int | 4 |

TABLE 122 tblSCEQualifiersInsurance (db structure view)

| Column Name | Data Type | Length |
|---|---|---|
| InsuranceTypeID | int | 4 |
| InsuranceCoverageTypeID | int | 4 |
| SCERequired | char | 1 |
| SCERequired$Amount | money | 8 |
| CurrentStatusID | int | 4 |
| ApproverUserTypeID | int | 4 |
| ApproverUserID | int | 4 |
| ApprovalDate | datetime | 8 |
| DeactivationDate | datetime | 8 |
| RecordID | int | 4 |

TABLE 123 tblSCEQualifiersBusiness (Table View) (db structure view)

| Column Name | Data Type | Length |
|---|---|---|
| Contracted | char | 1 |
| vBusinessEntityTypeID | sql_variant | |
| vFedIdentity | char | 1 |
| vIncorporationCountryID | int | 4 |
| vMinimumYearsInBusiness | numeric | 9 |
| vDBECertification | char | 1 |
| vSmallBusinessDesignationID | char | 1 |
| vISOCertified | char | 1 |
| vMinimumNetFinancialWorth | money | 8 |
| vUses_FT_W2_employees | char | 1 |
| vStaffSupplementation | char | 1 |
| vProjectSupplementation | char | 1 |
| vEDICapable | char | 1 |
| vEFTCapable | char | 1 |
| CurrentStatusID | int | 4 |
| ApproverUserTypeID | int | 4 |
| ApproverUserID | int | 4 |
| ApprovalDate | datetime | 8 |
| DeactivationDate | datetime | 8 |
| RecordID | int | 4 |

TABLE 124 tblSCEQualifiersBusiness (Sample Values) (db structure view)

| Qualifier | Value |
|---|---|
| Contracted | Y |
| vBusinessEntityTypeID | 1, 2, 4, 7, 10 |
| vFedIdentity | Y |
| vIncorporationCountryID | 213 |
| vMinimumYearsInBusiness | 3 |
| vDBECertification | Y |
| vSmallBusinessDesignationID | N |
| vISOCertified | N |
| vMinimumNetFinancialWorth | $1,000,000.00 |
| vUses_FT_W2_employees | Y |
| vStaffSupplementation | N |
| vProjectSupplementation | Y |
| vEDICapable | Y |
| vEFTCapable | Y |
| CurrentStatusID | 1 |

TABLE 124-continued tblSCEQualifiersBusiness (Sample Values) (db structure view)

| Qualifier | Value |
|---|---|
| ApproverUserTypeID | 1 |
| ApproverUserID | 134 |
| ApprovalDate | 3/9/2003 |
| DeactivationDate | NULL |
| RecordID | 1 |

TABLE 125 lkpProcessType (db structure view)

| Column Name | Data Type | Length |
|---|---|---|
| id | int | 4 |
| DocType | varchar | 20 |
| Description | varchar | 250 |
| WaitingForApprovalStatusID | int | 4 |
| ApprovedStatusID | int | 4 |
| DeclinedStatusID | int | 4 |
| TableName | varchar | 128 |
| IdFieldName | varchar | 128 |
| StatusFieldName | varchar | 128 |
| ApprovalDateFieldName | varchar | 128 |
| DeclineDateFieldName | varchar | 128 |
| ProcessingMatrix | char | 1 |
| ApprovalSortPriority | int | 4 |

In FIG. 4, an SCE qualifiers insurance table 402, an insurance type table 404, an insurance coverage type table 406, a process type table 408, an SCE qualifiers business table 410, and a current status table 412 are shown. The Tables 402-412 are interrelated as indicated in FIG. 4. Table 120 illustrates sample data that can be stored in the insurance type table 404. Table 121 illustrates sample data that can be stored in the table 406. Table 122 illustrates sample data that can be stored in the table 402. Table 124 illustrates sample data that can be stored in the table 410, Table 124 lists sample values of SCE business qualifiers that can be stored in table 410. Table 125 lists sample data that can be stored in the table 408.

The SCE qualifiers insurance table 402 includes various data regarding insurance requirements placed upon the SCE by the buyer. The insurance type table 404 includes various information relative to the type of insurance required of the SCE. In similar fashion, the insurance coverage type table 406 includes various data relative to the type of insurance coverage required of the SCE.

Figure 5A:
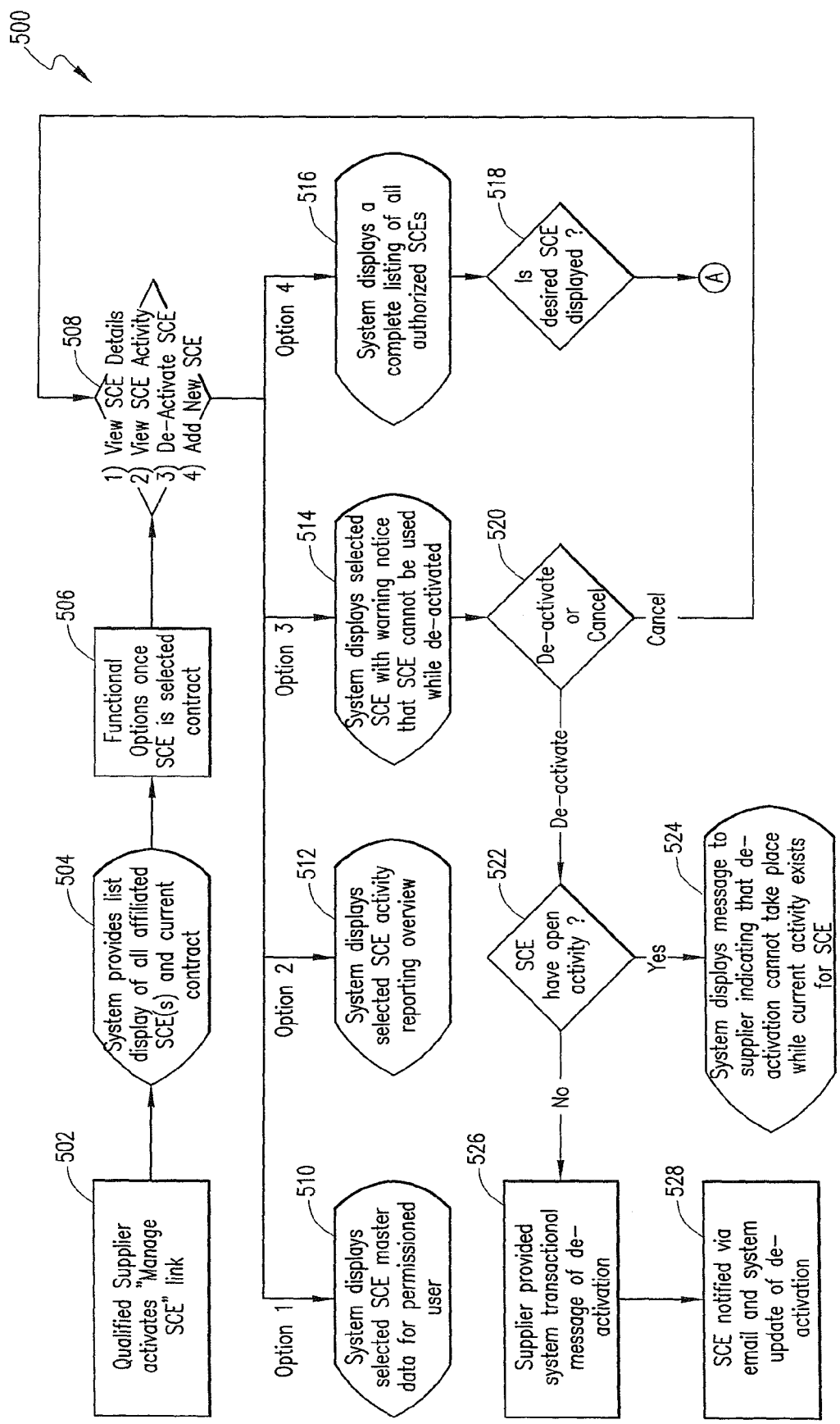
FIGS. 5A-B show an exemplary high-level flow chart that illustrates how an SCE may be enabled and associated with a primary supplier.
Figure 5B:
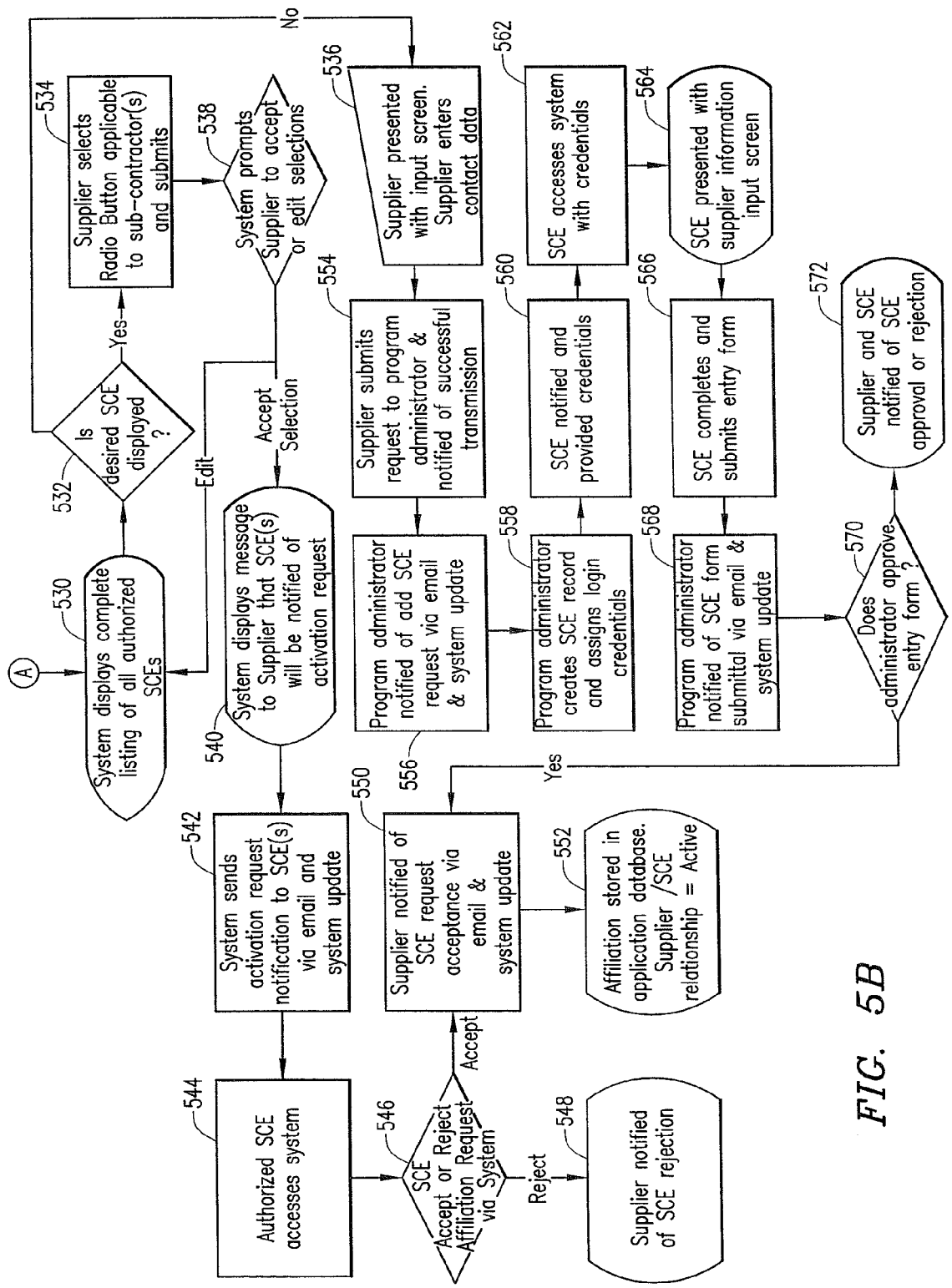

FIGS. 5A-B show an exemplary high-level flow chart that illustrates how an SCE may be enabled and associated with a primary supplier. In an SCE enablement process, buyer configurations may be utilized in conjunction with work flow to govern a controlled SCE load flow. In an SCE load flow 500 as illustrated in FIGS. 5A-B, various participating entities may gain visibility and ownership of various process segments applicable to themselves.

The flow 500 begins at step 502. At step 502, a qualified supplier activates a Manage SCE link from a supplier home page. At step 504, a list display of all affiliated SCEs and their current status is provided. At step 506, functional options appear in response to selection of a particular SCE. At step 508, four exemplary options are presented as follows: 1) view SCE details; 2) view SCE activity; 3) de-activate SCE; and 4) add new SCE.

From step 508, if option 1) is selected, at step 510, selected SCE master data for permissioned users of the buyer are displayed. In embodiments of the invention, the data displayed at step 510 is read-only data. If, at step 508, option 2) is selected, at step 512, selected SCE activity reporting overview data are displayed. In embodiments of invention, the data displayed at step 512 is read-only data. If, at step 508, option 3) is selected, at step 514, selected SCE data, with a warning notice that the SCE cannot be used while de-activated, are displayed. If, at step 508, option 4) is selected, at step 516, a listing of authorized SCEs is displayed. From step 514, execution proceeds to step 520. At step 520, de-activation of the SCE or cancellation of de-activation of the SCE may be chosen.

From step 520, if cancellation of the de-activation of the SCE is chosen, execution returns to step 508. If de-activation of the SCE is chosen, execution proceeds to step 522. At step 522, a determination is made whether the SCE to be de-activated has open activity. If, at step 522, it is determined that the SCE to be de-activated has open activity, execution proceeds to step 524. At step 524, a message is displayed to the supplier indicating that de-activation cannot take place while current activity exists for the SCE to be de-activated.

If, at step 522, it is not determined that the SCE to be de-activated has open activity, execution proceeds to step 526. At step 526, the supplier is provided a system transactional message of de-activation. From step 526, execution proceeds to step 528. At step 528, the SCE is notified via e-mail and the system is updated regarding the de-activation of the SCE.

From step 516, execution proceeds to step 518. At step 518, a determination is made whether the desired SCE is being displayed. If it is determined at step 518 that the desired SCE is being displayed, execution proceeds to step 530. At step 530, a listing of authorized SCEs is displayed. Those of ordinary skill in the art will appreciate that business considerations may dictate that a complete listing of all authorized SCEs not be displayed to certain entities utilizing the system.

At step 532, a determination is made whether a desired SCE is being displayed. If so determined, execution proceeds to step 534. If, at step 532, it is not determined that the desired SCE is being displayed, execution proceeds to step 536. At step 534, the supplier selects the SCE(s) and submits the selection. At step 538, the supplier is prompted to accept or edit selections made by the supplier at step 534. If the supplier accepts the selections made in step 534, execution proceeds to step 540. If the supplier edits these selections, execution returns to step 530.

At step 540, a message is displayed to the supplier that the SCE(s) will be notified of the supplier's activation request. At step 542, the activation request notification is sent to the SCE(s) via e-mail and the system is updated to reflect the activation request by the primary supplier to the SCE(s). It will be appreciated by those having ordinary skill in the art that the activation of an SCE/supplier relationship is not a unilateral mandate from the supplier to the SCE, but rather must be approved by both the SCE and primary supplier. At step 544, the SCE accesses the system. At step 546, the SCE may accept or reject the affiliation request. If, at step 546, the SCE rejects the affiliation request, execution proceeds to step 548. At step 548, the supplier is notified of the rejection of the affiliation request by the SCE.

If, at step 546, the SCE accepts the affiliation request, execution proceeds to step 550. At step 550, the supplier is notified of the SCE acceptance of the request via e-mail and the system is updated to reflect the SCE acceptance. At step 552, the affiliation is stored in an application database and the supplier/SCE relationship is designated an active relationship. Although not explicitly illustrated in FIGS. 5A-5B, the process of affiliating a supplier and an SCE can include restraints placed on the SCE/supplier relationship that are similar to those constraints discussed above with respect to the primary supplier/buyer relationship including, for example, commodity or geographic constraints upon goods and/or services provided by the SCE to the primary supplier.

As noted above, if the desired SCE is not determined to have been displayed at step 532, execution proceeds to step 536. At step 536, the supplier is presented with an input screen and enters pertinent contact data. From step 536, execution proceeds to step 554. At step 554, the supplier submits a request to a program administrator and is notified of successful transmission thereof. At step 556, the program administrator is notified of the Add-SCE request via e-mail and the system is updated. At step 558, the program administrator creates an SCE record and assigns appropriate log-in credentials. At step 560, the SCE is notified of the log-in credentials provided at step 558. At step 562, the SCE accesses the system with the log-in credentials created at step 558.

At step 564, the SCE is presented with a supplier information input screen. At step 566, the SCE completes and submits an entry form. At step 568, the program administrator is notified of the SCE form submittal via e-mail and the system is updated. From step 568, execution proceeds to step 570. At step 570, a determination is made whether the administrator has approved of the entry form. If it is determined at step 570 that the administrator has approved the entry form, execution proceeds to step 574. At step 574 the SCE is activated on the system and standard notifications are provided to the SCE and the primary supplier regarding the activation of the SCE. From step 574, execution returns to step 532, at which step the desired SCE will now be displayed and the SCE affiliation process may commence. If, at step 570, the administrator has not approved the entry form, execution proceeds to step 572. At step 572, the supplier and the SCE are notified of the SCE approval rejection.

Since by definition SCEs are not directly solicited to respond to bids, it is only through primary supplier affiliation that business can be generated between the buyer and the SCE. In various embodiments of the invention, no relationships can be established without consent of all parties.

Examples of data structures for use in SCE enablement and association with a primary supplier are shown in Tables 126-129. The data structures are illustrated for simplicity as being organized in a table format, with each table including all the fields necessary for SCE enablement and association with a primary supplier. The tables are related in a hierarchical and/or relational manner, so that all of the necessary information for SCE enablement and association with a primary supplier can be accurately stored and accessed, as will be described in more detail below in connection with FIG. 6. However, it should be understood that other configurations can be included and that the system is not limited to the specific configurations listed in Tables 113-118 or FIG. 6.

TABLE 126 tblSCESetupRequest (db structure view)

| Column | Data Type | Length |
|---|---|---|
| PSVendorID | int | 4 |
| UserID | int | 4 |
| RequestDate | datetime | 8 |
| SCECandidateName | varchar | 100 |
| SCECandidateContactFN | varchar | 50 |
| SCECandidateContactLN | varchar | 50 |
| SCECandidateContactTitle | varchar | 50 |
| SCECandidateContactPhone | varchar | 50 |

TABLE 126-continued tblSCESetupRequest (db structure view)

| Column | Data Type | Length |
|---|---|---|
| SCECandidateContactEmail | varchar | 50 |
| SCEApprovalStatus | int | 4 |
| RecordID | int | 4 |

TABLE 127 tblSCEAffiliationRequest (db structure view)

| Column Name | Data Type | Length |
|---|---|---|
| PSVendorID | int | 4 |
| PSVendorContactID | int | 4 |
| RequestDate | datetime | 8 |
| SCECandidateVendorID | int | 4 |
| SCEApprovalStatus | int | 4 |
| UserTypeReviewerID | int | 4 |
| ReviewerUserID | int | 4 |
| ReviewerDispostionDate | datetime | 8 |
| SCEStatusDispositionCode | int | 4 |
| RecordID | int | 4 |

TABLE 128 lkpSCERequestStatusDisposition (db structure view)

| Column Name | Data Type | Length |
|---|---|---|
| SCEStatusDispositionCode | int | 4 |
| SCEStatusDispositionDesc | varchar | 25 |

TABLE 129 tblSCEMapPrimarySupplier (db structure view)

| Column Name | Data Type | Length |
|---|---|---|
| SCEVendorID | int | 4 |
| PrimarySupplierID | int | 4 |
| CurrentStatusID | int | 4 |
| SCEMapRecord | int | 4 |

Tables 126-129 illustrate sample SCE enablement data that can be stored in database tables. The SCE enablement data shown in Table 126 can be stored in an SCE setup request Table 608. The SCE enablement data in Table 127 can be stored in an SCE affiliation request Table 604. The SCE enablement data in Table 128 can be stored in an SCE request status disposition Table 612. The SCE enablement data in Table 129 can be stored in an SCE map primary supplier Table 610.

Figure 6:
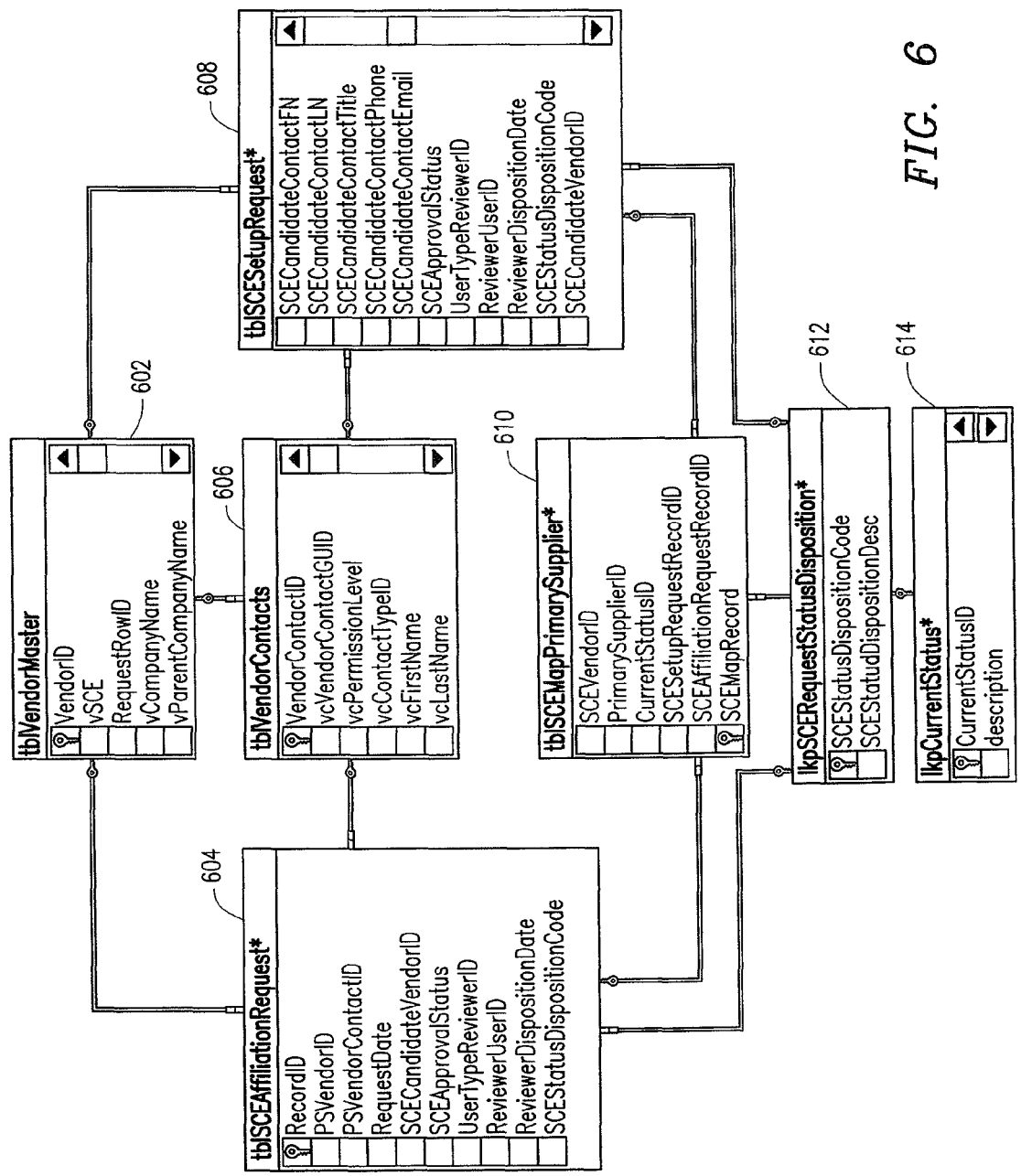
FIG. 6 represents a technical database model/schema that may be used in connection with the exemplary SCE enablement process of FIGS. 5A-B.

FIG. 6 represents a technical database model/schema that may be used in connection with the exemplary SCE enablement process as defined in FIGS. 5A-B. In FIG. 6, a database schema for SCE enablement includes a primary supplier master Table 602, the SCE affiliation request Table 604, a primary supplier contact Table 606, the SCE setup request Table 608, the SCE map primary supplier Table 610, the SCE request status disposition Table 612, and an SCE current status Table 614. Interrelationships between various of the Tables 602-614 are as illustrated in FIG. 6.

Figure 7:
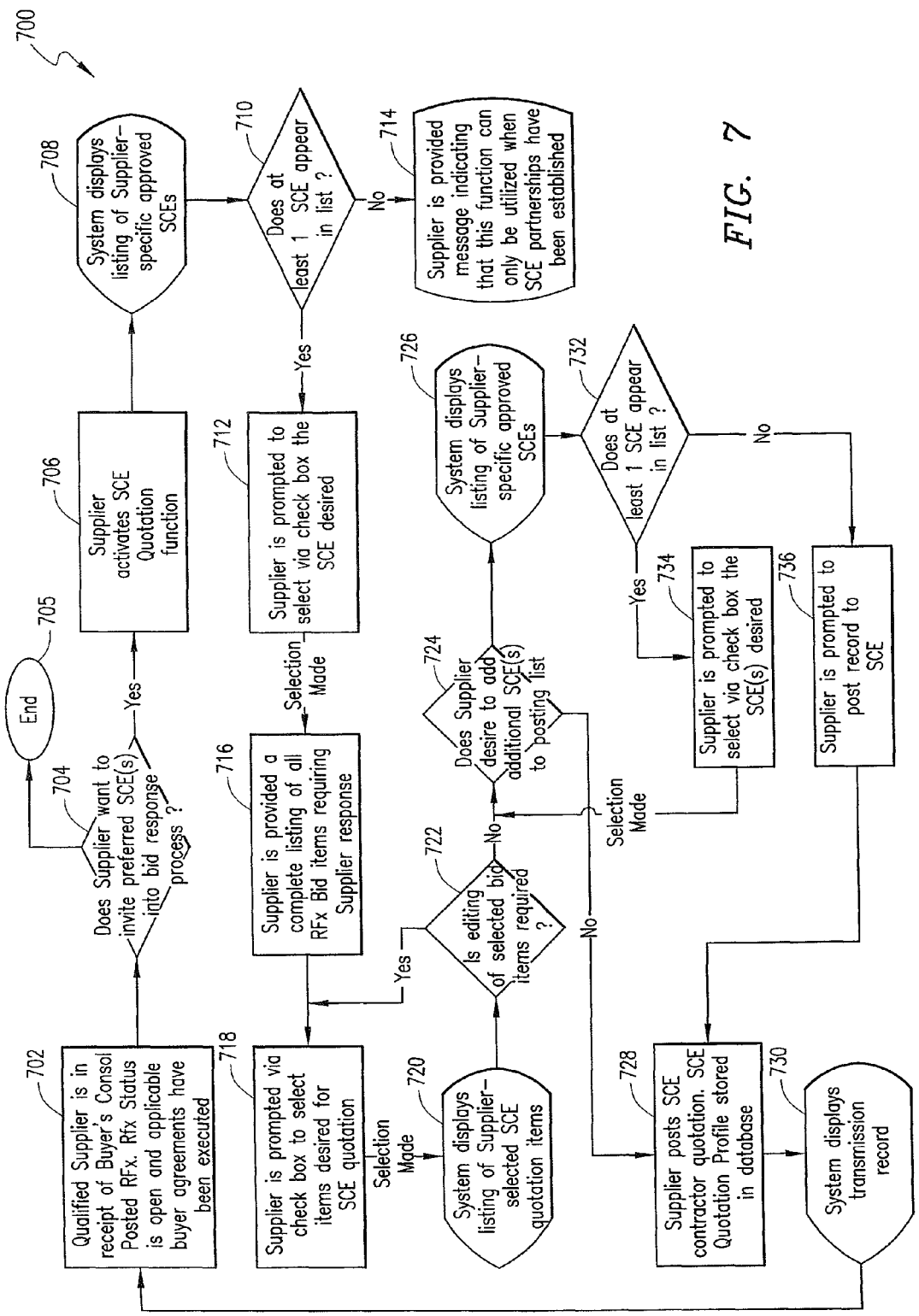
FIG. 7 is an exemplary flow chart of how a primary supplier may select and include the SCE(s) into a buyer bid request.

FIG. 7 is an exemplary flow chart of how a primary supplier may select and include SCE(s) into a buyer bid request. A flow 700 begins at step 702, at which step a qualified supplier is in receipt of a buyer's consolidated posted RFx. A prerequisite buyer process of creating the consolidated posted RFx is described in more detail in U.S. patent application Ser. No. 10/262,487.

At step 704, a determination is made whether the primary supplier wants to invite affiliated SCE(s) into the bid response process. If it is determined that the supplier does want to invite affiliated SCE(s) into the bid response process, execution proceeds to step 706. At step 706, the supplier activates an SCE quotation function. If, at step 704, it is not determined that the supplier wants to invite the affiliated SCE(s) into the bid response process, execution proceeds to step 705, at which step execution ends.

From step 706, execution proceeds to step 708, at which step the system displays a listing of supplier affiliated SCE(s) that are in compliance with the buyer qualification criteria. At step 710, a determination is made whether at least one SCE appears in the list. If it is so determined at step 710, at step 712, the supplier is prompted to select the desired SCE. If, at step 710, it is not determined that at least one SCE appears in the list, execution proceeds to step 714. At step 714, the supplier is provided with a message indicating that the functionality of the flow 700 may only be utilized when SCE affiliations are active and the SCE is in compliance with buyer qualification criteria.

From step 712, following selection by the supplier of the desired SCE, execution proceeds to step 716. At step 716, the supplier is provided a listing of RFx bid items requiring a supplier response. At step 718, the supplier is prompted to select items desired for SCE quotation. From step 718, execution proceeds to step 720, in response to selection by the supplier of the desired items. At step 720, a listing of supplier-selected SCE quotation items is displayed. At step 722, a determination is made whether editing of selected bid items is required. If, at step 722, it is so determined, execution returns to step 718. If, at step 722, it is not so determined, execution proceeds to step 724.

At step 724, determination is made whether editing of SCE(s) is required. If, at step 724, it is so determined, functionality to edit SCE(s) is activated and execution proceeds to step 726. If, at step 724, it is not determined that the supplier desires to add additional SCE(s) to the posting list, a posting function is activated and execution proceeds to step 728.

At step 726, a listing of other SCEs not previously selected by the supplier is displayed. At step 732, a determination is made whether at least one SCE appears in the list. If it is so determined, execution proceeds to step 734. At step 734, the supplier is prompted to select the SCE(s) desired. From step 734, in response to selections made by the supplier, execution returns to step 724. If, at step 732, it is not determined that at least one SCE appears in the list, execution proceeds to step 736, at which step the supplier is prompted to post a record to the SCE. From step 736, the posting function is activated and execution proceeds to step 728.

As noted above, execution proceeds from step 724 to step 728 in response to there being no determination that the supplier desires to edit SCE(s) on the posting list. At step 728, the supplier posts an SCE quotation and an SCE quotation profile is stored in a database. From step 728, execution proceeds to step 730. At step 730, the system displays a transmission record. From step 730, execution returns to step 702.

Although not explicitly depicted in FIG. 7, a primary supplier may create standard SCE quotation profiles that systematically match SCE(s) with specific bid response elements. For instance, a primary supplier could configure a finite group of SCE(s) for human capital engineering services, so that each time the primary supplier receives a bid in which that particular bid response element is required, the system automatically generates a specific SCE quotation profile for the configured SCE(s). A primary supplier may be enabled to create variable SCE quotation profiles that include a combination of both bid items and selected SCE(s).

FIG. 7 indicates that SCE quotation profile items are limited to those contained in the Buyer RFx Bid. However, in some embodiments of the invention, the SCE quotation profile may be expanded to include dynamic items created by the primary supplier. The SCE quotation posting process described with respect to FIG. 7 is similar to a buyer posting an RFx to a primary supplier, as previously disclosed in U.S. patent application Ser. No. 10/262,487.

Examples of data structures for use in selection and inclusion of SCE(s) into a buyer bid request are shown in Tables 130-132. The data structures are illustrated for simplicity as being organized in a table format, with each table including all the fields necessary for selection and inclusion of SCE(s) into the buyer bid request. The tables are related in a hierarchical and/or relational manner, so that all of the necessary information for SCE selection and inclusion can be accurately stored and accessed. However, it should be understood that other configurations can be included and that the system is not limited to the specific configurations listed in Table 130-132.

TABLE 130 tblSCEQuoteProfiles (db structure view)

| Column Name | Data Type | Length |
| --- | --- | --- |
| vResponse_ID | int | 4 |
| vUser_ID | int | 4 |
| CurrentStatus_ID | int | 4 |
| DateCreated | datetime | 8 |
| SCEProfileID | int | 4 |

TABLE 131 tblSCEQuoteProfilesPost (db structure view)

| Column Name | Data Type | Length |
| --- | --- | --- |
| SCEProfileID | int | 4 |
| SCEPrimary supplierID | int | 4 |
| Post_Date | datetime | 8 |
| PostingRecordID | int | 4 |

TABLE 132 tblSCEQuoteProfilesItems (db structure view)

| Column Name | Data Type | Length |
| --- | --- | --- |
| SCEProfileID | int | 4 |
| RFX_Item_ID | int | 4 |
| RecordID | int | 4 |

Tables 130-132 are exemplary SCE tables used in connection with the flow 700 of FIG. 7. Tables 130-132 are used for primary storage of bid items. Table 130 includes columns for a response ID, a user ID, a current status ID, a date created, and a profile ID. Table 131 acts as a posting record that contains the primary supplier ID, a profile ID, the post date and the posting record. Table 132 may be used to facilitate automatic upload in the event that the SCE quotation response is acceptable to the primary supplier.

Figure 8:
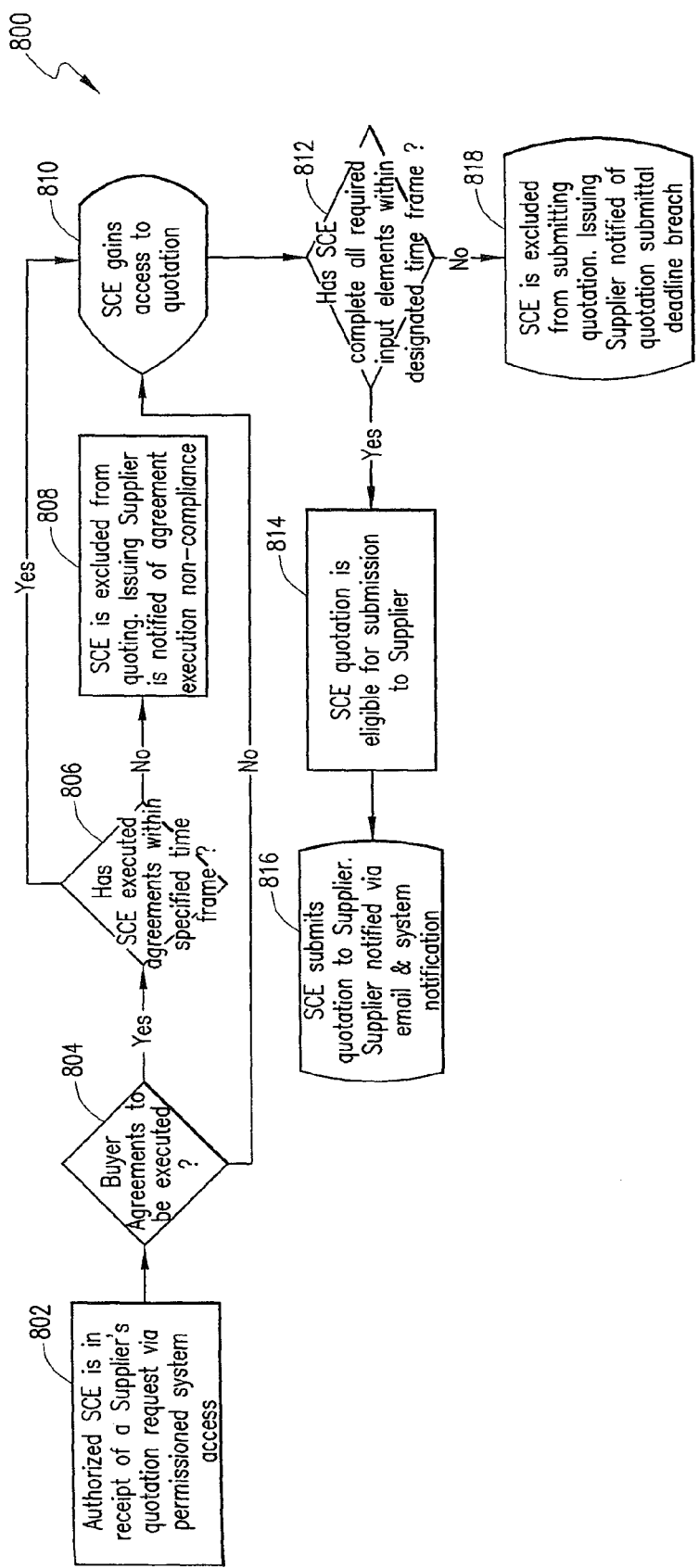
FIG. 8 is an exemplary flow chart of how an SCE may handle a primary-supplier-issued daisy-chain quote.

FIG. 8 is an exemplary flow chart of how an SCE may handle a primary-supplier-issued daisy-chain quotation. In various embodiments of the invention, similar functionality afforded to primary suppliers in bid-response processing as disclosed in U.S. patent application Ser. No. 10/262,487 may be granted to SCEs. SCE quotation processing as illustrated in FIG. 8 follows similar logic to that utilized for primary suppliers as described in U.S. patent application Ser. No. 10/262,487. In FIG. 8, the SCEs' view of the quotation profile is limited to items selected by primary suppliers; however, any RFx bid element may be displayed to the SCE if the primary supplier deems it pertinent to the SCE response.

In FIG. 8, a flow 800 begins at step 802. At step 802, an SCE is in receipt of a supplier's quotation request via permissioned system access. At step 804, a determination is made whether buyer agreements need to be executed. For example, a buyer may require that a primary supplier execute a nondisclosure agreement as a condition of proceeding with the bid process. In similar fashion, the primary supplier required to execute the nondisclosure agreement may require the SCE(s) affiliated with the primary supplier that are subject to the daisy-chain quotation process to also to execute the nondisclosure agreement. If it is so determined at step 804, execution proceeds to step 806. At step 806, a determination is made whether the SCE has executed the required agreements within a specified timeframe. If it is determined, at step 806, that the SCE has executed the agreements within the specified timeframe, execution proceeds to step 810. At step 810, the SCE gains access to the quotation. If, at step 804, it is not determined that buyer agreements need to executed, execution proceeds to step 810. At step 808, if it is not determined that the SCE has executed the agreements within the specified timeframe, the SCE is excluded from quoting and the supplier is notified of agreement-execution non-compliance by the SCE.

From step 810, execution proceeds to step 812. At step 812, a determination is made whether the SCE has completed all required input elements within a designated timeframe. If, at step 812, it is determined that the SCE has completed all of the required input elements within the designated timeframe, execution proceeds to step 814. At step 814, the SCE quotation is deemed eligible for submission to the supplier. At step 816, the SCE submits the SCE quotation to the supplier and the supplier is notified via e-mail and system notification.

If, at step 812, it is not determined that the SCE has completed all required input elements within the designated timeframe, execution proceeds to step 818. At step 818, the SCE is excluded from submitting the quotation and the issuing supplier is notified of quotation-submittal-deadline breach.

Examples of data structures for use in SCE handling of a primary-supplier-issued daisy-chain quote are shown in Tables 133-142. The data structures are illustrated for simplicity as being organized in a table format, with each table including all the fields necessary for SCE handling of the primary-supplier-issued daisy-chain quote. The tables are related in a hierarchical and/or relational manner, so that all of the necessary information for SCE configuration can be accurately stored and accessed. However, it should be understood that other configurations can be included and that the system is not limited to the specific configurations listed in Tables 133-142.

TABLE 133 tblSCEQuoteResp (db structure view)

| Column Name | Data Type | Length |
|---|---|---|
| SCEPostingRecordID | int | 4 |
| SCEQuoteStatusID | int | 4 |
| SCEQuoteCreateDate | datetime | 8 |
| SCEQuoteSubmitDate | datetime | 8 |
| SCEQuoteResponseID | int | 4 |

TABLE 134 tblSCEQuoteRespMain (db structure view)

| Column Name | Data Type | Length |
|---|---|---|
| SCEQuoteResponseID | int | 4 |
| RFX_Item_ID | int | 4 |
| Required_Item | char | 1 |
| SCE_Response | varchar | 5000 |
| Record_Create_Date | datetime | 8 |
| Last_Save_Date | datetime | 8 |
| RFX_Section_id | int | 4 |
| RFX_Category_id | int | 4 |
| RFX_Response_Complete | char | 10 |
| RFX_Grade | char | 1 |
| RFX_Points | int | 4 |

TABLE 135 tblSCEQuoteRespMaterials (db structure view)

| Column Name | Data Type | Length |
|---|---|---|
| SCEQuoteResponseMainID | int | 4 |
| SCEProfileItemID | int | 4 |
| RFX_Item_ID | int | 4 |
| Identity_Key | int | 4 |
| RFXRespMaterialRowID | int | 4 |
| Material_Category | varchar | 100 |
| Material_Name | varchar | 100 |
| Material_Description | varchar | 1000 |
| Material_Manufacturer | varchar | 100 |
| Unit_Count | int | 4 |
| Unit_Cost | money | 8 |
| Line_Item_Cost | money | 8 |
| Client_Comments | varchar | 1000 |
| SCE_User_ID | int | 4 |
| SCE_User_Contact_ID | int | 4 |
| Record_Create_Date | datetime | 8 |
| Last_Edit_Date | datetime | 8 |
| SCEMatRecordID | int | 4 |

TABLE 136 tblSCEQuoteRespDeliverables (db structure view)

| Column Name | Data Type | Length |
|---|---|---|
| SCEQuoteResponseMainID | int | 4 |
| SCEProfileItemID | int | 4 |
| RFX_Item_ID | int | 4 |
| Identity_Key | int | 4 |
| RFXRespDeliverableRowID | int | 4 |
| DeliverableName | varchar | 50 |
| DeliverableDescription | varchar | 1000 |
| AnticipatedCompletionDate | datetime | 8 |
| BillableDeliverable | char | 1 |
| PaymentAmount | money | 8 |
| PartialPaymentAuthorized | char | 1 |
| Client_Comments | varchar | 1000 |
| SCE_User_ID | int | 4 |
| SCE_User_Contact_ID | int | 4 |

TABLE 136-continued tblSCEQuoteRespDeliverables (db structure view)

| Column Name | Data Type | Length |
|---|---|---|
| Record_Create_Date | datetime | 8 |
| Last_Edit_Date | datetime | 8 |
| SCEDelRecordID | int | 4 |

TABLE 137 tblSCEQuoteRespUnits (db structure view)

| Column Name | Data Type | Length |
|---|---|---|
| SCEQuoteResponseMainID | int | 4 |
| SCEProfileItemID | int | 4 |
| RFX_Item_ID | int | 4 |
| Identity_Key | int | 4 |
| RFXRespUnitRowID | int | 4 |
| UnitName | varchar | 50 |
| UnitCompletionDescription | varchar | 1000 |
| UnitCount | float | 8 |
| UnitCost | float | 8 |
| LineUnitCost | float | 8 |
| UnitsAuthorized | char | 1 |
| BillableUnits | char | 1 |
| PartialPaymentAuthorized | char | 1 |
| Client_Comments | varchar | 1000 |
| SCE_User_ID | int | 4 |
| SCE_User_Contact_ID | int | 4 |
| Record_Create_Date | datetime | 8 |
| Last_Edit_Date | datetime | 8 |
| SCEUnitRecordID | int | 4 |

TABLE 138 tblSCEQuoteRespProjExp (db structure view)

| Column Name | Data Type | Length |
|---|---|---|
| SCEQuoteResponseMainID | int | 4 |
| SCEProfileItemID | int | 4 |
| RFX_Item_ID | int | 4 |
| Identity_Key | int | 4 |
| RFXRespProjExpID | int | 4 |
| ProjectExpenseName | varchar | 50 |
| ProjectExpenseDescription | varchar | 1000 |
| BillableExpense | char | 1 |
| MaxAmount | money | 8 |
| PartialPaymentAuthorized | char | 1 |
| CurrencyID | int | 4 |
| SCE_User_ID | int | 4 |
| SCE_User_Contact_ID | int | 4 |
| Record_Create_Date | datetime | 8 |
| Last_Edit_Date | datetime | 8 |
| SCEProjExpID | int | 4 |

TABLE 139 tblSCEQuoteRespStaffProfiles (db structure view)

| Column Name | Data Type | Length |
|---|---|---|
| SCEQuoteResponseMainID | int | 4 |
| SCEProfileItemID | int | 4 |
| RFX_Item_ID | int | 4 |
| RFXStaffingProfileID | int | 4 |
| pAnticipatedHours | int | 4 |
| pQuantity | int | 4 |
| pBilling | money | 8 |
| Client_Comments | varchar | 1000 |
| SCE_User_ID | int | 4 |
| SCE_User_Contact_ID | int | 4 |

TABLE 139-continued tblSCEQuoteRespStaffProfiles (db structure view)

| Column Name | Data Type | Length |
|---|---|---|
| Record_Create_Date | datetime | 8 |
| Last_Edit_Date | datetime | 8 |
| SCEStaffingRecordID | int | 4 |

TABLE 140 tblSCEQuoteRespStaffProfilePrice (db structure view)

| Column Name | Data Type | Length |
|---|---|---|
| SCEStaffingRecordID | int | 4 |
| SCEStaffingProfilePriceID | int | 4 |
| Anticipated_Hours | float | 8 |
| Bill_Rate | money | 8 |
| Anticipated_Billing | money | 8 |
| RecordCreateDate | datetime | 8 |
| RecordID | int | 4 |

TABLE 141 tblSCEQuoteRespStaffProfileExpense (db structure view)

| Column Name | Data Type | Length |
|---|---|---|
| SCEStaffingRecordID | int | 4 |
| ContractorExpenseTypeID | int | 4 |
| ContractorExpenseTypeMax | money | 8 |
| SCEContractorExpenseID | int | 4 |
| RecordCreateDate | datetime | 8 |
| RecordID | int | 4 |

TABLE 142 tblSCEQuoteRespPhasing (db structure view)

| Column Name | Data Type | Length |
|---|---|---|
| SCEQuoteResponseMainID | int | 4 |
| SCEProfileItemID | int | 4 |
| RFX_Item_ID | int | 4 |
| RFXRespPhaseID | int | 4 |
| Project_Phase_Number | int | 4 |
| Project_Phase_Description | varchar | 3200 |
| Start_Date | datetime | 8 |
| End_Date | datetime | 8 |
| Total_Days | numeric | 9 |
| Client_Comments | varchar | 1000 |
| SCE_User_ID | int | 4 |
| SCE_User_Contact_ID | int | 4 |
| Record_Create_Date | datetime | 8 |
| Last_Edit_Date | datetime | 8 |
| SCEPhaseRecordID | int | 4 |

Tables 133-142 are exemplary SCE tables used in connection with the flow 800 shown in FIG. 8. Tables 133-142 are analogous to primary supplier tables used in a primary supplier-primary-supplier relationship as disclosed in related applications. Although the data model of Tables 133-142 is similar to the data model disclosed for the primary supplier tables used in the primary supplier-primary-supplier relationship in prior applications, various differences will be come apparent to those skilled in the art, including a parsing function, which will be discussed in more detail below.

Figure 9:
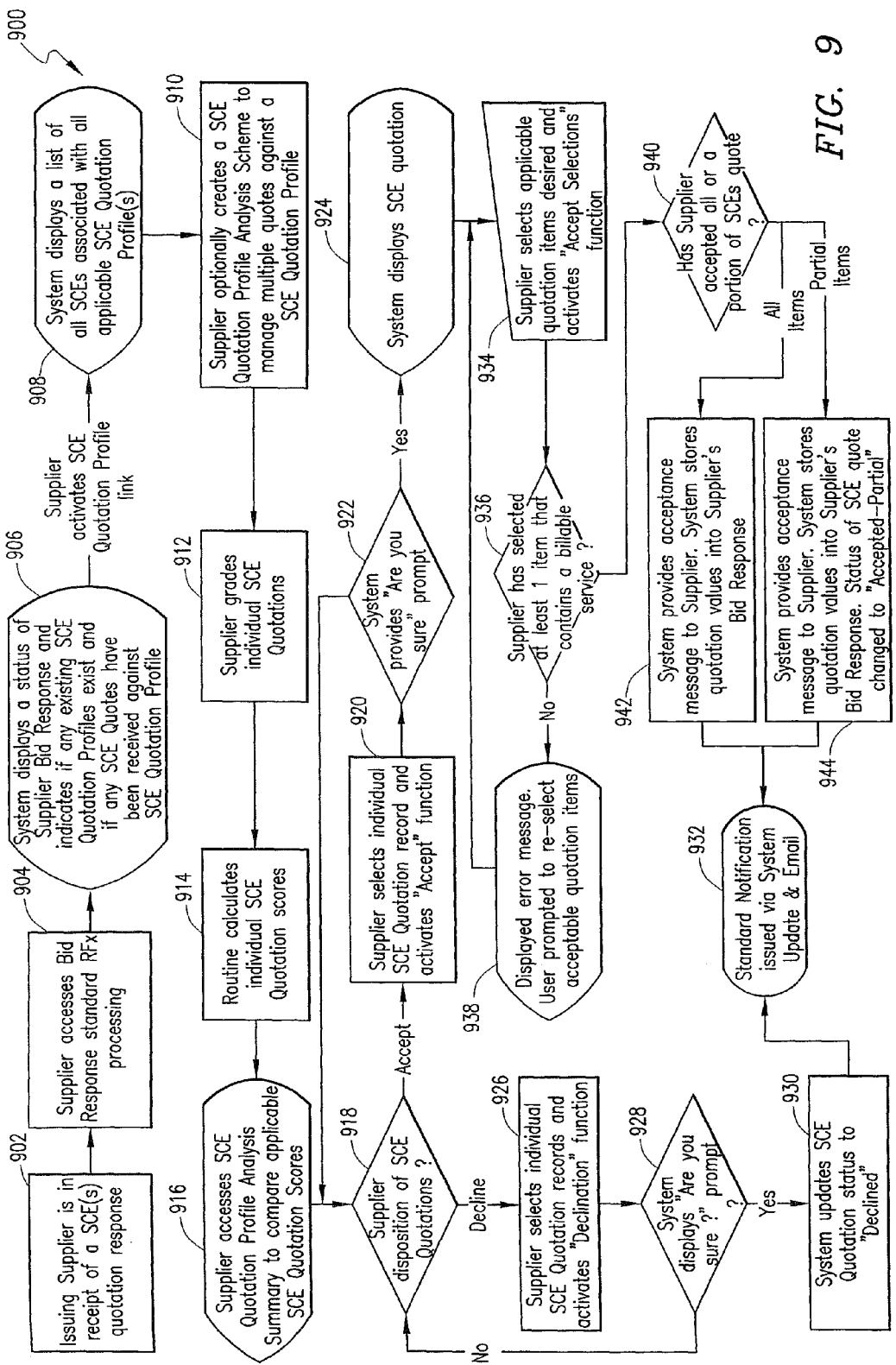
FIG. 9 is an exemplary flow chart of how a primary supplier may handle an SCE daisy-chain-quote response.

FIG. 9 is an exemplary flow chart of how a primary supplier may handle an SCE daisy-chain-quote response. SCE quotation response selection and integration back into the primary supplier's bid response are illustrated in FIG. 9. In various embodiments of the invention, a database schema and bid-response-item parsing routine permit the primary supplier to select desired SCE quotation elements and integrate the selected SCE quotation elements back into their proper place holder(s). FIG. 9 does not explicitly illustrate an ability of the SCE to accept or decline a primary supplier's SCE quotation acceptance; however, this ability is easily configurable in accordance with principles of the invention.

Turning now to FIG. 9, a flow 900 begins at step 902. At step 902, the supplier is in receipt of SCE(s) quotation response. At step 904, the supplier accesses the bid response via standard RFx processing. At step 906, the status of the supplier bid response is displayed and it is indicated if any existing quotation profiles exist and if any SCE quotes have been received against the SCE quotation profile. Responsive to step 906 and supplier activation of an SCE quotation profile link, execution proceeds to step 908. At step 908, a list of SCEs associated with applicable SCE quotation profile(s) is displayed.

At step 910, the supplier optionally creates an SCE quotation profile analysis scheme to manage multiple quotes against a single SCE quotation profile. In similar fashion to the way that a buyer may variably wait suppler bid response items, the supplier may variably wait bid response items from the SCE in order to facilitate analysis and potential award. At step 912, the supplier grades individual SCE quotations. At step 914, individual SCE quotation scores are calculated. At step 916, the supplier accesses an SCE quotation profile analysis summary to compare applicable SCE quotation scores.

At step 918, a determination is made whether the supplier has accepted or declined the SCE quotation. If, at step 918, the supplier accepts the SCE quotations, execution proceeds to step 920. At step 920, the supplier selects an individual SCE quotation record and activates an Accept function. At step 922, an Are You Sure? prompt is provided. Responsive to an answer of Yes, execution proceeds to step 924. Responsive to a No answer, execution returns to step 918.

At step 924, the SCE quotation is displayed. In various embodiments of the invention, all items applicable to the supplier's bid response have an associated checkbox and the checkbox(es) are inactive for any items in which the bid response item is already encumbered by an accepted alternative SCE. At step 934, the supplier selects applicable quotation items desired and activates an Accept Selections function. At step 936, a determination is made whether the supplier has selected at least one item that contains a billable service or material. If it is not so determined at step 936, execution proceeds to step 938. At step 938, an error message is displayed and a prompt provided to reselect acceptable quotation items. From step 938, execution returns to step 934.

At step 918, if the supplier declines the SCE quotation, execution proceeds to step 926. At step 926, individual SCE quotation records are selected and a Declination function is activated. In various embodiments of the invention, the individual SCE quotation records may be selected via corresponding checkboxes. At step 928, an Are You Sure? prompt is displayed. Responsive to an answer of Yes, execution proceeds to step 930. At step 930, the SCE quotation status is updated to Declined. Responsive to an answer of No execution returns from step 928 to step 918.

Returning to a discussion of step 936, if it is determined at step 936 that the supplier has selected at least one item that contains a billable service or material, execution proceeds to step 940. At step 940, a determination is made whether the supplier has accepted all or a portion of the SCE's quote. If, at step 940, all items of the SCE quote have been accepted by the supplier, execution proceeds to step 942. At step 942, an Acceptance message is provided to the supplier and quotation values are stored into the supplier's bid response. If, at step 940, the supplier has accepted only a portion of the SCE quote, execution proceeds to step 944. At step 944, an Acceptance message is provided to the supplier and quotation values are stored into the supplier bid response. In addition, the status of the SCE quote is changed to Accepted-Partial. From both steps 942 and 944, execution proceeds to step 932. From step 930, execution proceeds to step 932. At step 932, a standard notification is issued via a system update and e-mail.

Figure 10:
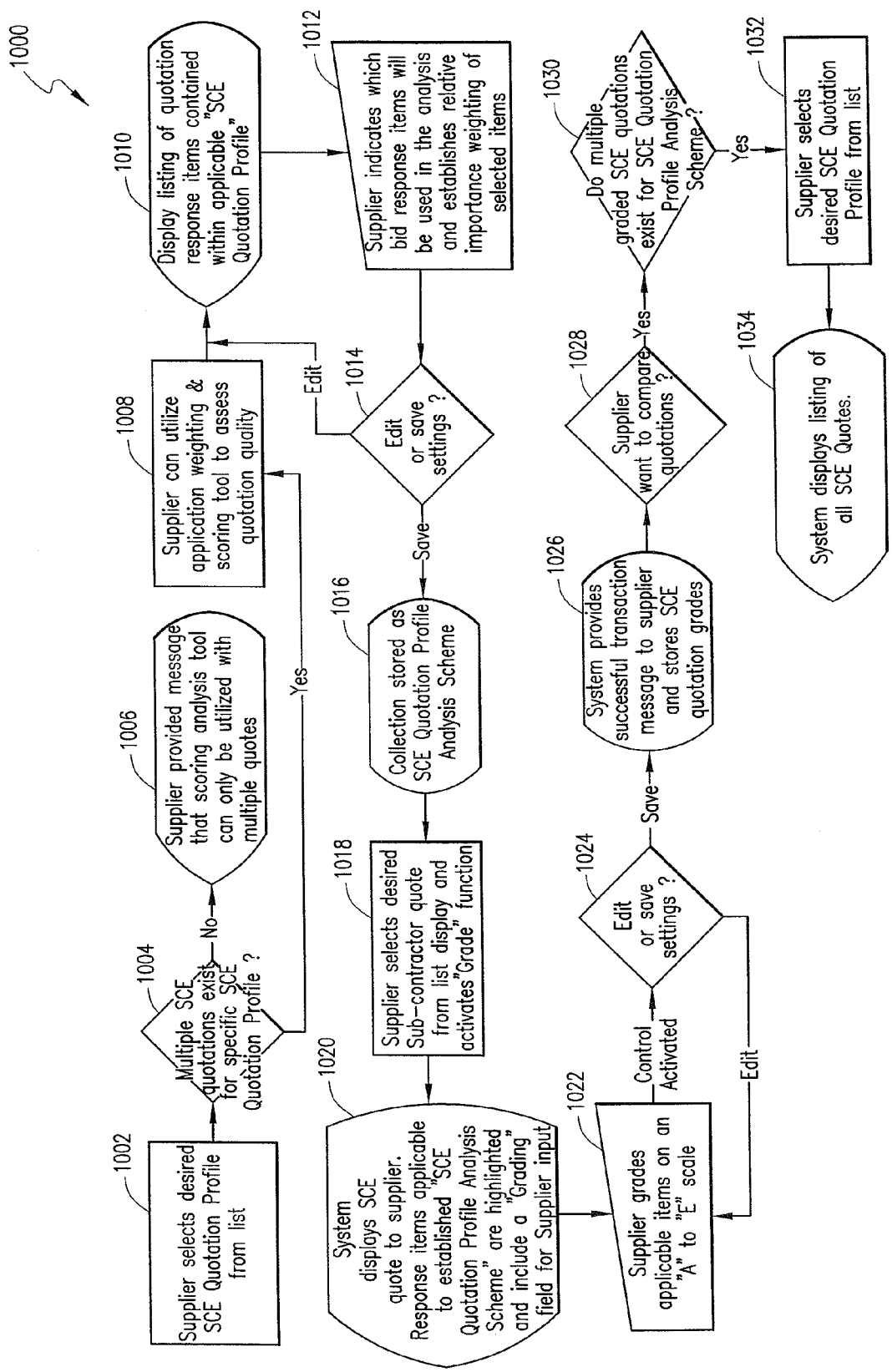
FIG. 10 is an exemplary flow chart of how a primary supplier may utilize a quotation analysis tool with respect to SCE-furnished quotations.

FIG. 10 is an exemplary flow chart of how a primary supplier may utilize a quotation analysis tool with respect to SCE-furnished quotations. FIG. 10 illustrates how primary suppliers, like buyers, may utilize bid-response scoring tools to facilitate the quotation process. FIG. 10 does not explicitly illustrate the ability to configure an automatic upload of the best SCE score to the primary supplier bid response; however, this ability may be configured in accordance with principles of the invention.

In FIG. 10, a flow 1000 begins at step 1002. At step 1002, the supplier selects a desired SCE quotation profile. In various embodiments of the invention, a list of SCE quotation profiles is displayed via radio buttons and the supplier may activate the desired SCE quotation profile by activating a link associated with a particular radio button. At step 1004, a determination is made whether multiple SCE quotations exist for the specific SCE quotation profile. If it is not so determined at step 1004, execution proceeds to step 1006. At step 1006, the supplier is provided a message that the scoring analysis tool may only be used with multiple quotes. If, at step 1004, it is determined that multiple quotations exist for the specific SCE quotation profile, execution proceeds to step 1008.

At step 1008, the supplier can utilize an application weighting and scoring tool to grade quotation quality. A grading tool that may be used by a buyer in grading bid responses by a primary supplier is described in detail in U.S. patent application Ser. No. 10/262,487. The grading tool described herein for assessing quotation quality of SCE bid responses may have similar functionality to that described in U.S. patent application Ser. No. 10/262,487. At step 1010, a listing of quotation response items contained within the applicable SCE quotation profile is displayed. At step 1012, the supplier indicates which bid response items will be used in the analysis and establishes the relative importance weighting of the selected items. At step 1014, the supplier is given a choice of whether to edit or save settings. If the supplier elects, at step 1014, to edit the settings, execution returns to step 1010. If, at step 1014, the supplier elects to save the settings, execution proceeds to step 1016.

At step 1016, a collection including the bid response items to be used in the analysis is stored as an SCE quotation profile analysis scheme. In various embodiments of the invention, the applicable SCE quotations are available for grading and scoring analysis. At step 1018, the supplier selects the desired SCE quote(s) and activates a Grade function. For example, a grade of A-E could be used in which a permissioned supplier user grades the SCE(s) according to predefined criteria. At step 1020, an SCE quote is displayed to the supplier, response items applicable to the established SCE quotation profile analysis scheme are highlighted, and a grading field is included for supplier input. At step 1022, the supplier grades applicable items on, for example, an A-E scale In various embodiments of the invention, the ability to save settings is inactive until all required items have been graded by the supplier. Once all required items have been graded, the ability to control saving of settings is activated and execution proceeds to step 1024. At step 1024, the supplier is given the option to edit or save settings. If, at step 1024, the supplier elects to edit the settings, execution returns to step 1022. If, at step 1024, the supplier elects to save these settings, execution proceeds to step 1026.

At step 1026, a successful-transaction message is provided to the supplier and the SCE quotation grades are stored. At step 1028, the supplier is prompted regarding whether the supplier wants to compare SCE quotations. If the supplier elects, at step 1028, to compare SCE quotations, execution proceeds to step 1030.

At step 1030, a determination is made whether multiple graded SCE quotations exist for the SCE quotation profile analysis scheme. If it is determined that multiple graded SCE quotations exist for the SCE quotation profile analysis scheme, execution proceeds to step 1032. At step 1032, the supplier selects a desired SCE quotation profile. In various embodiments of the invention, a list may be displayed via one or more radio buttons that may be activated by the supplier as links.

At step 1034, a listing of all SCE quotes is displayed. In various embodiments of the invention, the display lists all scoreable items, applicable grade, designated item importance weighting, and total item score. Total quotation scores and statistical rankings may also be displayed in the form of a summary table. In addition to the above, the supplier may additionally access an analysis summary from a main RFx response menu.

Figure 11:
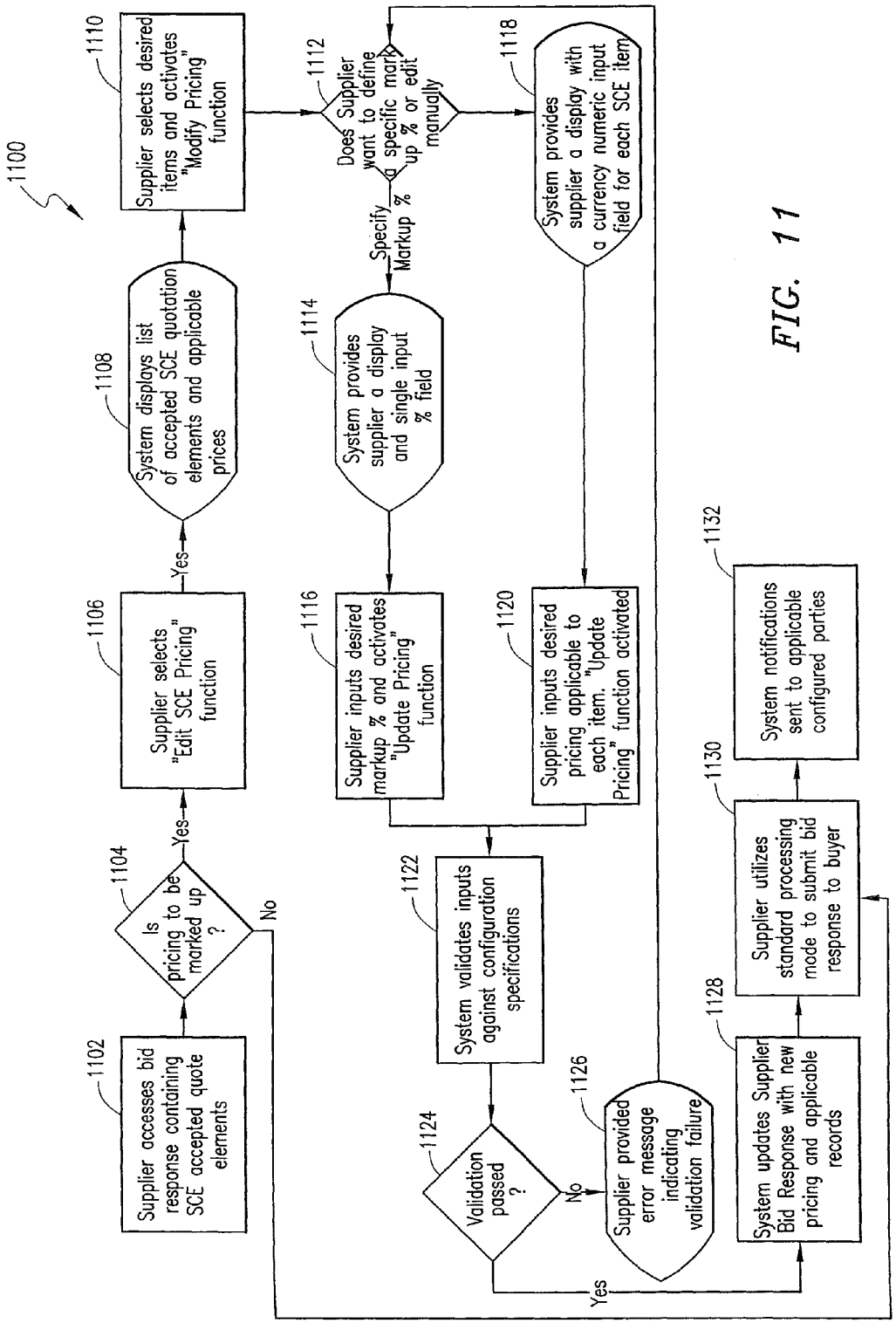
FIG. 11 is an exemplary flow chart of how a primary supplier may add marginal pricing to accepted SCE quotations.

FIG. 11 is an exemplary flow chart that illustrates how a primary supplier may add marginal pricing to accepted SCE quotations. In particular, FIG. 11 illustrates how primary suppliers may modify or mark up an SCE quotation to the buyer. In various embodiments of the invention, a buyer may configure or constrain a permitted mark-up. Previously-described data tables may be used to support the functionality illustrated in FIG. 11. For example, the SCE bid response tables shown in tables 130-142 feed into primary supplier bid response tables described in U.S. patent application Ser. No. 10/267,487.

In FIG. 11, a flow 1100 begins at step 1102. At step 1102, the supplier accesses the bid response containing the SCE accepted quote elements. At step 1104, the supplier may elect to mark up pricing of the accepted quote elements. If, at step 1104, the supplier elects to mark up prices, execution proceeds to step 1106. If the supplier elects not to mark up prices, execution proceeds to step 1130.

At step 1106, the supplier may select an edit-SCE-pricing function. Responsive to selection of the edit-SCE-pricing function, execution proceeds from step 1106 to step 1108. At step 1108, a list of accepted SCE quotation elements and applicable prices is displayed. At step 1110, the supplier selects desired items and activates a modify-pricing function. At step 1112, a determination is made whether the supplier wants to define a specific markup percentage or edit the markups manually. If, at step 1112, the supplier wants to define a specific markup percentage, execution proceeds to step 1114. If, at step 1112, the supplier wants to edit the markup manually, execution proceeds to 1118.

At step 1114, the supplier is provided a display and an input-percentage field. At step 1116, the supplier inputs the desired markup percentage and activates an update-pricing function. At step 1118, the supplier is provided a display with a currency numeric input field for each SCE item. At step 1120, the supplier inputs the desired pricing applicable to each item and the update-pricing function is activated.

From each of steps 1116 and 1120, execution proceeds to step 1122. At step 1122, the input received from either of steps 1116 and 1120 is evaluated against configuration specifications. For example, as illustrated in FIGS. 2A and 3A, a buyer may configure a maximal mark-up limit that may be input by a primary supplier. At step 1124, a determination is made whether validations performed at step 1122 have been passed or not. If, at step 1124, it is determined that the validations performed at step 1122 have not been passed, the supplier is provided an error message indicating validation failure at step 1126. From step 1126, execution returns to step 1112.

If, at step 1124, it is determined that the validations performed at step 1122 have been passed, execution proceeds to step 1128. At step 1128, the system updates the supplier bid response with new pricing and applicable database records. At step 1130, the supplier utilizes a standard processing mode to submit the bid response to the buyer. At step 1132, system notifications are sent to the applicable configured parties.

Figure 12:
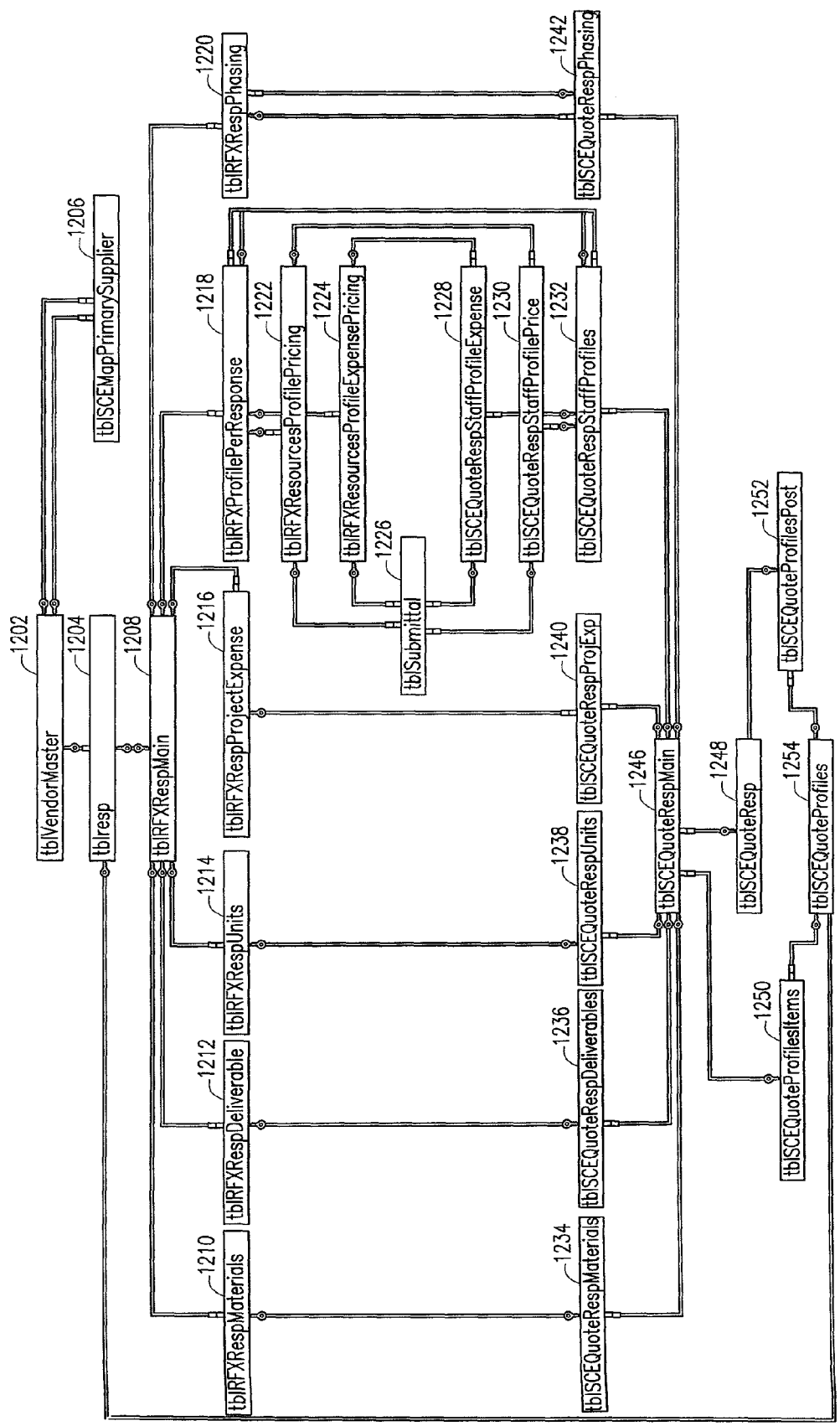
FIG. 12 illustrates a technical database model/schema that may be used in connection with the exemplary SCE daisy-chain bid response as depicted in FIGS. 7-11.

FIG. 12 illustrates a technical database model/schema that may be used in connection with the exemplary SCE daisy-chain bid response as depicted in FIGS. 7-11. As FIG. 12 can be shown to exemplify, the primary supplier bid response is collected in multiple tables and not just one table. Hence, a RFx response main Table 1208 may collect information from an RFx response materials Table 1210, an RFx response deliverable Table 1212, an RFx response units Table 1214, an RFx response project expense Table 1216, an RFx profile per response Table 1218, and an RFx response phasing Table 1220. Hence, the Tables 132-140 above are a redundant set of bid response tables set up for the SCE that store applicable special bid items. In accordance with principles of the invention, different bid items contain multiple elements with multiple fields, such as, for example, materials pricing. For example, material item is a bid item that allows population of numerous materials into a pre-formed table.

As illustrated in FIG. 12, each of the tables from which the RFx response Main Table 1208 may collect data has a corresponding SCE table. For example, the RFx response materials Table 1210 is interrelated to the SCE quote response materials Table 1234, the RFx response deliverable Table 1212 is interrelated with the SCE quote response deliverable Table 1236, the RFx response units Table 1214 is interrelated with the SCE quote response units Table 1238, the RFx response project expense Table 1216 is interrelated with the SCE quote response project expense Table 1240, and the RFx response phasing Table 1220 is interrelated with the SCE quote response phasing Table 1242. In similar fashion, the RFx profile response Table 1218, an RFx resources profile pricing Table 1222, and an RFx resources profile expensing Table 1224 are interrelated with an SCE quote response staff profile expense Table 1228, an SCE quote response staff profile price Table 1230, and an SCE quote response staff profile Table 1232 as illustrated in FIG. 12.

Similar to that discussed above, an SCE quote response main Table 1246 is interrelated with each of the Tables 1234, 1236, 1238, 1240, 1232, and 1242. Also shown interrelated with the SCE quote response main Table 1246 are an SCE quote response Table 1248, an SCE quote profiles items Table 1250, and an SCE quote profiles post Table 1252. An SCE quote profiles Table 1254 is shown interrelated with each of Tables 1250, 1252, and 1204. In similar fashion, a primary supplier master Table 1202 is shown interrelated with a response Table 1204 and an SCE map primary supplier Table 1206. The response Table 1204 is interrelated with the RFx response main Table 1208.

As illustrated in FIG. 12, the database model/schema permits information flow both from a primary supplier to an SCE and vise versa. Parsing of data may occur prior to transmission in either direction. The database models/schema shown in FIG. 12 permits connectivity between the buyer's bid item, the primary supplier's bid response item, and the SCE(s) bid response item.

Figure 13:
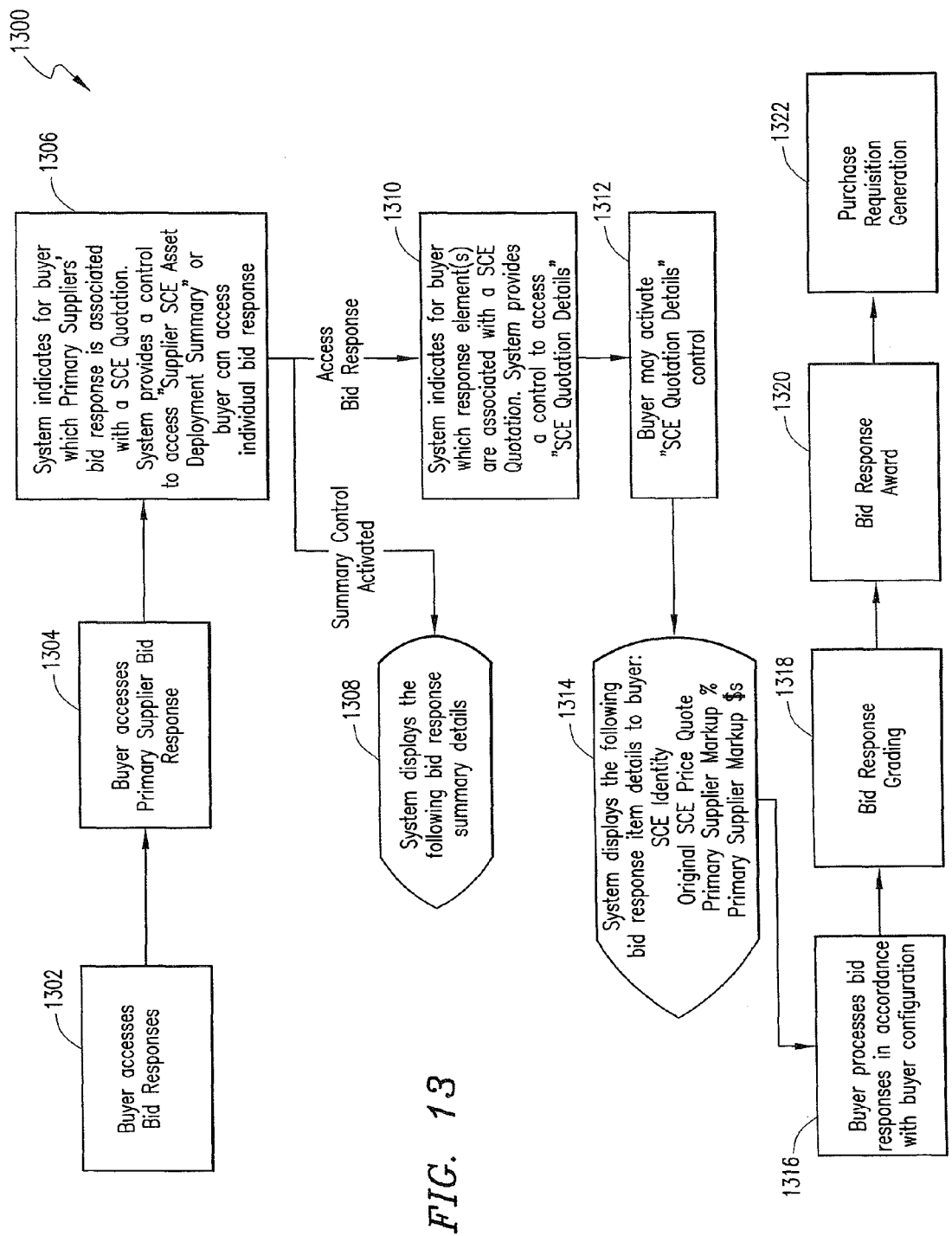
FIG. 13 is an exemplary flow chart of how a buyer may handle a primary supplier's bid response.

FIG. 13 is an exemplary flow chart of how a buyer may handle a primary supplier's bid response. FIG. 13 also illustrates how a buyer may acquire visibility to SCE bid response inclusion. FIG. 13 depicts the bid response grading, bid response award, and purchase requisition components of the buyer bid response handling phase.

In various embodiments of the invention, the buyer bid response grading/scoring and bid response award for primary suppliers may be implemented in an analogous fashion to that disclosed in U.S. patent application Ser. No. 10/262,487. In accordance with principles of the invention, visibility to the buyer of SCE quotation elements yields additional pricing and utilization information that may be viewed by the buyer in either an aggregated or a segregated fashion. The pricing and utilization information available to the buyer may significantly enhance a buyer's decision-making process relative to best response and additionally provide the buyer with tools for pricing and/or service negotiations.

In FIG. 13, a flow 1300 begins at step 1302. At step 1302, the buyer accesses a list of bid responses. In various embodiments of the invention, the accessing of the bid responses by the buyer is performed utilizing standard processing functionality as described in U.S. patent application Ser. No. 10/262,487. At step 1304, the buyer accesses the primary supplier bid response. At step 1306, the system provides an additional control to access a supplier SCE asset deployment summary or the buyer may access individual bid responses. For example, the supplier SCE asset deployment summary may allow a buyer to determine the relative contribution to a project by a primary supplier as compared to an SCE in various different ways and relative to various billing categories.

From step 1306, if summary control is activated, execution proceeds to step 1308. At step 1308, the system displays primary supplier bid response summary details. The primary supplier bid response summary details may include, for example: 1) the identity of the SCE(s) included within the bid response; 2) individual SCE(s) deployable asset summaries; 3) primary supplier's deployable asset summary; 4) the primary supplier's markup summary; 5) the SCE(s) aggregate percentage of total costs summary; and 6) the primary supplier's aggregate percentage of total cost summary.

If, at step 1306, the buyer accesses the individual bid response, execution proceeds to step 1310. At step 1310, the system indicates to the buyer which response element(s) are associated with an SCE quotation and the system provides a control to access SCE quotation details. At step 1312, the buyer can activate the SCE quotation details control. At step 1314, the system displays bid response item details to the buyer. The bid response item details displayed at step 1314 may include, for example: 1) SCE identity; 2) original SCE price quote; 3) primary supplier markup percentage; and 4) primary supplier markup amount. At step 1316, the buyer processes the bid responses in accordance with the buyer configuration. At step 1318, bid response grading occurs. At step 1320, a bid response award is made. At step 1322, a purchase requisition is generated. Those having skill in the art will recognize that each of steps 1316-1322 may include additional work flows as configured by the buyer according to the buyer's business needs. Exemplary work flows that may be included as part of steps 1316-1322 are discussed in more detail in U.S. patent application Ser. No. 10/262,487.

Although FIG. 13 does not explicitly illustrate the ability of the buyer to view primary bid response grading/scoring with or without the inclusion of SCE bid response elements, this ability may be readily implemented without departing from principles of the invention. In similar fashion, the SCEs could be scored independently if desired.

Figure 14:
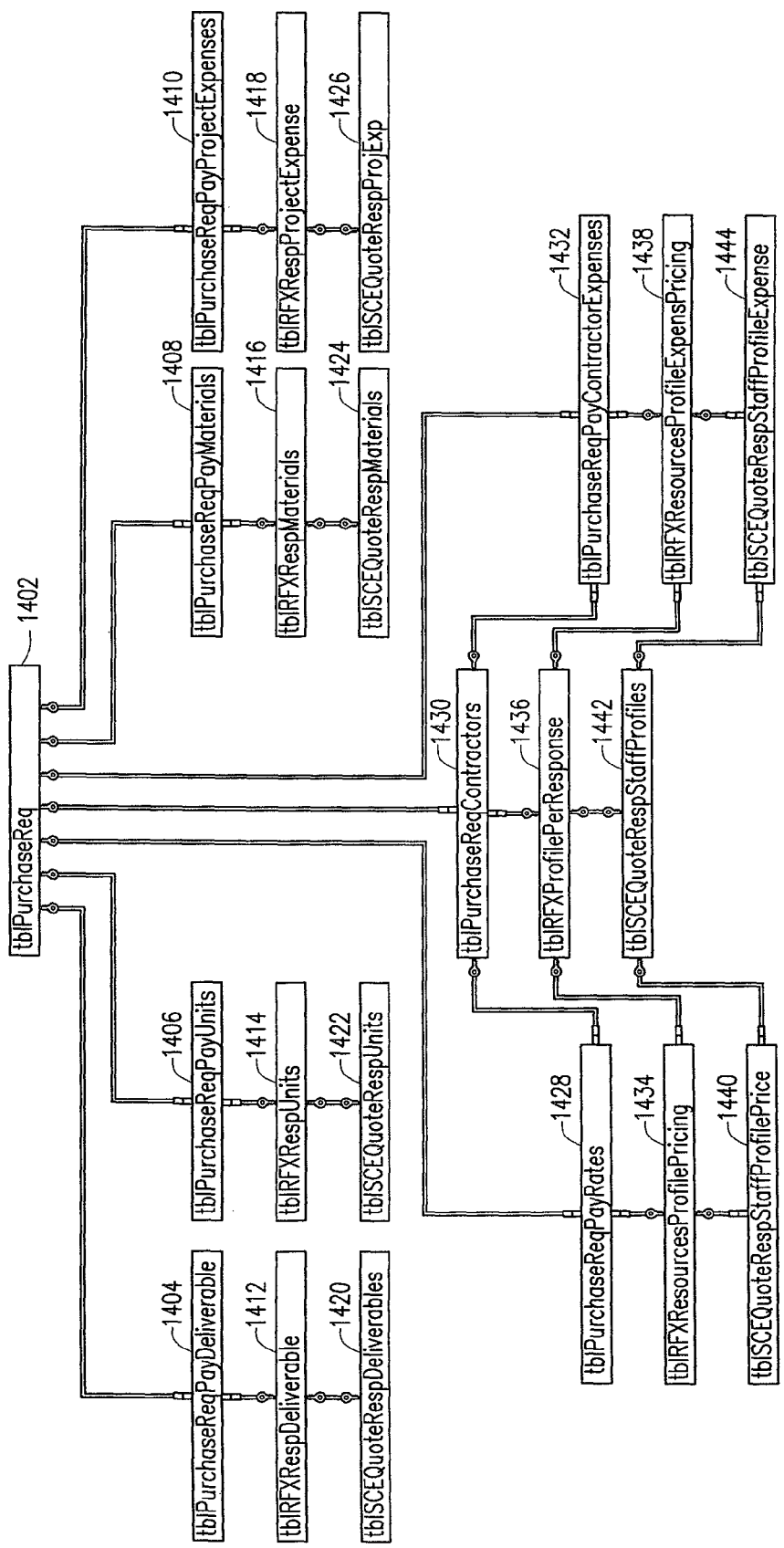
FIG. 14 illustrates an exemplary technical database model/schema that may be used in connection with SCE record creation and tracking of SCE quotation elements at a purchase requisition level.

FIG. 14 illustrates an exemplary technical database model/schema that may be used in connection with SCE record creation and tracking of SCE quotation elements at a purchase requisition level. FIG. 14 details how SCE data can be carried through to the purchase requisition/purchase order stages.

A purchase requisition Table 1402 may collect data from each of a purchase requisition pay deliverable Table 1404, a purchase requisition pay units Table 1406, a purchase requisition pay materials Table 1408, a purchase requisition pay project expenses Table 1410, a purchase requisition pay rates Table 1428, a purchase requisition contractors Table 1430, and a purchase requisition pay contractors expenses Table 1432. Corresponding tables at the RFx response and SCE quote levels are interconnected to the appropriate purchase requisition tables. In particular, data may flow in either direction between Tables 1404, 1412, and 1420 between Tables 1406, 1414, and 1422, between Tables 1408, 1416, and 1424 and between Tables 1410, 1418, and 1426. Similarly, data may flow in either direction between Tables 1428, 1434, and 1440, between Tables 1430, 1436 and 1442, and between Tables 1432, 1438, and 1444.

The database model/schema illustrated in FIG. 14 permits a so-called auto-feed function in which a bid response award is generated in such a fashion that the buyer does not have to re-enter data. The buyer may, in some embodiments of the invention, have edit capabilities; however, those edit capabilities do not necessarily have to be used by the buyer.

In accordance with the database model/schema of FIG. 14, data may be taken from an SCE quote response to be input into a RFx response by a primary supplier. In similar fashion, data may be taken from the RFx response of the primary supplier and input to a purchase requisition of a buyer. Thus, database tracking all the way from SCE daisy-chain quotation creation all the way to the buyer's purchase requisition is enabled.

Figure 15:
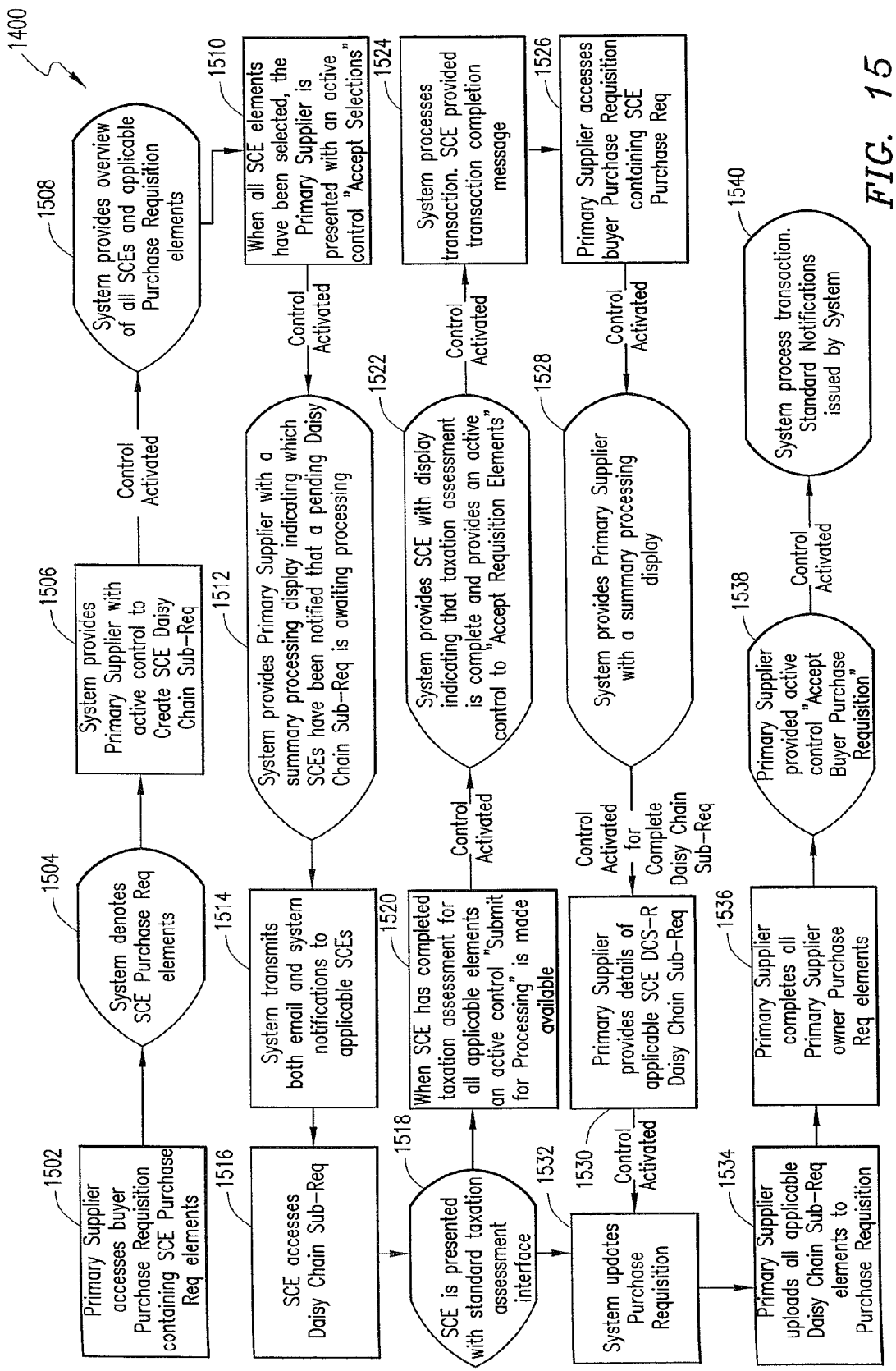
FIG. 15 is an exemplary flow chart of how a taxation assessment and purchase requisition acceptance may be handled during the course of a daisy-chain purchase requisition.

FIG. 15 is an exemplary flow chart of how a taxation assessment and purchase requisition acceptance may be handled during the course of a daisy-chain purchase requisition. FIG. 15 illustrates a flow 1500. In various embodiments of the invention, the flow 1500 is enabled via technical databases that permit parsing and re-aggregation of SCE-specific purchase requisition elements. Primary supplier handling of taxation assessment and requisition consent are disclosed in U.S. patent application Ser. No. 10/412,096. An SCE daisy-chain sub-requisition process illustrated in FIG. 15 is analogous to the primary supplier handling of taxation assessment and requisition consent and permits appropriate information to be obtained from the appropriate party in an auditable and integrated manner. The flow 1500 may be used to insure that all participating parties are aware of, for example, all purchase-requisition elements and terms and have agreed to same.

The flow 1500 begins at step 1502. At step 1502, the primary supplier accesses the buyer purchase requisition containing the SCE purchase requisition elements. At step 1504, the system denotes which purchase requisition elements are the SCE-provided purchase requisition elements. At step 1506, the system provides the primary supplier with active control to create an SCE daisy chain sub-requisition. Responsive to step 1506 and activation of sub-requisition control by the supplier, execution proceeds to step 1508. At step 1508, the system provides an overview of all SCEs and applicable purchase requisition elements. The system also allows designation of individual elements to be sent to the SCE for taxation assessment and acceptance or to process SCE elements on behalf of the SCE. In various embodiments of the invention, designation may be made via a checkbox.

At step 1510, when all SCE elements have been selected, the primary supplier is presented with an Accept Selections active control. In various embodiments of the invention, the SCE elements may be selected via an associated checkbox. Responsive to step 1510 and activation of the Accept Selections control by the supplier, execution proceeds to step 1512.

At step 1512, the system provides the primary supplier with a summary processing display. The summary processing display indicates which SCEs have been notified that a pending SCE daisy chain sub-requisition is awaiting processing. In various embodiments of the invention, the system also provides the supplier with a purchase requisition SCE element listing that includes those elements chosen to be processed by the primary supplier. At step 1514, the system transmits both e-mail and system notifications to applicable SCE(s).

At step 1516, the SCE accesses the daisy chain sub-requisition. At step 1518, the SCE is presented with a taxation assessment interface. An exemplary taxation assessment interface is described in U.S. patent application Ser. No. 10/412,096. At step 1520, when the SCE has completed taxation assessments for all applicable elements, a Submit For Processing active control is made available. Responsive to step 1520 and activation of control by the SCE, execution proceeds to step 1522. At step 1522, the system provides the SCE with a display indicating that taxation assessment is complete and provides an Accept Requisition Elements active control.

Responsive to step 1522 and activation of the Accept Requisition Elements active control by the SCE, execution proceeds to step 1524. At step 1524, the system processes the transaction and the SCE is provided with a Transaction-Completion message. In addition, the primary supplier is notified via a system update and e-mail that a completed daisy chain sub-requisition is available for processing. At step 1526, the primary supplier accesses the buyer purchase requisition containing the SCE purchase requisition elements. The primary supplier is also provided an Administer SCE Daisy Chain sub-requisition active control. Responsive to step 1526, and activation of the Administer SCE Daisy Chain sub-requisition active control by the primary supplier, the system provides the primary supplier with a summary processing display. The summary processing display indicates which applicable SCEs are contained in the active daisy chain sub-requisition and also provides the status of the SCE response. A View Details active control is also made available.

Responsive to step 1528 and activation of the View Details active control for the daisy chain sub-requisition, execution proceeds to step 1530. At step 1530, the primary supplier is provided details of the SCE daisy chain sub-requisition. The primary supplier is also provided an Add To Purchase Requisition active control.

Responsive to step 1530 and activation of the Add To Purchase Requisition active control by the primary supplier, execution proceeds to step 1532. At step 1532, the system updates the purchase requisition and the primary supplier is provided an upload message. At step 1534, the primary supplier updates all applicable daisy chain sub-requisition elements to the purchase requisitions. At step 1536, the primary supplier completes all primary-supplier-owned purchase requisition elements. At step 1538, the primary supplier is provided an Accept Buyer Purchase Requisition active control. Responsive to step 1538 and activation of the Accept Buyer Purchase Requisition control by the primary supplier, execution proceeds to step 1540, at which step the system processes the transaction and standard notifications are issued by the system. In addition, at step 1540, the purchase requisition is available for final processing by the buyer.

Various embodiments of the invention provide an integrated data model that carries over SCE and primary supplier details from the bid response to the purchase requisition, in which the SCE is introduced to the taxation assessment and purchase requisition consent processes, and provides buyer configurability and flexibility relative to purchase order setup and data processing models. Flexible project goods/services vouchering in accordance with principles of the invention permit financial processing in which the buyer can process SCE financials as required.

Examples of data structures for use in taxation assessment and purchase requisition acceptance are shown in Tables 143-147. The data structures are illustrated for simplicity as being organized in a table format, with each table including all the fields necessary for taxation assessment and purchase requisition acceptance. The tables are related in a hierarchal and/or relational manner, so that all the necessary information for SCE configuration can be accurately stores and accessed, as will be described in more detail below in connection with FIG. 16. However, it should be understood with other configurations can be included and that the system is not limited to the specific configurations listed in Tables 143-147 or FIG. 16.

TABLE 143 tblTaxNode (db structure view)

| Column Name | Data Type | Length |
|---|---|---|
| TaxNodeID | int | 4 |
| ParentGUID | uniqueidentifier | 16 |
| ParentTable | varchar | 100 |
| ParentID | int | 4 |
| CurrentStatusID | int | 4 |
| SpendingTypeID | int | 4 |
| ReqID | int | 4 |

TABLE 144 tblTaxLineItem (db structure view)

| Column Name | Data Type | Length |
|---|---|---|
| TaxNodeID | int | 4 |
| ItemValue | varchar | 1000 |
| TemplateGUID | uniqueidentifier | 16 |
| TaxAuthorityID | int | 4 |
| TaxableAmount | numeric | 9 |
| TaxPercent | float | 8 |
| TaxBurden | numeric | 9 |
| UserID | int | 4 |
| RecordDate | datetime | 8 |
| TaxLineRecordID | int | 4 |

TABLE 145 tblTaxAuthority (db structure view)

| Column Name | Data Type | Length |
|---|---|---|
| rowid | int | 4 |
| SpendingGUID | uniqueidentifier | 16 |
| TaxAuthorityName | varchar | 100 |
| Tax_Percent | float | 8 |
| RegionID | int | 4 |
| CountyID | int | 4 |
| CountryID | int | 4 |
| CityID | int | 4 |
| MuniID | int | 4 |
| TaxAuthorityID | int | 4 |

TABLE 146 tblSCETaxNode (db structure view)

| Column Name | Data Type | Length |
|---|---|---|
| TaxNodeID | int | 4 |
| ParentGUID | uniqueidentifier | 16 |
| ParentTable | varchar | 100 |
| ParentID | int | 4 |
| RecordAvailableDate | datetime | 8 |
| PrimaryVendorContactID | int | 4 |
| CurrentStatusID | char | 10 |
| SCESubmitDate | datetime | 8 |
| RecordID | int | 4 |
| SCEVendorID | int | 4 |

TABLE 147 tblSCETaxLineItem (db structure view)

| Column Name | Data Type | Length |
|---|---|---|
| TaxNodeID | int | 4 |
| ItemValue | varchar | 1000 |
| TemplateGUID | uniqueidentifier | 16 |
| TaxAuthorityID | int | 4 |
| TaxableAmount | numeric | 9 |
| TaxPercent | float | 8 |
| TaxBurden | numeric | 9 |
| SCEUserID | int | 4 |
| RecordDate | datetime | 8 |
| SCENodeRecordID | int | 4 |
| SCETaxLineRecordID | int | 4 |

Tables 143-147 illustrate tables used for daisy-chain purchase-requisition data processing. The tax node data shown in Table 143 can be stored in a tax node Table 1618. The tax line item data shown in Table 144 can be stored in a tax line item Table 1622. The tax authority data shown in Table 145 can be stored in a tax authority Table 1620. The SCE tax node data shown in Table 146 can be stored in an SCE tax node Table 1624. The SCE tax line item data shown in Table 147 can be stored in an SCE tax line item Table 1626.

Figure 16:
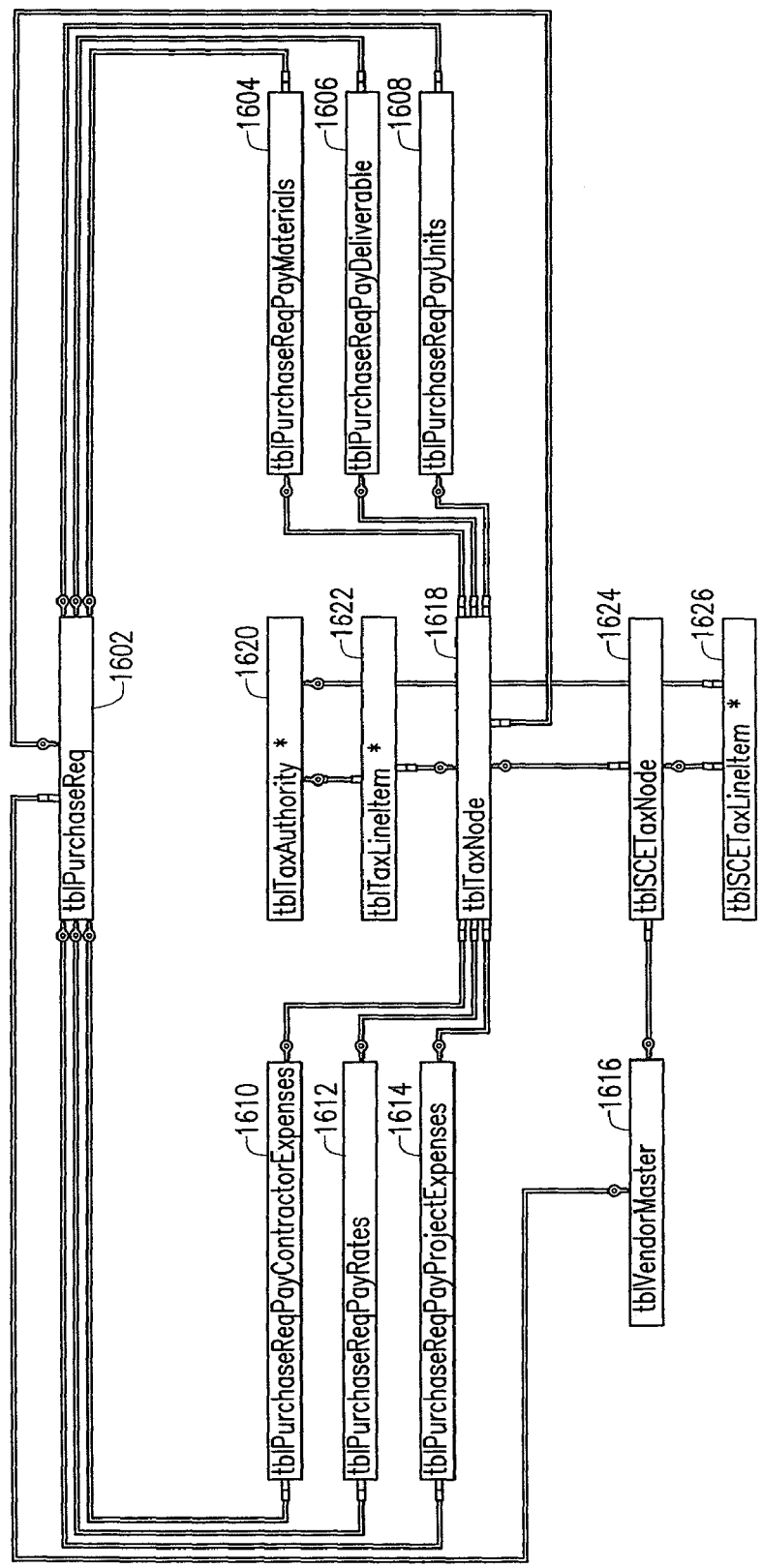
FIG. 16 illustrates a technical database model/schema that may be used in connection with daisy-chain purchase-requisition data processing.

FIG. 16 illustrates a technical database model/schema that may be used to enable daisy-chain purchase requisition data processing as illustrated in FIG. 15. In FIG. 16, a purchase requisition Table 1602 may exchange data with any of a purchase requisition pay materials Table 1604, a purchase requisition pay delivery Table 1606, a purchaser requisition pay units Table 1608, a purchase requisition pay contractor expenses Table 1610, a purchase requisition pay raise Table 1612, a purchase requisition pay project expenses Table 1614, a vendor master Table 1616, and a tax node Table 1618. Also show are a tax authority Table 1620, a tax line item Table 1622, an SCE tax node Table 1624, and an SCE tax line item Table 1626, which are interconnected as illustrated in FIG. 16. The database model/schema illustrated in FIG. 16 allows daisy-chain purchase requisition data processing from the SCE level through the primary supplier level to the buyer purchase requisition level.

Figure 17:
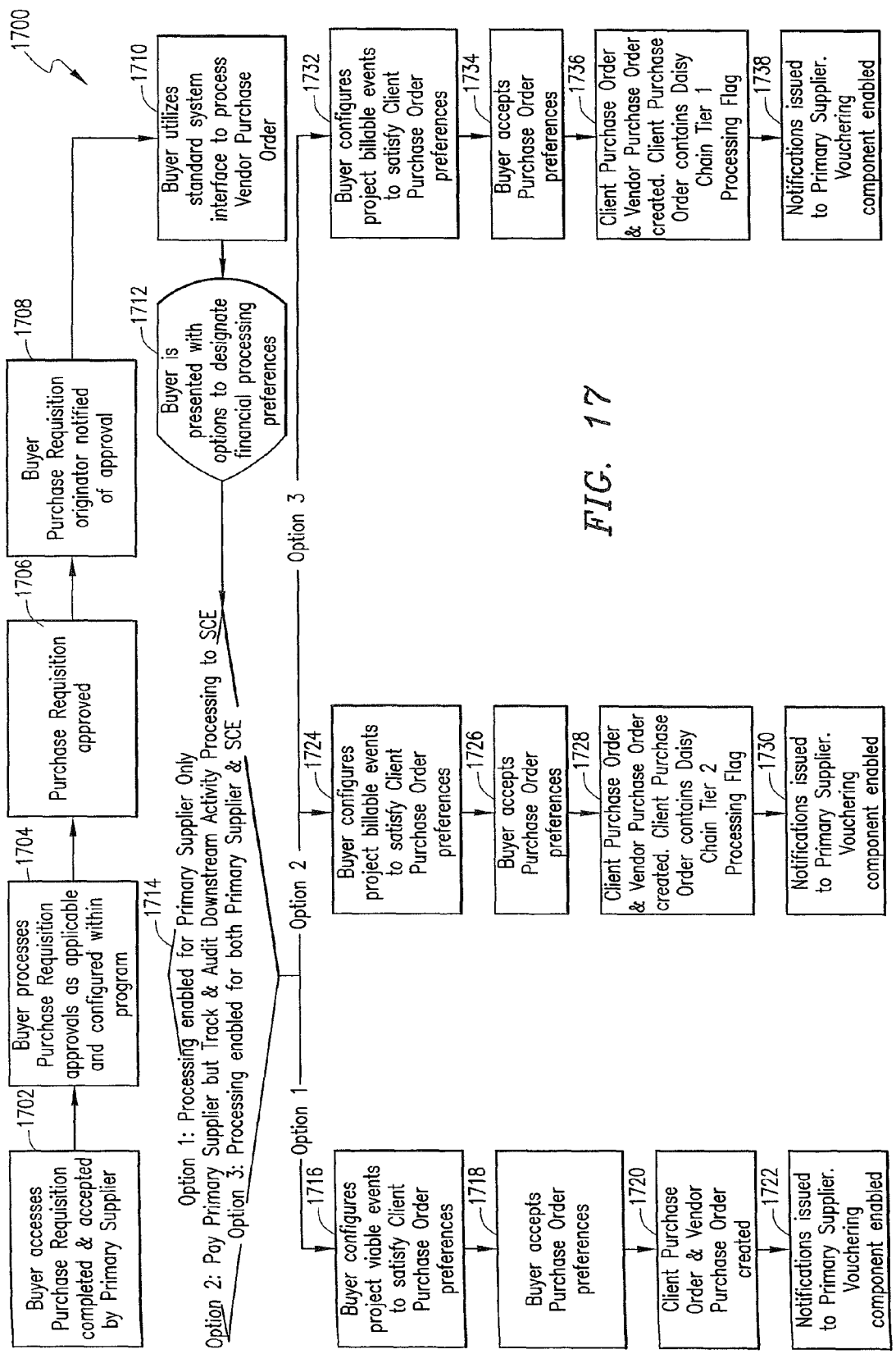
FIG. 17 is an exemplary flow chart of how a buyer may handle purchase order configuration and creation relative to an SCE-affected purchase requisition.

FIG. 17 is an exemplary flow chart of how a buyer may handle purchase order configuration and creation relative to an SCE-affected purchase requisition. In accordance with principles of the invention, a purchase order may be configured in at least three distinct ways: 1) ignoring the SCE; 2) tracking the SCE financial processing while not dealing directly with the SCE; and 3) doing business directly with the SCE for the purposes of billing and payment. Thus, principles of the invention may be used to expands the buyer's data processing and business options.

In FIG. 17, a flow 1700 begins at step 1702. At step 1702, the buyer accesses the purchase requisition that has been completed and accepted by the primary supplier. At step 1704, the buyer processes the purchase requisition approvals as applicable and configured within the program in accordance with the buyer's work flow. At step 1706, the purchase requisition is approved. At step 1708, the buyer is notified of approval of the purchase requisition. At step 1710, the buyer utilizes a standard system interface to process the primary supplier purchase order. At step 1712, the buyer is presented with options to designate financial processing preferences. At step 1714, the buyer may choose one of three options: (1) processing enabled for primary supplier only; (2) pay primary supplier but track and audit downstream activity processing to SCE; and (3) processing enabled for both primary supplier and SCE.

If, at step 1714, option (1) is chosen, execution proceeds to step 1716. At step 1716, the buyer configures project billable events to satisfy client purchase order preferences. At step 1718, the buyer accepts the purchase order preferences. At step 1720, the client purchase order and primary supplier purchase order are created. At step 1722, notifications are issued to the primary supplier and a vouchering component is enabled.

If, at step 1714, option (2) is selected, execution proceeds to step 1724. At step 1724, the buyer configures project billable events to satisfy client purchase order preferences in accordance with the buyer's work flow. At step 1726, the buyer accepts the purchase order preferences. At step 1728, the client purchase order and primary supplier purchase order are created. In addition, at step 1728, the client purchase order contains a daisy chain Tier 2 processing flag. At step 1730, notifications are issued to the primary supplier and the vouchering component is enabled.

If, at step 1714, option (3) is selected, execution proceeds to step 1732. At step 1732, the buyer configures project billable events to satisfy the client purchase order preferences. At step 1734, the buyer accepts the purchase order preferences. At step 1736, the client purchase order and primary supplier purchase order are created. In addition, at step 1736, the client purchase order contains the daisy chain Tier 1 processing flag. At step 1738, notifications are issued to the primary supplier and the vouchering component is enabled.

As illustrated in FIG. 17, in various embodiments of the invention, there are three primary processing modes for purchase orders relative to set up and relationships of purchase-order items in conjunction with the buyer and the primary supplier and the buyer, the primary supplier, and the SCE. Option (1) indicates, in effect, no preferential treatment from a data processing and tracking perspective relative to the relationship between the buyer and the primary supplier. In Option (1), there is almost an ignorance of the existence of the SCE in the process. Option (2) represents a Tier II mode, in which case the buyers preference from a data processing perspective is still to maintain, for the most part, a one-to-one bill pay relationship between the buyer and the primary supplier. However, in Option (2) there is a desire to track and audit releases of funds from the primary supplier to the SCE. For example, there could be two primary reasons why a buyer would want to track and audit the release of funds from the primary supper to the SCE.

A first reason might be that the buyer wants to insure the integrity of a payment system to the subcontractor from a vendor-management perspective in, for example, a diversified spending program present in many government contracts that requires certain monies to be released on government projects to a minority diversified firm. In some instances, the capability of a Tier 2 option indicates that, from a government perspective, the bill pay relationship does not need to be one-to-one between the buyer and the SCE, but can instead be conducted through a third party which, in this example, would be the primary supplier. However, in order to ensure integrity of diversified credits an audit and tracking mechanism would need to be implemented. Therefore, in Option (2), the buyer may continue to bill pay directly through the primary supplier, but institute auditing and tracking mechanisms by which releases of funds to the SCE are insured.

In Option (3), the buyer may have a business and accounting rationale for conducting business directly with the SCE. In one example, if a given portion of funds on a particular project must be spent with a diversified organization, many governmental contracts require that a relationship at the bill/pay level be directly between the buyer and a provisioner of services (i.e., the SCE). Therefore, in Option (3), a purchase requisition can be parsed and created into purchase orders that facilitate data processing directly between the buyer and the SCE for the pertinent bill/pay items and the buyer may directly pay the SCE for those items. In another example, a buyer may want to be able to track local expenditures irrespective of which primary suppliers are used on projects for public-relations purposes. This may be important when the SCE performing work on a project is in a different location than the primary supplier.

Examples of data structures for use in purchase order processing relative to an SCE-affected purchase requisition are shown in Tables 148-152. The data structures are illustrated for simplicity as being organized in a table format, with each table including all the fields necessary for purchase order processing relative to an SCE-affected purchase requisition. The tables are related in a hierarchal in/or relational manner, so that all of the necessary information for SCE configuration can be accurately stored and accessed, as will be described in more detail in connection with FIG. 18. However it should be understood that other configurations can be included and that the system is not limited to the specific configurations listed in Tables 148-152 or FIG. 18.

TABLE 148 tblPO_Vendor (db structure view)

| Column Name | Data Type | Length |
| --- | --- | --- |
| POIdentityID | int | 4 |
| POIdentity | uniqueidentifier | 16 |
| ClientPONum | varchar | 12 |
| PurchaseReqID | int | 4 |
| POStart | datetime | 8 |
| POEnd | datetime | 8 |

TABLE 148-continued tblPO_Vendor (db structure view)

| Column Name | Data Type | Length |
| --- | --- | --- |
| POApprovedAmount | money | 8 |
| POProjectedAmount | money | 8 |
| CurrencyID | int | 4 |
| POVersion | int | 4 |
| VersionEffectiveDate | datetime | 8 |
| VendorPONum | varchar | 14 |
| POProcessorID | int | 4 |
| ProcessFee | numeric | 9 |
| CurrentStatusID | int | 4 |
| Response_id | int | 4 |
| Order_ID | int | 4 |
| OrderGUID | uniqueidentifier | 16 |
| Vendor_ID | int | 4 |
| PO_RFX_TemplateID | int | 4 |
| PO_Project_Type_ID | int | 4 |
| PODays | int | 4 |
| POStatusID | int | 4 |
| User_ID | int | 4 |
| User_type | int | 4 |
| ClientPOSetUpStatus | int | 4 |
| POApprovedTaxAmount | money | 8 |
| PMOwnerShipID | int | 4 |
| ProjectImpactCodeID | int | 4 |
| PODynamicTypeID | int | 4 |
| PO_Modified | datetime | 8 |
| POApprovedAmount_Modified | datetime | 8 |

TABLE 149 tblPOClient (db structure view)

| Column Name | Data Type | Length |
| --- | --- | --- |
| POClientID | int | 4 |
| POIdentityID | int | 4 |
| POClientIdentity | uniqueidentifier | 16 |
| POIdentity | uniqueidentifier | 16 |
| CreatedDate | datetime | 8 |
| SCETier1PO | char | 1 |
| SCETier2PO | char | 1 |

TABLE 150 tblPOClientLine (db structure view)

| Column Name | Data Type | Length |
| --- | --- | --- |
| POClientLineIdentityID | int | 4 |
| POClientID | int | 4 |
| POClientLineIdentity | uniqueidentifier | 16 |
| POClientIdentity | uniqueidentifier | 16 |
| PoIdentity | uniqueidentifier | 16 |
| LineName | varchar | 100 |
| Description | varchar | 1000 |
| SortOrder | int | 4 |
| CreatedDate | datetime | 8 |
| PoLineNumber | int | 4 |
| LastModified | datetime | 8 |

TABLE 151 tblPOClientSubLine (db structure view)

| Column Name | Data Type | Length |
| --- | --- | --- |
| POClientSubLineIdentityID | int | 4 |
| POClientLineIdentityID | int | 4 |
| POClientSubLineIdentity | uniqueidentifier | 16 |
| POClientLineIdentity | uniqueidentifier | 16 |

TABLE 151-continued tblPOClientSubLine (db structure view)

| Column Name | Data Type | Length |
|---|---|---|
| ActivityType | varchar | 5 |
| EarningCode | varchar | 5 |
| ParentRefGuid | uniqueidentifier | 16 |
| ParentRefTableName | varchar | 200 |
| ActivityGuid | uniqueidentifier | 16 |
| Poidentity | uniqueidentifier | 16 |
| ActivityTypeName | varchar | 50 |
| SortOrder | int | 4 |
| CreatedDate | datetime | 8 |
| LastModified | datetime | 8 |
| PRPDeliverableID | int | 4 |
| PRPMaterialBundleID | int | 4 |
| ProjectExpensesID | int | 4 |
| PurchaseReqPayRateID | int | 4 |
| ContractorExpensesBundleID | int | 4 |
| PRPUnitID | int | 4 |
| SCETier1PO | char | 1 |
| SCETier2PO | char | 1 |

TABLE 152 tblSCEPOTier (db structure view)

| Column Name | Data Type | Length |
|---|---|---|
| POClientID | int | 4 |
| SCEVendorID | int | 4 |
| TierPOType | int | 4 |
| RecordID | int | 4 |

Tables 148-152 illustrate data that can be stored in database tables used for purchase order processing relative to an SCE-affected purchase requisition. The data shown in Table 148 may be stored in a purchase order vendor Table 1816. The data shown in Table 149 may be stored in a purchase order client Table 1818. The data shown in Table 150 may be stored in a purchaser order client line Table 1820. The data shown in Table 151 may be store in a purchase order client line items Table 1822. Data shown in Table 152 may be stored in an SCE purchase order tier Table 1824.

Figure 18:
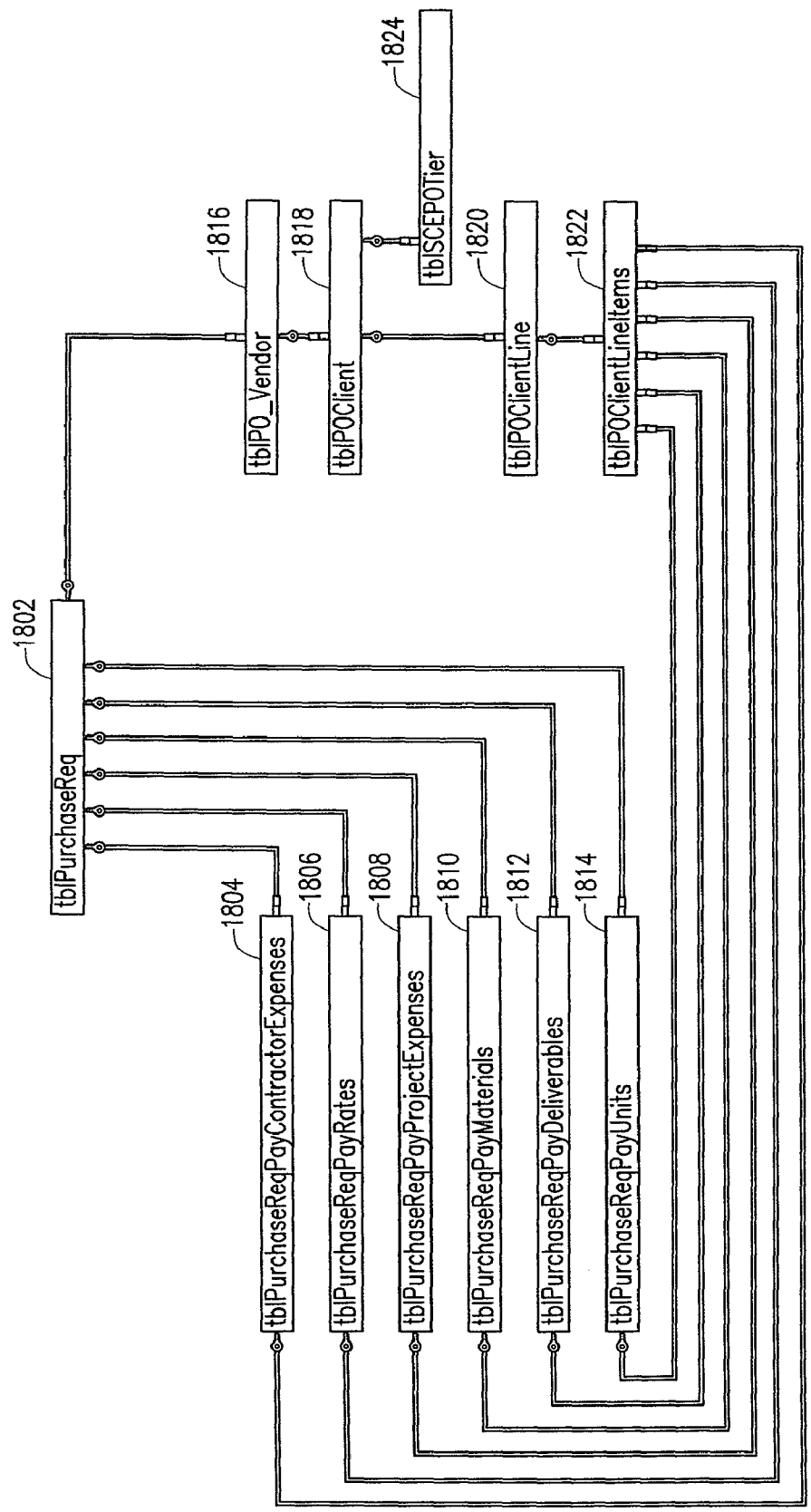
FIG. 18 illustrates a technical database model/schema that may be used in connection with purchase order processing relative to an SCE-affected purchase requisition.

FIG. 18 illustrates a technical database model/schema that may be used in connection with purchase order processing relative to an SCE-affected purchase requisition. In FIG. 18, Tables 1802-1822 are illustrated. A purchase requisition Table 1802 may collect data from any of a purchase requisition pay contractor expenses Table 1804, a purchase requisition pay rates Table 1806, a purchase requisition pay project expenses Table 1808, a purchase requisition pay materials Table 1810, a purchase requisition pay deliverables Table 1812, and a purchase requisition pay units Table 1814. Each of the Tables 1804-1814 is interrelated to a purchase order client lines items Table 1822 which is also interrelated to a purchase order client line Table 1820. A purchase order client Table 1818 may collect data from an SCE purchase order tier Table 1824 and is interrelated with a purchase order vendor Table 1816. The purchase order vendor Table 1816 is interrelated with the purchase requisition Table 1802. The database model/schema illustrated in FIG. 18 supports three options for configurability, including a one-to-one relationship, a one-to-all relationship, and a variable format. The term variable formatting refers to the way that requisition lines items are transferred to a purchase order. The first option permits configuration to be accepted that creates a purchase order line for every applicable purchase requisition line item. The second option is a formatting configuration that allows the buyer to place all requisition line items onto one master client purchase order line. The third option allows variable configurations by the buyer to manually select individual purchase requisitions line items and variably configure them by creating purchase order line items. Thus, a ten requisition line item could be converted into a three line purchase order record at the buyer's preference, with all materials on one line item, all labor on one line item, and one deliverable line item. The purchase order may be created in any format desired by the buyer.

Figure 19:
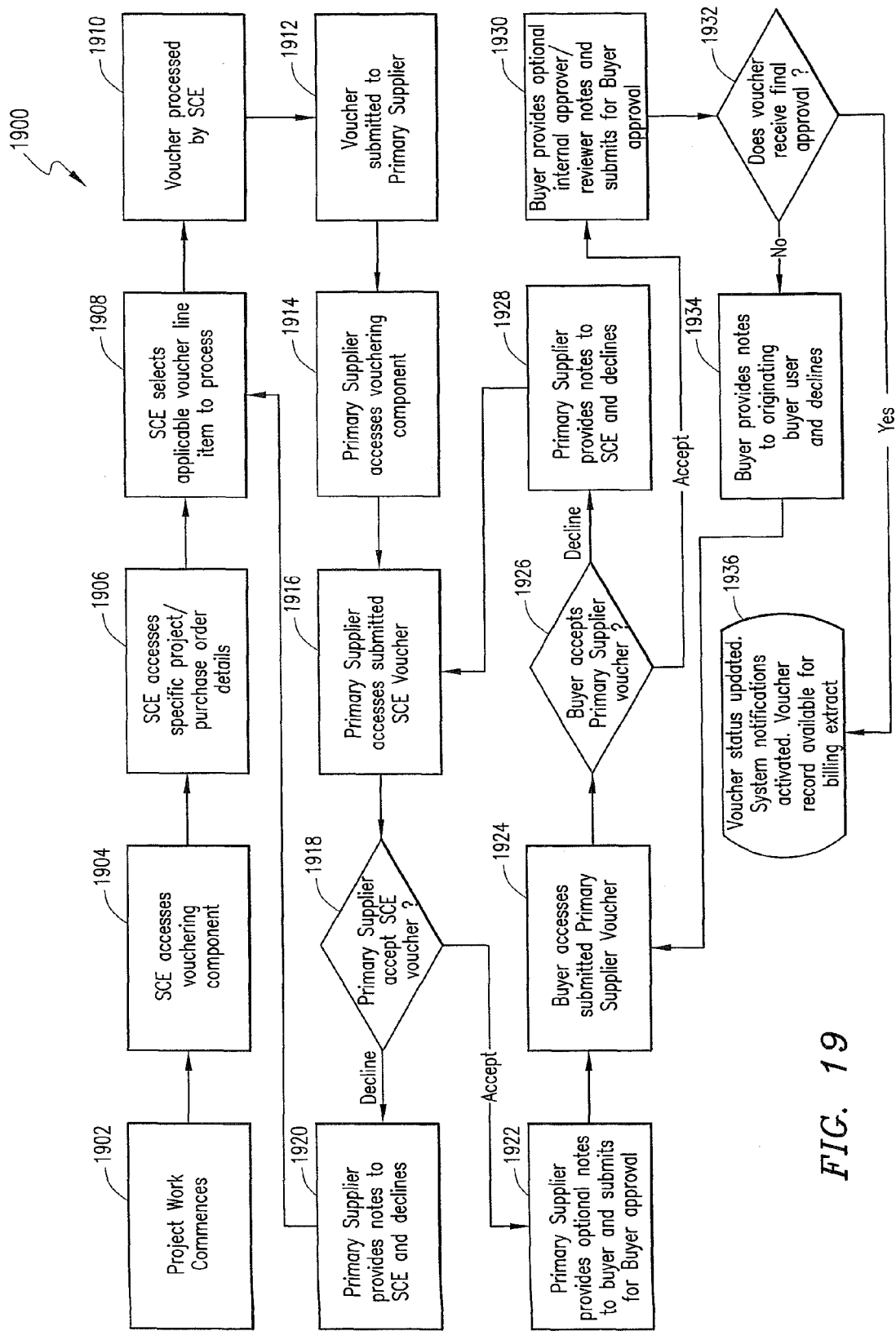
FIG. 19 is an exemplary flow chart of how SCE bill/pay request vouchers may be processed.

FIG. 19 is an exemplary flow chart of how SCE bill/pay request vouchers may be processed. FIG. 19 relates to processing of project work vouchers by the primary supplier and SCE; core voucher processing is described in U.S. patent application Ser. No. 10/262,487. The ability of SCEs to process services-performed or goods-delivered vouchers initials the vouchering process started without interference by a so-called middle man; therefore, incorrect translations of unconstrained information provided from the SCE to the primary supplier and then to the buyer can be avoided. When vouchering is tied to SCE(s), performance assessment is possible at a more detailed and appropriate layer. In addition, routing of SCE vouchers through the primary supplier provides enhanced visibility. Vouchering in accordance with principles of the invention permits enhanced project tracking, quality control, and payment enablement. The vouchering functionality illustrated by FIG. 19 is, in many respects, similar to that described in U.S. patent application Ser. No. 10/262,487 and is now extended to another layer of processes (e.g., the SCE).

In FIG. 19, a flow 1900 begins at step 1902. At step 1902, project work commences. At step 1904, the SCE accesses the vouchering component. At step 1906, the SCE accesses specific project/purchase order details. At step 1908, the SCE selects applicable voucher line item(s) to process. At step 1910, the voucher is processed by the SCE. At step 1912, the voucher is submitted to the primary supplier. At step 1914, the primary supplier accesses the vouchering component. At step 1916, the primary supplier accesses the submitted SCE voucher. At step 1918, a determination is made whether the primary supplier has accepted the SCE voucher. If, at step 1918, the primary supplier has not accepted the SCE voucher, execution proceeds to step 1920. For example, the primary supplier may notice at step 1918 an error in the voucher submitted by the SCE relative to facts known to the primary supplier. Thus, in such a situation, at step 1920, the primary supplier provides notes to the SCE and declines the voucher, which permits the primary supplier to avoid having an incorrect voucher being submitted to the buyer. At step 1920, the primary supplier provides notes to the SCE and declines the voucher. From step 1920, execution returns to step 1908.

If, at step 1918, the primary supplier accepts the SCE voucher, execution proceeds to step 1922. At step 1922, the primary supplier provides optional notes to the buyer and submits the voucher for buyer approval. In various embodiments of the invention standard notifications are activated. From step 1922, execution proceeds to step 1924. At step 1924, the buyer accesses the submitted primary supplier voucher. At step 1926, the buyer may accept or decline the primary supplier voucher. If, at step 1926, the buyer accepts the primary supplier voucher, execution proceeds to step 1936. If, at step 1926, the buyer has not accepted the primary supplier voucher, execution proceeds to step 1928. At step 1928, the primary supplier provides notes to the SCE and declines the voucher. From step 1928, execution returns to step 1916. At step 1936, the voucher status is updated and system notifications are activated. In addition, at step 1936, the voucher record is made available for billing extract. As will be appreciated by those having skill in the art, steps 1926, 1928, and 1936 may include numerous steps in accordance with a buyer configured workflow.

An exemplary data structure for use in connection with SCE bill/pay request vouchers is shown in Table 153. The data structure is illustrated for simplicity as being organized in a table format, with Table 153 including all necessary fields for SCE bill/pay request vouchering. It should be understood that other configurations can be included and that the system is not limited to the specific configuration listed in Table 153 or FIG. 20.

TABLE 153 tblSCEVoucherMaterialDetails (db structure view)

| Column Name | Data Type | Length |
|---|---|---|
| SCE_Mat_vRecord_ID | int | 4 |
| SCEMatRecordID | int | 4 |
| ppmRecord_ID | int | 4 |
| Expense_Incurred_Date | datetime | 8 |
| Material_Name | varchar | 100 |
| Material_Description | varchar | 500 |
| Unit_Count | numeric | 9 |
| Unit_Cost | money | 8 |
| Line_Item_Cost | money | 8 |
| SCE_User_ID | int | 4 |
| SCE_Submit_Date | datetime | 8 |
| Status_ID | int | 4 |
| psApproval_Date | datetime | 8 |
| psDeclination_Date | datetime | 8 |
| psNotes | varchar | 1000 |

Figure 20:
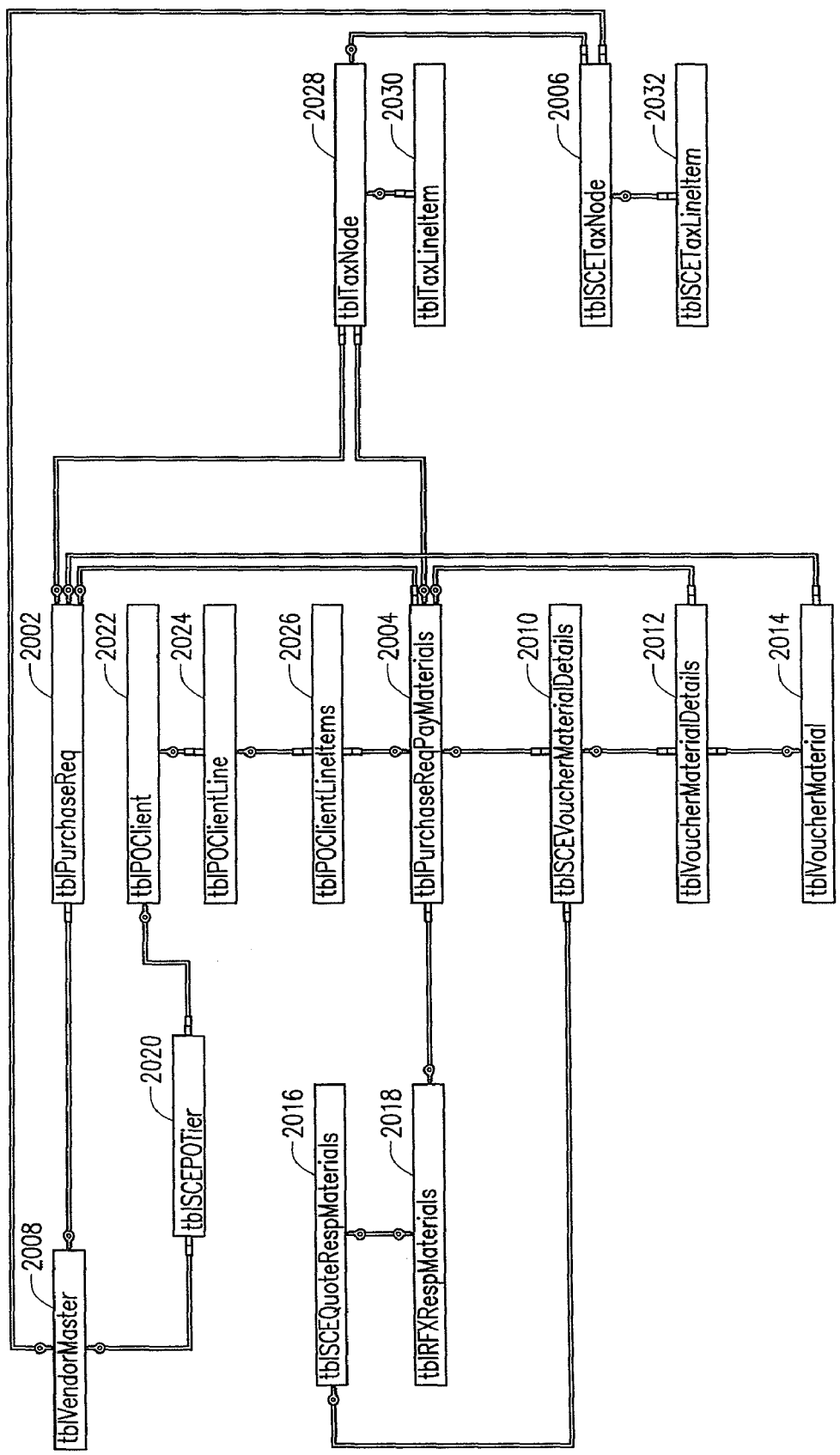
FIG. 20 illustrates a technical database model/schema that that may be used in connection with SCE bill/pay request vouchers.

FIG. 20 illustrates a technical database model/schema that that may be used in connection with SCE bill/pay request vouchers. In FIG. 20, only materials-related billable events are illustrated; however, those having ordinary skill in the art will recognize that similar database models/schema may be used for each category of billable events. FIG. 20 includes Tables 2002-2032 as illustrated.

Figure 21:
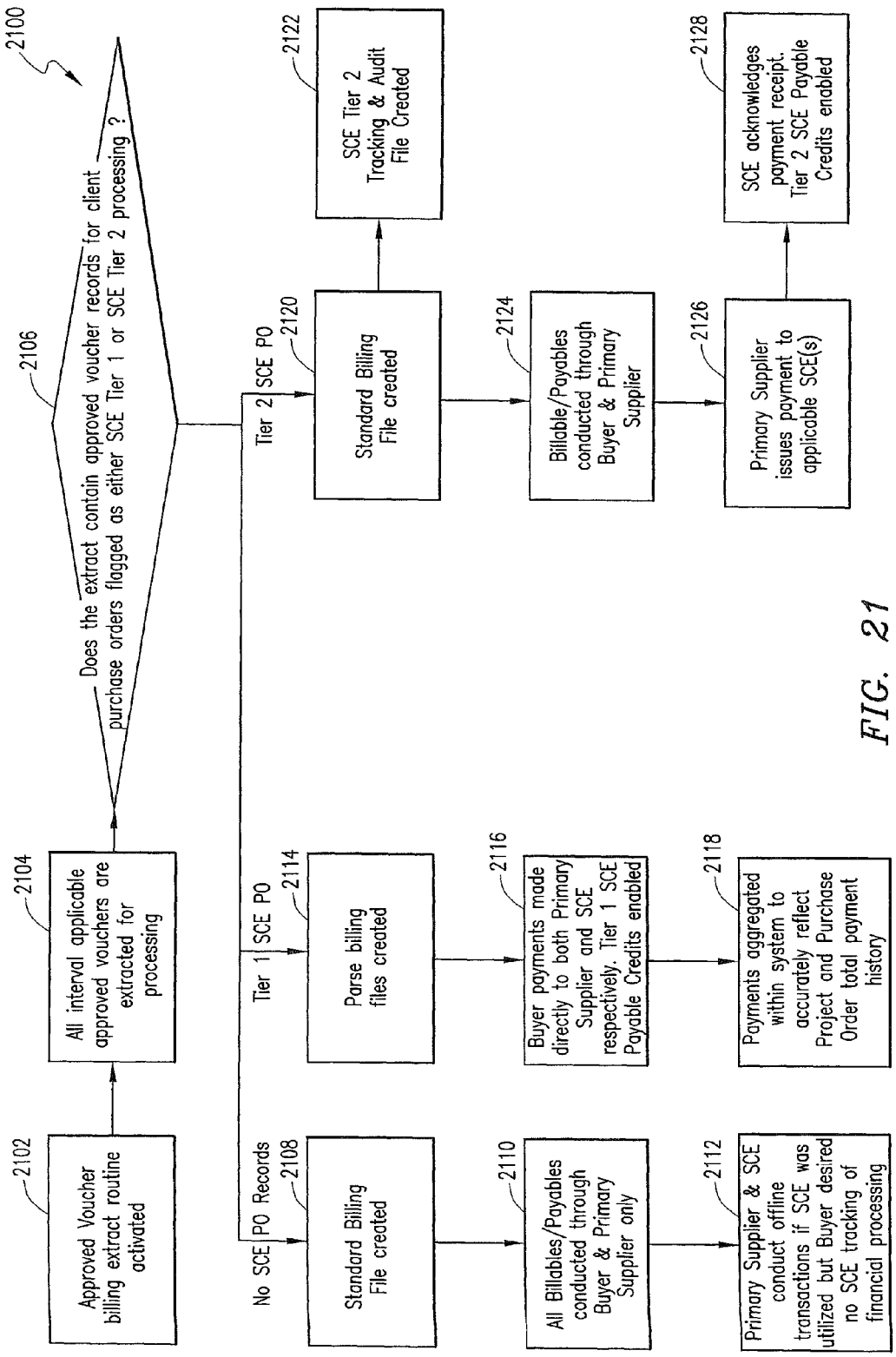
FIG. 21 is an exemplary flow chart of how SCE bill/pay may be conducted.

FIG. 21 is an exemplary flow chart of how SCE bill/pay may be conducted. In various embodiments of the invention, the buyer can view financial activity in terms of the complete supply chain and not solely in terms of buyer payments to primary suppliers. In some embodiments, the buyer can process financial transactions in such a way to account for both Tier 1 and Tier 2 supplier payment credits, which capability is often used in connection with diversified/minority-entity businesses, and particularly when dealing with governmental agency projects/contracts.

In a flow 2100 illustrated in FIG. 21, the extraction process for financial processing purposes is dependent upon previous buyer transactional selections and stored database values. The extraction process is configurable by the buyer, meaning that timing and organizational variables could affect batch or real-time processes.

In some embodiments of the invention, Tier 2 payables processing represents a limited version of Tier 1 payables processing. In most cases, the buyer is expected to want to ensure that service providers are being compensated as contracted. However, in some instances, it is acceptable to recognize Tier 2 diversified business entity spending credits.

In FIG. 21, the flow 2100 begins at step 2102. At step 2102, an approved voucher billing time extract routine is activated. At step 2104, all configured interval applicable approved vouchers are extracted for processing. At step 2106, a determination is made whether the extract contains any approved voucher records for client purchase orders flagged for either SCE Tier 1 or SCE Tier 2 processing.

If, at step 2106, it is determined that no client purchase orders have been flagged for either SCE Tier 1 or SCE Tier 2, execution proceeds to step 2108. At step 2108, a standard billing file is created. At step 2110, all billables/payables are conducted through the buyer and primary supplier only. At step 2112, the primary supplier and the SCE conduct offline transactions if the SCE that was utilized but the buyer desired no SCE tracking or financial processing.

If, at step 2106, it is determined that a purchase order has been flagged as an SCE Tier 1 purchase order, execution proceeds to step 2114. At step 2114, parsed billing files are created. The parsed billing files created at step 2114 include a primary supplier file and an SCE file. In various embodiments of the invention, the primary supplier file contains only direct services/goods provision activities for marginal billings for those applicable SCE billable/payable records in which the client has agreed to pay a markup above the SCE pricing to the primary supplier, which permits the primary supplier to be paid the applicable markup on billable items for which the SCE is paid directly by the buyer. In various embodiments of the invention, the SCE file contains only direct services/goods provision activities designated for Tier 1 purchase order SCE processing. At step 2116, buyer payments are made directly to the primary supplier and the SCE, respectively. In addition, at step 2116, Tier 1 SCE payable credits are enabled. At step 2118, payments are aggregated within the system to accurately reflect project and purchase order total payment history.

If, at step 2106, it is determined that the purchase order is flagged for SCE Tier 2 processing, execution proceeds to step 2120. At step 2120, a standard billing file is created. From step 2120, execution proceeds to both step 2122 and step 2124. At step 2122, an SCE Tier 2 tracking and audit file is created. At step 2124, billable/payables are collected through the buyer and the primary supplier. At step 2126, the primary supplier issues payment to the applicable SCE(s). At step 2128, the SCE acknowledges payment receipt and Tier 2 SCE payable credits are enabled. From step 2128, execution returns to step 2122.

Figure 22:
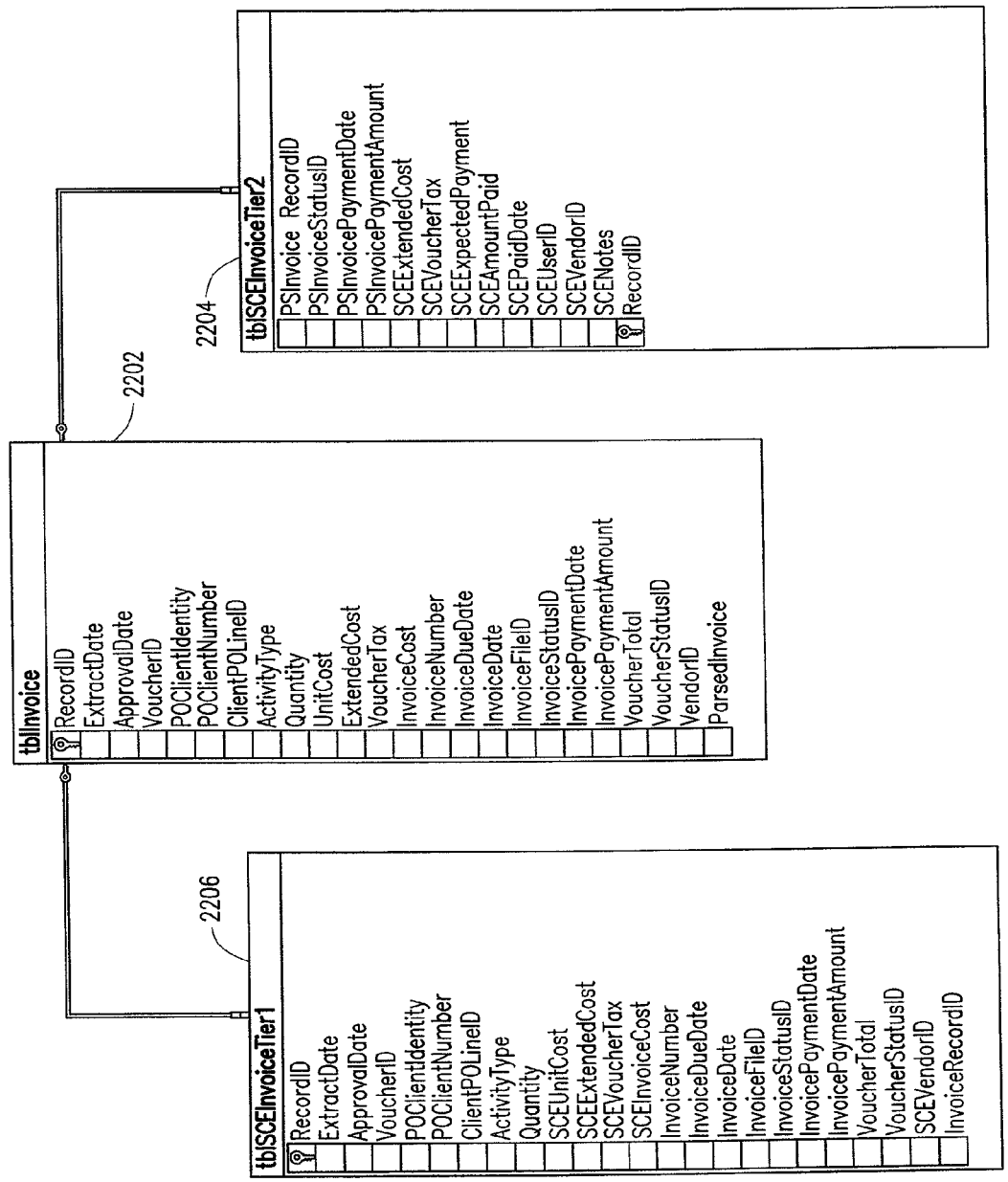
FIG. 22 illustrates a technical database model/schema that that may be used in connection with SCE bill/pay data file extraction.

FIG. 22 illustrates a technical database model/schema that may be used in connection with SCE bill/pay data file extraction. In FIG. 22, an invoice Table 2202 is interrelated to each of an SCE invoice Tier 2 Table 2204 and an SCE invoice Tier 1 Table 2206. Each of the Tables 2202-2206 contains various fields for invoicing and permit Tier 1 and Tier 2 invoicing to be undertaken as discussed above.

Figure 23A:
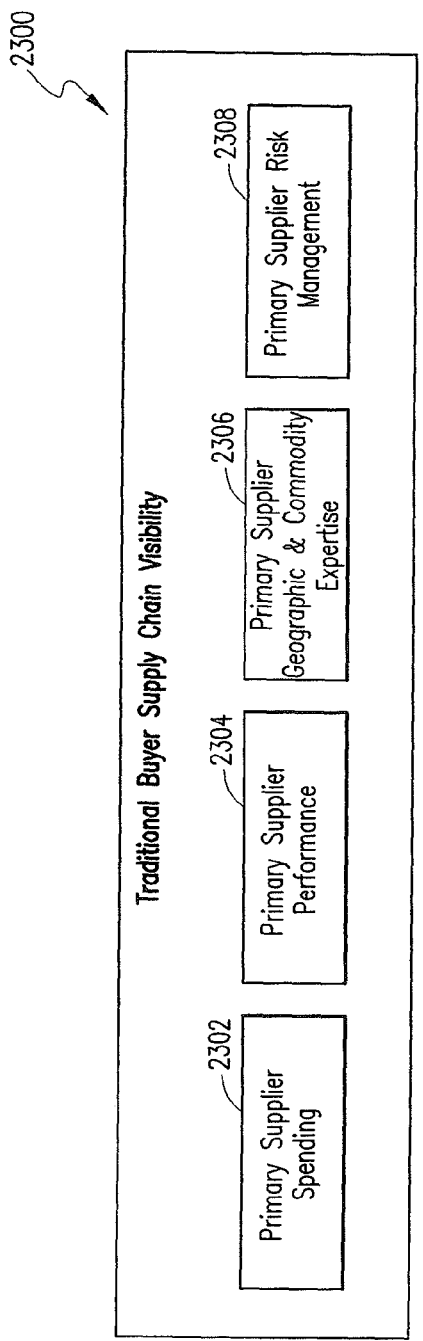
FIG. 23A depicts a traditional view of a supply chain buyer.

FIG. 23A depicts a traditional view of a buyer of a supply chain. In block 2300, sub blocks 2302, 2304, 2306, and 2308 are shown. Thus, traditionally, the buyer is only able to view primary supplier spending 2302, primary supplier performance 2304, primary supplier geographic and commodity expertise 2306, and primary supplier risk management 2308. Because the buyer is unable to view or obtain information about other aspects of the supply chain beyond sub blocks 2302-2308, no assessment or measurement of other aspects, nor management thereof, can be made by the buyer.

Figure 23B:
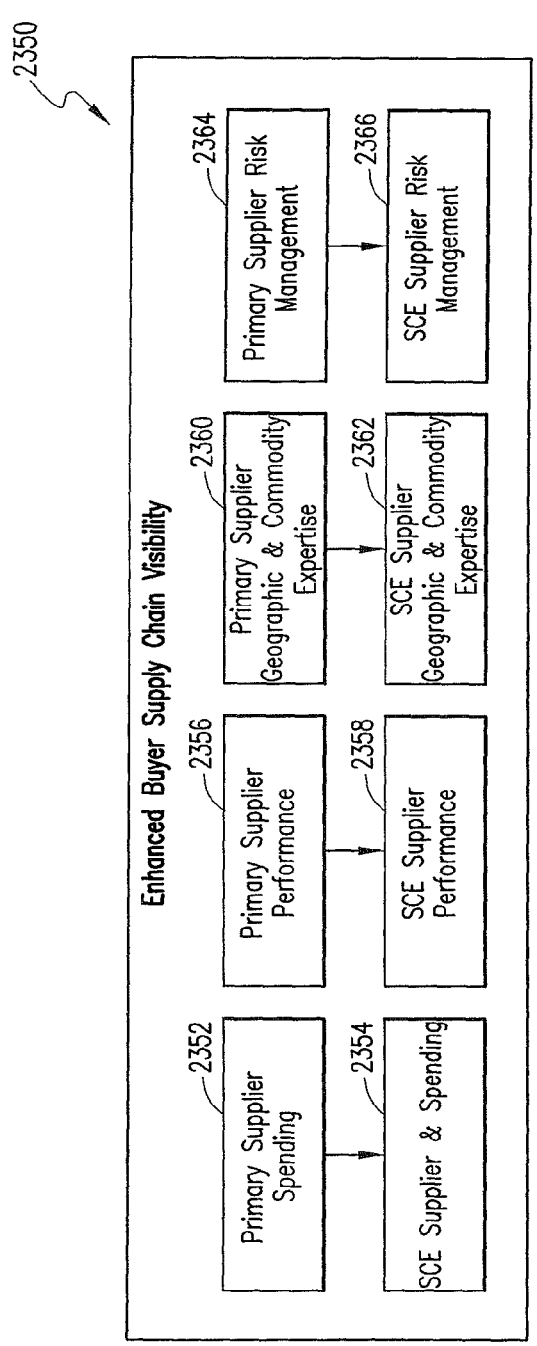
FIG. 23B is a block diagram that illustrates enhanced visibility of the supply chain by the buyer.

FIG. 23B is a block diagram that illustrates enhanced visibility of the supply chain by the buyer in accordance with principles of the present invention. Block 2350 includes blocks 2352-2366. In various embodiments of the invention, the buyer is able to obtain information relative to primary supplier spending 2352 and SCE supplier spending 2354. In similar fashion, the buyer is able to assess primary supplier performance 2356 as well as SCE performance 2358. In addition, the buyer is able to determine primary supplier geographic and commodity expertise and SCE supplier geographic and commodity expertise. Moreover, in various embodiments of the invention, the buyer is able to access both primary supplier risk management 2364 and SCE supplier risk management 2366.

Given the above, it is apparent that principles of the invention permit performance assessment and measurement tools such as those described in U.S. patent application Ser. No. 10/412,096 to be expanded down to the SCE(s) and that primary supplier performance may be better accessed by aggregating and segregating use of the primary supplier chain with or without SCE details included therewith. In some embodiments of the invention, SCE activities and performance may be evaluated and impacts of those activities and performance upon the primary supply chain evaluated.

FIG. 24 illustrates how embodiments of the invention may impact the buyer's supply chain. FIG. 24 includes an SCE universe 2402, a primary supplier universe 2404, and a buyer universe 2406 as concentric circles, the SCE universe 2406 being at the center. Various embodiments of the invention permit the buyer to access data not only within the buyer universe 2406 and the primary supplier universe 2404, but also in the SCE universe 2402. Information thus obtained by the buyer can be used to improve various aspects of the buyer's business, including, but not limited to total supply chain management, risk management, pricing/costing, geographic services/goods provision capabilities, strategic alliances, delivery performance, diversified business support, and spend management.

The previous description is of embodiment(s) for implementing the invention and the scope of the invention should not necessarily be limited by this description. The scope of the present invention is instead defined by the following claims and the equivalents thereof.

What is claimed is:

1. A method of facilitating a project bid process, the method comprising:
   on at least one server computer comprising a processor and memory, establishing buyer configurations governing subcontracting-entity utilization by at least one supplier in the project bid process;
   generating, by the at least one server computer, a buyer-associated bid request utilizing at least a portion of bid item selections of a stored bid item list, wherein the buyer-associated bid request is associated with the buyer configurations;
   transmitting, by the at least one server computer, the buyer-associated bid request to the at least one supplier for solicitation of a supplier bid response to be generated with the bid item selections utilized in the buyer-associated bid request;
   generating, by the at least one server computer, a supplier-associated bid request utilizing at least a portion of the bid item selections utilized in the buyer-associated bid request;
   transmitting, by the at least one server computer, the supplier-associated bid request to at least one subcontracting entity for solicitation of a subcontracting-entity bid response to be generated with the bid item selections utilized in the supplier-associated bid request; and
   wherein the transmitting of the supplier-associated bid request is subject to the buyer configurations permitting bid participation by the at least one subcontracting entity.

2. The method of claim 1, wherein the step of generating the buyer-associated bid request further comprises:
   receiving buyer-associated bid request data from a buyer for the buyer-associated bid request; and
   storing the buyer-associated bid request data within fields associated with at least a portion of the bid item selections.

3. The method of claim 2, further comprising:
   receiving the supplier bid response; and
   wherein the supplier bid response includes bid response data within fields associated with at least a portion of the bid item selections utilized in the buyer-associated bid request.

4. The method of claim 3, further comprising:
   receiving the subcontracting-entity bid response; and
   wherein the subcontracting-entity bid response includes bid response data within fields associated with at least a portion of the bid item selections utilized in the supplier-associated bid request.

5. The method of claim 4, further comprising transmitting the supplier bid response to the buyer upon completion of all required ones of the fields by the at least one supplier.

6. The method of claim 5, further comprising transmitting the subcontracting-entity bid response to the at least one supplier upon completion of all required ones of the fields by the subcontracting entity.

7. The method of claim 4, further comprising:
   receiving an acceptance of the subcontracting-entity bid response;
   receiving a selection of at least a portion of the bid response data included in the subcontracting-entity bid response; and
   updating the supplier bid response with the selected at least a portion of the bid response data included in the subcontracting-entity bid response.

8. The method of claim 7, further comprising transmitting the supplier bid response to the buyer.

9. The method of claim 8, further comprising receiving a buyer request to access data relative to the subcontracting-entity bid response.

10. The method of claim 4, wherein the step of transmitting the supplier-associated bid request comprises selecting the at least one subcontracting entity to receive the supplier-associated bid request using the supplier-associated bid request data.

11. The method of claim 10, wherein the step of selecting the at least one subcontracting entity further comprises:
   maintaining subcontracting-entity information associated with the at least one subcontracting entity; and
   comparing the supplier-associated bid request data with the subcontracting-entity information to select the at least one subcontracting entity.

12. The method of claim 3, wherein the step of transmitting the buyer-associated bid request comprises selecting the at least one supplier to receive the buyer-associated bid request using the buyer-associated bid request data.

13. The method of claim 12, wherein the step of selecting the at least one supplier further comprises:
   maintaining supplier information associated with the at least one supplier; and
   comparing the buyer-associated bid request data with the supplier information to select the at least one supplier.

14. The method of claim 1, further comprising:
   receiving the subcontracting-entity bid response;
   receiving the supplier bid response;
   receiving a supplier bid award;

transmitting a purchase requisition to the at least one supplier;

transmitting a parsed purchase requisition to the subcontracting entity; and wherein the parsed purchase requisition is a subset of the purchase requisition.

15. The method of claim 14, wherein the purchase requisition is submitted to the at least one supplier for purposes of acceptance and tax assessment.

16. The method of claim 14, wherein the parsed purchase requisition is submitted to the subcontracting entity for purposes of acceptance and tax assessment.

17. The method of claim 14, further comprising:

receiving a completed parsed purchase requisition from the subcontracting entity; and generating a completed purchase requisition.

18. The method of claim 17, wherein the step of generating the completed purchase requisition comprises aggregating at least one completed purchase requisition.

19. The method of claim 17, further comprising:

generating a buyer-associated purchase order to the at least one supplier;

generating a supplier-associated purchase order to the subcontracting entity;

responsive to a determination that the subcontracting entity may be paid directly by a buyer, generating a buyer-associated purchase order to the subcontracting entity.

20. The method of claim 1, wherein the buyer configurations comprise project commodity permission configurations, the project commodity permission configurations configuring allowed subcontracting entity utilization based at least in part upon project sector and family.

21. The method of claim 1, wherein the buyer configurations comprise organizational permission configurations, the organizational permission configurations configuring allowed subcontracting entity utilization based at least in part upon at least one of a division, a business unit, and a cost center of a buyer.

22. The method of claim 1, wherein the buyer configurations comprise staff supplementation commodity permission configurations, the staff supplementation commodity permission configurations specifying one or more skill sets as being at least one of permitted to be subcontracted and not permitted to be subcontracted.

23. The method of claim 1, wherein the buyer configurations comprise template permission configurations, the template permission configurations configuring allowed subcontracting entity utilization based at least in part upon a bid template from which the buyer-associated bid request is generated.

24. The method of claim 1, wherein the buyer configurations comprise geographic permission configurations, the geographic permission configurations configuring allowed subcontracting entity utilization based at least in part upon geographic region.

25. The method of claim 1, wherein the buyer configurations comprise primary supplier status permission configurations, the primary supplier status permission configurations permitting or denying subcontracting entity bid participation based at least in part upon a status of the at least one supplier.

26. The method of claim 1, wherein the buyer configurations comprise subcontracting entity cost configurations, the subcontracting entity cost configurations specifying at least one of a primary supplier maximal markup percentage and a primary supplier markup limit.

27. A method of managing a project bid process, the method comprising:

on at least one computer comprising a processor and memory, establishing buyer configurations governing subcontracting-entity utilization by a primary supplier in the project bid process;

receiving, via the at least one computer, an enablement request relative to a subcontracting entity;

receiving, via the at least one computer, an affiliation request relative to the primary supplier, the affiliation request requesting that the subcontracting entity be affiliated with the primary supplier;

transmitting a buyer-associated bid request to the primary supplier, wherein the buyer-associated bid request is associated with the buyer configurations;

transmitting, to the subcontracting entity, of a daisy chain quotation associated with the buyer-associated bid request;

wherein the transmitting of the daisy chain quotation is subject to the buyer configurations permitting bid participation by the subcontracting entity;

receiving, via the at least one computer, a completed daisy chain quotation from the subcontracting entity, the completed daisy chain quotation comprising completed applicable daisy chain quotation items of the daisy chain quotation transmitted to the subcontracting entity;

updating, via the at least one computer, a supplier bid response to the buyer-associated bid request using at least some of the completed applicable daisy chain quotation items; and transmitting the updated supplier bid response to a buyer.

28. The method of claim 27, further comprising:

transmitting a buyer bid award to the primary supplier;

transmitting a purchase requisition to the primary supplier;

parsing the purchase requisition; and transmitting the parsed purchase requisition to the subcontracting entity.

29. The method of claim 28, further comprising:

receiving a completed purchase requisition from the subcontracting entity;

aggregating the completed purchase requisition received from the subcontracting entity; and transmitting a purchase order to at least one of the primary supplier and the subcontracting entity.

30. The method of claim 29, wherein the step of transmitting the purchase order comprises:

determining whether the subcontracting entity may be paid directly by the buyer; and responsive to a determination that the subcontracting entity may be paid directly by the buyer:

transmitting a purchase order to the primary supplier;

parsing the transmitted purchase order to segment purchase order details relative to the subcontracting entity; and transmitting a parsed purchase order to the subcontracting entity.

31. The method of claim 29, wherein the step of transmitting the purchase order comprises:

determining whether the subcontracting entity may be paid directly by the buyer; and responsive to a determination that the subcontracting entity may not be paid directly by the buyer, transmitting a purchase order to the primary supplier.

32. The method of claim 29, further comprising transmitting a subcontracting entity voucher to the primary supplier.

33. The method of claim 32, further comprising transmitting a supplier voucher to the buyer.

34. The method of claim 33, further comprising receiving a buyer voucher approval.

35. The method of claim 34, further comprising transmitting an invoice to the buyer.

36. The method of claim 29, further comprising transmitting a supplier voucher to the buyer.

37. The method of claim 36, further comprising receiving a buyer voucher approval.

38. The method of claim 37, further comprising transmitting an invoice to the buyer.

39. A computer system for facilitating a bid process for a project involving a buyer, a supplier, and at least one subcontracting entity, the computer system comprising:
- a database system for maintaining a configurable pre-established bid item list and a bid template for the project;
- wherein the bid template includes bid item selections selected from the bid item list;
- a server connected to the database system and connectable to a buyer, the supplier, and the at least one subcontracting entity; and
- wherein the server is operable to:
  - establish buyer configurations governing subcontracting-entity utilization by at least one supplier in the project bid process;
  - generate a buyer-associated bid request utilizing the bid template, wherein the buyer-associated bid request is associated with the buyer configurations;
  - transmit the buyer-associated bid request to the supplier;
  - generate a supplier-associated bid request via a parsing of the buyer-associated bid request;
  - transmit the supplier-associated bid request to the at least one subcontracting entity;
  - wherein the transmission of the supplier-associated bid request is subject to the buyer configurations permitting bid participation by the at least one subcontracting entity,
  - receive a subcontracting entity bid response to the supplier-associated bid request; and
  - receive a supplier bid response, the supplier bid response incorporating, at least in part, data from the subcontracting entity bid response.

* * * * *